(12) United States Patent
Griffis et al.

(10) Patent No.: US 11,511,231 B2
(45) Date of Patent: Nov. 29, 2022

(54) FLUID MANIFOLDS IN ELECTRODIALYSIS DEVICES

(71) Applicant: Evoqua Water Technnologies LLC, Pittsburgh, PA (US)

(72) Inventors: Joshua Griffis, Ashburnham, MA (US); Li-Shiang Liang, Harvard, MA (US); William Lane, Somerville, MA (US); Simon P. Dukes, Chelmsford, MA (US); Kris Wy Loon Lim, Singapore (SG)

(73) Assignee: Evoqua Water Technologies LLC, Pittsburgh, PA (US)

( * ) Notice: Subject to any disclaimer, the term of this patent is extended or adjusted under 35 U.S.C. 154(b) by 318 days.

(21) Appl. No.: 16/624,999

(22) PCT Filed: Jun. 20, 2018

(86) PCT No.: PCT/US2018/038486
§ 371 (c)(1),
(2) Date: Dec. 20, 2019

(87) PCT Pub. No.: WO2018/236992
PCT Pub. Date: Dec. 27, 2018

(65) Prior Publication Data
US 2021/0001276 A1 Jan. 7, 2021

Related U.S. Application Data

(60) Provisional application No. 62/522,732, filed on Jun. 21, 2017.

(51) Int. Cl.
*B01D 61/54* (2006.01)
*B01D 17/06* (2006.01)
(Continued)

(52) U.S. Cl.
CPC ............ *B01D 61/54* (2013.01); *B01D 17/06* (2013.01); *B01D 17/085* (2013.01); *B01D 61/422* (2013.01); *B01D 61/50* (2013.01)

(58) Field of Classification Search
CPC ...... B01D 61/54; B01D 17/06; B01D 17/085; B01D 61/422; B01D 61/50;
(Continued)

(56) References Cited

U.S. PATENT DOCUMENTS

2005/0037254 A1* 2/2005 Skala .................. H01M 8/2484
429/444
2007/0295604 A1 12/2007 Freydina
(Continued)

FOREIGN PATENT DOCUMENTS

WO 2016172526 A1 10/2016

*Primary Examiner* — Krishnan S Menon

(57) ABSTRACT

An electrochemical separation device includes a first electrode, a second electrode, a cell stack including alternating depleting compartments and concentrating compartments disposed between the first electrode and the second electrode, an inlet manifold configured to introduce a fluid to one of the depleting compartments or the concentrating compartments an outlet manifold, and one or more of a fluid flow director disposed within the inlet manifold and having a surface configured to alter a flow path of the fluid introduced into the inlet manifold and direct the fluid into the one of the depleting compartments or the concentrating compartments, and a second fluid flow director disposed within the outlet manifold and having a surface configured to alter a flow path of the fluid introduced into the outlet manifold via one of the depleting compartments or the concentrating compartments.

10 Claims, 64 Drawing Sheets

(51) Int. Cl.
   *B01D 17/00* (2006.01)
   *B01D 61/42* (2006.01)
   *B01D 61/50* (2006.01)

(58) Field of Classification Search
   CPC ........ B01D 2313/105; B01D 2313/125; B01D 2313/08; B01D 2319/02; B01D 17/02; B01D 61/44; B01D 61/46; Y02E 60/50; H01M 8/227; C02F 1/4693
   See application file for complete search history.

(56) References Cited

U.S. PATENT DOCUMENTS

| | | |
|---|---|---|
| 2012/0117789 A1 | 5/2012 | Liang et al. |
| 2012/0118738 A1* | 5/2012 | Liang ........................ C25B 9/70 204/520 |
| 2016/0009573 A1 | 1/2016 | Liang |
| 2016/0346737 A1 | 12/2016 | Liang et al. |
| 2017/0029288 A1 | 2/2017 | Mehmi et al. |

* cited by examiner

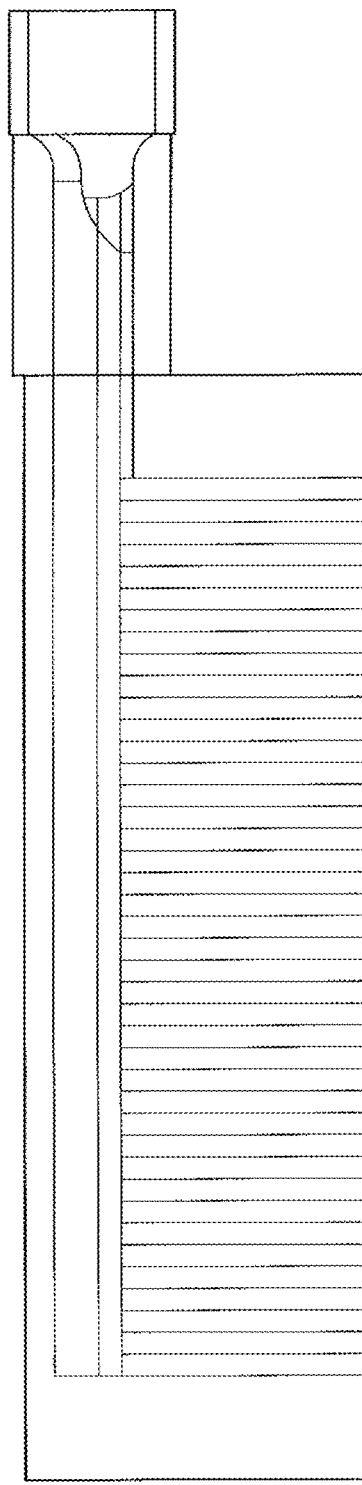 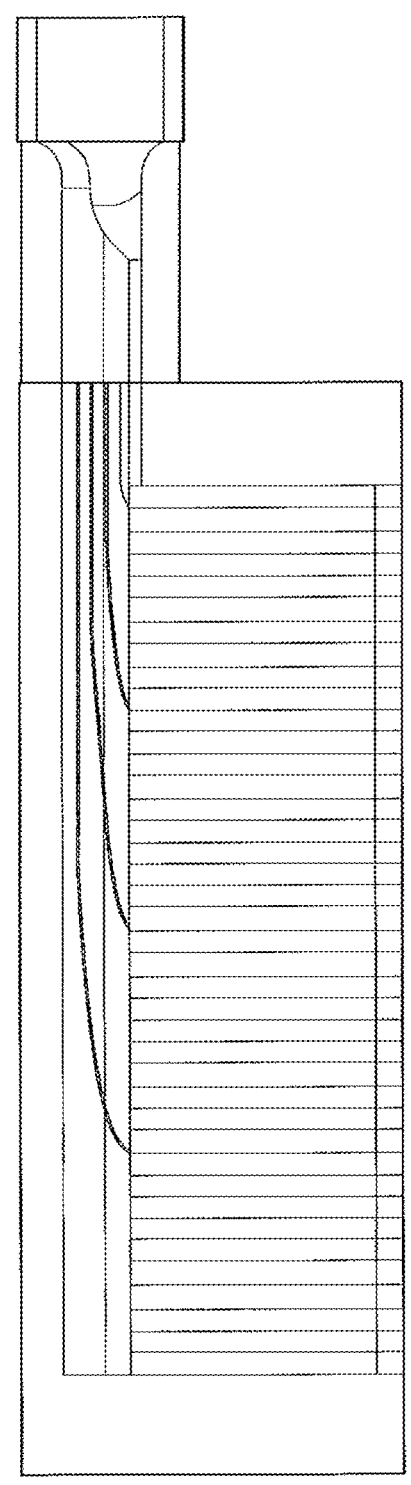
Base Design  Optimized Design
FIG. 15C

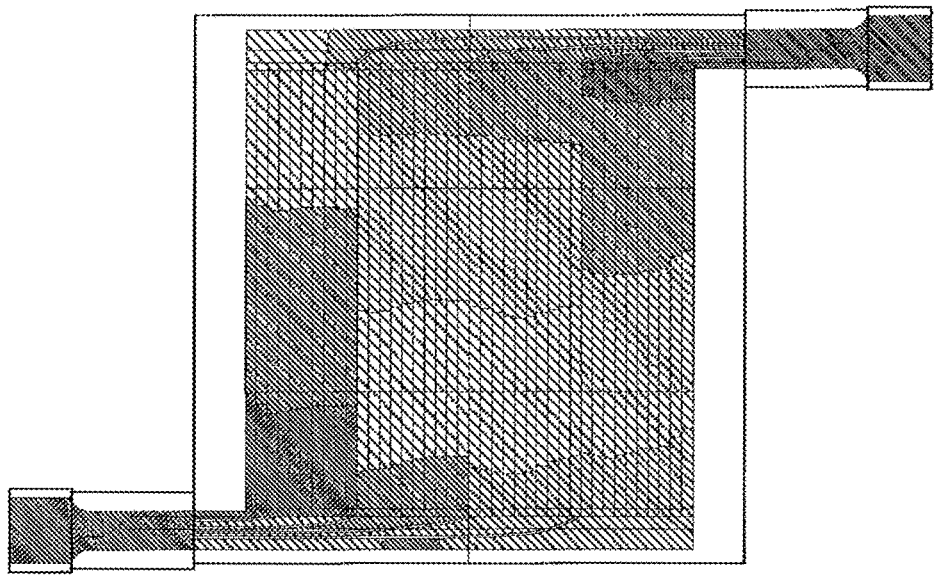
FIG. 18B
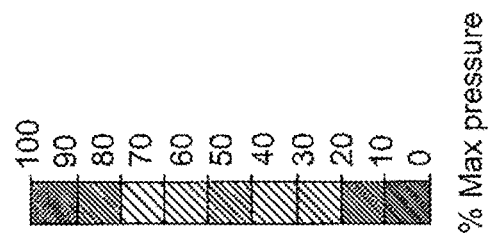
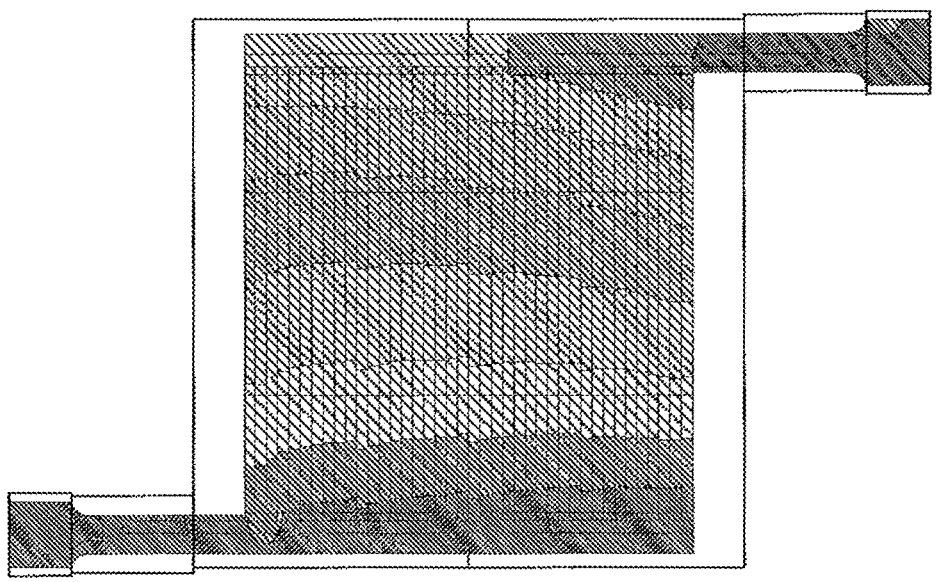
FIG. 18A

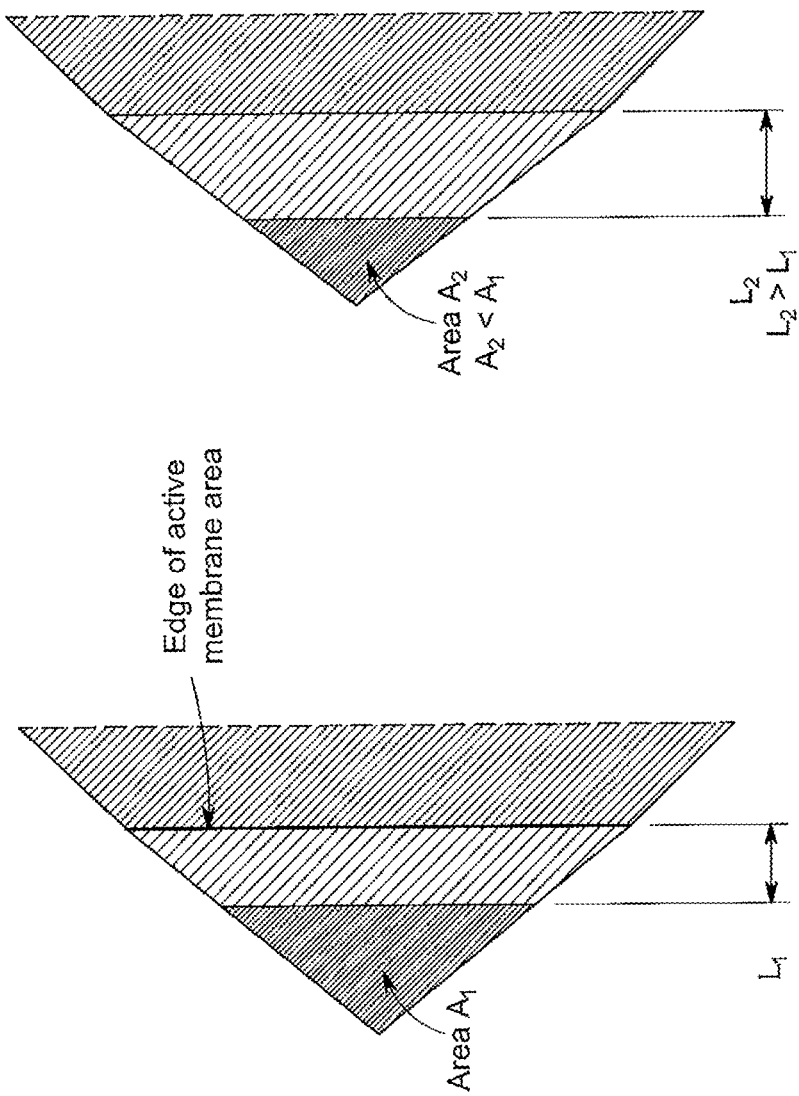

Examples of effect of inserts on process efficiency and energy consumption
(Sodium Chloride solution as feed to dilute and concentrate)

First example

| | | | Base case with no inserts | With inserts in inlet manifolds | With inserts in inlet and outlet manifolds |
|---|---|---|---|---|---|
| Dilute outlet flow rate (m³/h) | | 2.67 | | | |
| Concentrate outlet flow rate (m³/h) | | 3.07 | | | |
| Dilute inlet conductivity (mS/cm) | | 50.5 | Current (A) | 14.48 | 12.50 | 11.75 |
| Dilute outlet conductivity (mS/cm) | | 30.38 | Voltage (VDC) | 163.6 | 150.8 | 143.9 |
| Concentrate inlet conductivity (mS/cm) | | 61.93 | Process efficiency (%) | 60.1% | 69.7% | 74.1% |
| Concentrate outlet conductivity (mS/cm) | | 75.73 | Energy consumption (kWh/m³) | 0.89 | 0.71 | 0.63 |
| Water recovery (%) | | 60% | Dilute pressure drop (psi) | 15.0 | 17.8 | 16.1 |
| Number of passes in module | | 10 | Concentrate pressure drop (psi) | 22.7 | 19.1 | 17.0 |
| Number of cell pairs per pass | | 200 | | | | |

FIG. 32A

Examples of effect of inserts on process efficiency and energy consumption
(Sodium Chloride solution as feed to dilute and concentrate)

Second example

| | | Base case with no inserts | With inserts in inlet manifolds | With inserts in inlet and outlet manifolds |
|---|---|---|---|---|
| Dilute outlet flow rate (m³/h) | 2.63 | | | |
| Concentrate outlet flow rate (m³/h) | 3.19 | | | |
| Dilute inlet conductivity (mS/cm) | 30.26 | Current (A) | 10.75 | 10.00 | 9.47 |
| Dilute outlet conductivity (mS/cm) | 15.54 | Voltage (VDC) | 206.88 | 205.28 | 196.44 |
| Concentrate inlet conductivity (mS/cm) | 68.27 | Process efficiency (%) | 49.5% | 53.2% | 56.2% |
| Concentrate outlet conductivity (mS/cm) | 73.71 | Energy consumption (kWh/m³) | 0.85 | 0.78 | 0.71 |
| Water recovery (%) | 80% | Dilute pressure drop (psi) | 13.9 | 22.1 | 21.4 |
| Number of passes in module | 10 | Concentrate pressure drop (psi) | 13.6 | 17.7 | 14.9 |
| Number of cell pairs per pass | 200 | | | | |

FIG. 32B

FLUID MANIFOLDS IN ELECTRODIALYSIS DEVICES

RELATED APPLICATIONS

This application claims priority under 35 U.S.C. § 119(e) to U.S. Provisional Application Ser. No. 62/522,732, titled "DESIGN OF FLOW DIRECTING FEATURES WITHIN THE FLUIDIC MANIFOLDS OF ELECTRODIALYSIS DEVICES," filed on Jun. 21, 2017 which is incorporated herein by reference in its entirety.

BACKGROUND

1. Field of Disclosure

Aspects and embodiments disclosed herein are directed generally to electrochemical membrane systems and method of operating same.

2. Discussion of Related Art

Devices for purifying fluids using electrical fields may be used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Devices similar in construction to electrodialysis devices can be used as reverse electrodialysis (RED) devices. The two sets of compartments are fed with fluids of different ionic concentrations, separated by the ion-selective membranes; for example, seawater and river water. The difference in concentrations and chemical potentials result in a voltage difference across each membrane, which when summed up over the total number of membranes in a device result in a voltage potential generated at the two electrodes that bound the stack of compartments and membranes.

SUMMARY

In accordance with one or more aspects, an electrochemical separation system may comprise a first electrode, a second electrode, a first electrochemical separation modular unit having a first cell stack defining a plurality of alternating depleting compartments and concentrating compartments supported by a first frame, the first electrochemical separation modular unit positioned between the first electrode and the second electrode, and a second electrochemical separation modular unit, adjacent to and in cooperation with the first electrochemical separation modular unit, having a second cell stack defining a plurality of alternating depleting compartments and concentrating compartments supported by a second frame, the second electrochemical separation modular unit positioned between the first electrochemical separation modular unit and the second electrode.

In accordance with one or more aspects, a method of assembling an electrochemical separation system may comprise mounting a first electrochemical separation modular unit having a first cell stack surrounded by a first frame in a vessel between a first electrode and a second electrode, and mounting a second electrochemical separation modular unit having a second cell stack surrounded by a second frame in the vessel between the first electrochemical separation modular unit and the second electrode.

In accordance with one or more aspects, an electrochemical separation modular unit may comprise a cell stack defining a plurality of alternating depleting compartments and concentrating compartments, and a frame surrounding the cell stack and including a manifold system configured to facilitate fluid flow through the cell stack.

In accordance with one or more aspects, a flow distributor for electrochemical separation may comprise a plurality of first passages oriented in a first direction and configured to deliver feed to at least one compartment of an electrochemical separation device, and a plurality of second passages oriented in a second direction, the plurality of second passages in fluid communication with the plurality of first passages and with an inlet manifold associated with the electrochemical separation device.

In accordance with one or more aspects, an electrochemical separation system may comprise a first electrode, a second electrode, a first electrochemical separation modular unit including a plurality of alternating depleting compartments and concentrating compartments positioned between the first and second electrodes, a second electrochemical separation modular unit including a plurality of alternating depleting compartments and concentrating compartments, the second electrochemical separation modular unit arranged in cooperation with the first electrochemical separation modular unit and positioned between the first electrochemical separation modular unit and the second electrode, and a spacer disposed between and adjacent the first and second electrochemical separation modular units configured to reduce current loss within the system.

In accordance with one or more embodiments, a modular electrochemical separation system, which may also be referred to as an electrical purification device or apparatus, may enhance the efficiency and overall flexibility of various treatment processes. In some embodiments, cross-flow electrochemical separation devices, such as cross-flow electrodialysis (ED) devices, may be implemented as an attractive alternative to traditional plate-and-frame devices. Cross flow devices are described in U.S. Pat. No. 8,627,560 B2, U.S. Pat. No. 8,741,121 B2 and US20160346737 A1 all of which are incorporated herein by reference in their entirety for all purposes. In some embodiments, current inefficiencies in cross-flow electrochemical separation devices may be reduced. In at least certain embodiments, current inefficiency due to current bypass through inlet and outlet manifolds may be addressed. Energy consumption and membrane requirements may also be reduced, both of which may affect life cycle cost in various applications. In some embodiments, at least 85% membrane utilization may be achieved. Reduction in membrane requirement may in turn result in reduction in manufacturing cost, weight, and space requirements for electrochemical separation devices.

In some specific embodiments, the process efficiency of cross-flow ED devices may be significantly improved. In some embodiments, the efficiency of electrochemical separation systems may be improved for desalination of brackish water, seawater and brines from oil and gas production. In at least some embodiments, the cost competitiveness of ED may be improved in comparison to reverse osmosis (RO), which is currently the dominant technology for desalination.

One or more embodiments disclosed herein relate to devices that may purify fluids electrically that may be contained within a housing, as well as methods of manufacture and use thereof. Liquids or other fluids to be purified enter the purification device and, under the influence of an electric field, are treated to produce an ion-depleted liquid. Species from the entering liquids are collected to produce an ion-concentrated liquid.

In accordance with one or more embodiments, an electrochemical separation system or device may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include from about 50 to about 100 cell pairs. Modular units may be individually assembled and quality control tested, such as for leakage, separation performance and pressure drop prior to being incorporated into a larger system. In some embodiments, a cell stack may be mounted in a frame as a modular unit that can be tested independently. A plurality of modular units can then be assembled together to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel for operation. Multi-pass flow configurations may be possible with the placement of blocking membranes and/or spacers between modular units or within modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

In accordance with one or more embodiments, the efficiency of electrochemical separation systems may be improved. Current loss is one potential source of inefficiency. In some embodiments, such as those involving a cross-flow design, the potential for current leakage may be addressed. Current efficiency may be defined as the percentage of current that is effective in moving ions out of the dilute stream into the concentrate stream. Various sources of current inefficiency may exist in an electrochemical separation system. One potential source of inefficiency may involve current that bypasses the cell pairs by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, techniques associated with the sealing and potting of membranes and screens within a device may facilitate reduction of current leakage.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation modular unit may be constructed and arranged to provide a predetermined current bypass path. In some embodiments, promoting a multi-pass flow configuration within an electrochemical separation device may facilitate reduction of current leakage. In at least some non-limiting embodiments, blocking membranes or spacers may be inserted between modular units to direct dilute and/or concentrate streams into multiple-pass flow configurations for improved current efficiency. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved.

In accordance with one or more aspects, an electrochemical separation apparatus may comprise a cell stack. The cell stack may further comprise a plurality of aligned cell pairs, each of the plurality of aligned cell pairs including an ion concentrating compartment constructed and arranged to provide fluid flow in a first direction and an ion diluting compartment constructed and arranged to provide fluid flow in a second direction that is different from the first direction In accordance with one or more aspects, there is provided an electrochemical separation device. The electrochemical separation device comprises a first electrode, a second electrode, a cell stack including alternating depleting compartments and concentrating compartments disposed between the first electrode and the second electrode, an inlet manifold configured to introduce a fluid to one of the depleting compartments or the concentrating compartments, an outlet manifold, and one or more of a fluid flow director disposed within the inlet manifold and having a surface configured to alter a flow path of the fluid introduced into the inlet manifold and direct the fluid into the one of the depleting compartments or the concentrating compartments, and a second fluid flow director disposed within the outlet manifold and having a surface configured to alter a flow path of the fluid introduced into the outlet manifold via one of the depleting compartments or the concentrating compartments.

In some embodiments, a fluid flow path through the depleting compartments is perpendicular to a fluid flow path through the concentrating compartments.

In some embodiments, the fluid flow director is disposed within the inlet manifold and is arranged to at least partially block a bypass current through the inlet manifold. The fluid flow director may define a fluid flow path through the inlet manifold between different portions of the cell stack that has a cross-sectional area less than a cross-sectional area of the inlet manifold.

In some embodiments, the cell stack has an average current efficiency of at least 85%.

In some embodiments, the cell stack includes a plurality of sub-blocks and the fluid flow director includes a plurality of ramps arranged to direct the fluid into different respective ones of the plurality of sub-blocks. A gap of less than 1 mm may be defined between edges of each of the ramps and the cell stack.

In some embodiments, the fluid flow director further includes a plurality of conduits fluidically isolated from one another. Each of the plurality of conduits may terminate at a respective one of the plurality of ramps. A sum of cross-sectional areas of the plurality of conduits may be less than a cross-sectional area of the inlet manifold.

In some embodiments, the device further comprises a second fluid flow director disposed within the outlet manifold. The second fluid flow director may be configured to at least partially block the bypass current through the outlet manifold.

In some embodiments, the device further comprises a second cell stack defining alternating second depleting compartments and second concentrating compartments disposed between the cell stack and the second electrode, a second inlet manifold aligned with the outlet manifold and configured to introduce fluid from the outlet manifold to one of the second depleting compartments or the second concentrating compartments, a third fluid flow director disposed within the second inlet manifold and having a surface configured to alter a flow path of the fluid introduced into the second inlet manifold and direct the fluid into the one of the second depleting compartments or the second concentrating compartments, a second outlet manifold disposed on an opposite side of the second cell stack from the second inlet manifold, and a partition fluidically separating the inlet manifold from the second outlet manifold.

In some embodiments, the cell stack includes a plurality of sub-blocks and the fluid flow director includes a plurality of baffles arranged to isolate flow of the fluid into each of the plurality of sub-blocks from flow of the fluid into others of the plurality of sub-blocks. The fluid flow director may further include concentric fluid conduits.

In some embodiments, the fluid flow director includes a curved protrusion extending inwardly toward the cell stack from a wall of the inlet manifold. The fluid flow director may reduce a cross-sectional area of the inlet manifold by a first amount at an end of the inlet manifold and by a second amount, greater than the first amount, at a mid-point along a length of the inlet manifold. The fluid flow director may be configured to reduce fluid flow velocity through compartments in a central region of the cell stack.

In some embodiments, the device further comprises the second fluid flow director disposed within the outlet manifold. The second fluid flow director may have a cross-sectional area that decreases along a flow path through the outlet manifold. The second fluid flow director may be configured to reduce a pressure drop of fluid through the device.

In some embodiments, the device further comprises a fluid inlet having a different cross-section from that of the inlet manifold and a fluidic adaptor disposed between the fluid inlet and the inlet manifold. The fluidic adaptor may include a conduit having a first section with an inward taper in which a width of the conduit decreases in a first axis and a second section with an outward taper in which a width of the conduit increases in a second axis, the first section and the second section being non-overlapping. The inward taper of the first section of the conduit may be an elliptical taper.

In some embodiments, the device further comprises a recycle line configured to direct concentrate that has passed through the concentrating compartments back into the concentrating compartments.

In some embodiments, the inlet manifold is divided into fluidically isolated conduits configured to direct predetermined amounts of the fluid toward different portions of the cell stack. The fluidically isolated conduits may have cross-sectional areas selected to cause a fluid flow velocity through compartments in a central region of the cell stack to be less than a fluid flow velocity through compartments in upper and lower regions of the cell stack. The fluidically isolated conduits may have cross-sectional areas selected to cause a fluid flow velocity through compartments in an upper region of the cell stack to be substantially equal to a fluid flow velocity through compartments in a lower region of the cell stack.

In accordance with one or more aspects, there is provided a method of increasing current efficiency within an electrochemical separation apparatus including a cell stack defining alternating depleting compartments and concentrating compartments disposed between a first electrode and a second electrode, a fluid flow path through the depleting compartments being perpendicular to a fluid flow path through the concentrating compartments. The method comprises inserting a fluid flow director into an inlet manifold of the apparatus, the fluid flow director having a surface configured to alter a flow path of fluid introduced into the inlet manifold and direct the fluid into one of the plurality of depleting compartments or the plurality of concentrating compartments and at least partially block a bypass current through the inlet manifold.

In some embodiments, the method further comprises increasing a uniformity of fluid flow through the cell stack by installing a fluidic adaptor on an inlet of the inlet manifold, the fluidic adaptor including a conduit having first section with an inward taper in which a width of the conduit decreases in a first axis and a second section with an outward taper in which a width of the conduit increases in a second axis, the first section and the second section being non-overlapping. The first axis may be perpendicular to the second axis.

In some embodiments, the method further comprises reducing a pressure drop through the apparatus by installing a tapered fluid flow director in an outlet manifold of the apparatus.

In some embodiments, the method further comprises installing a second fluid flow director in an outlet manifold of the apparatus, the second fluid flow director having a curved surface that narrows a flow path through the outlet manifold by a first amount at a mid-point along a length of the outlet manifold and by a second amount less than the first amount proximate an end of the outlet manifold.

In accordance with another aspect, there is provided an electrochemical membrane device. The electrochemical membrane device comprises a first electrode, a second electrode, a cell stack including alternating depleting compartments and concentrating compartments disposed between the first electrode and the second electrode, ion-selective membranes separating the depleting compartments from the concentrating compartments, an inlet manifold configured to introduce a fluid to one of the depleting compartments or the concentrating compartments, an outlet manifold, and one or more of a fluid flow director disposed within the inlet manifold and having a surface configured to alter a flow path of the fluid introduced into the inlet manifold and direct the fluid into the one of the depleting compartments or the concentrating compartments, and a second fluid flow director disposed within the outlet manifold and having a surface configured to alter a flow path of the fluid introduced into the outlet manifold via one of the depleting compartments or the concentrating compartments.

In some embodiments, the device is an electrodialysis device for purifying fluids using electrical fields In some embodiments, the device is a reverse electrodialysis device for generation of electrical power from two or more fluid streams with different ionic concentrations Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 15C illustrates a comparison between the manifold of the base design of FIG. 10 and that of FIG. 15A;

FIG. 18A is a heat map of pressure drop distribution throughout the cells in the base ED system design;

FIG. 18B is a heat map of pressure drop distribution throughout the cells in the optimized ED system design;

FIG. 19C is a chart of the results of a CFD simulation of pressure drop across the entire module of the EDI device in both the base and optimized ED system designs;

FIG. 20A illustrates the cross-section of an initial design of a manifold of a ED device;

FIG. 20B illustrates the cross-section of an alternate design of a manifold of a ED device;

FIG. 32A is a table illustrating the effect of the sloping shaped outlet insert on the pressure drop across an ED module in a first example;

FIG. 32B is a table illustrating the effect of the sloping shaped outlet insert on the pressure drop across an ED module in a second example;

DETAILED DESCRIPTION

Figure 1A:
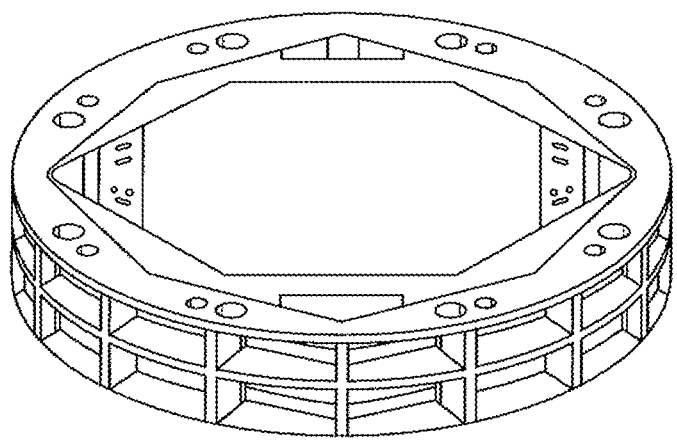
FIG. 1A shows an example of a sub-block of an electrodialysis device.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some instances, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or, for example, a power source derived from solar, wind, or wave power. At the electrode/liquid interfaces, electrochemical half-cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ions, while such a feed to the cathode electrolyte compartment will tend to generate hydrogen gas and hydroxide ions. Generally, the hydrogen ions generated at the anode compartment will associate with free anions, such as chloride ions, to preserve charge neutrality and create hydrochloric acid solution, and analogously, the hydroxide ions generated at the cathode compartment will associate with free cations, such as sodium ions, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations.

Figure 1B:
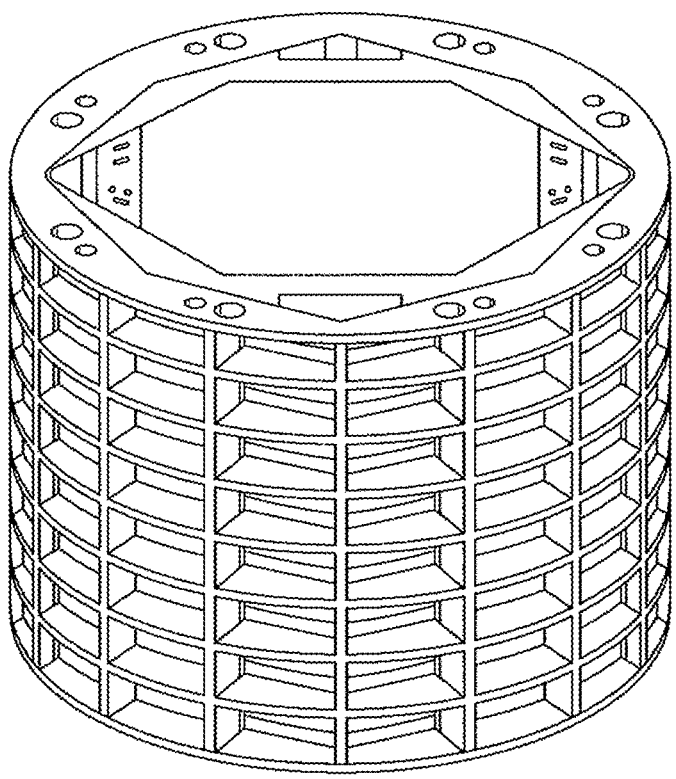
FIG. 1B shows a stack of four of the sub-blocks of FIG. 1A before insertion into a housing.
Figure 1E:
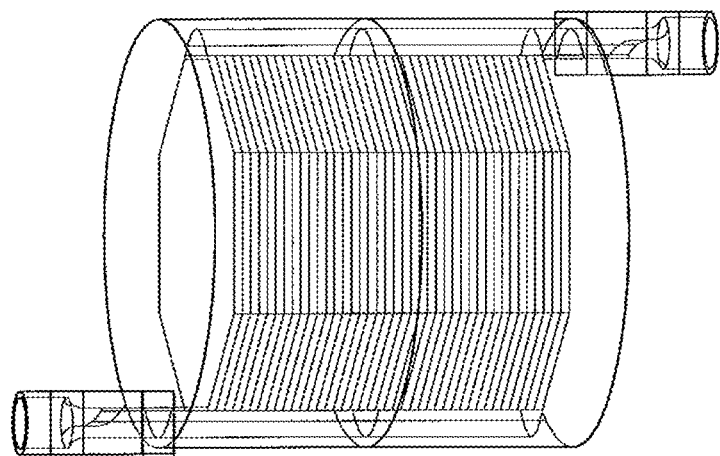
FIG. 1E shows a computational fluid dynamic (CFD) model of a four sub-block ED device.
Figure 1D:
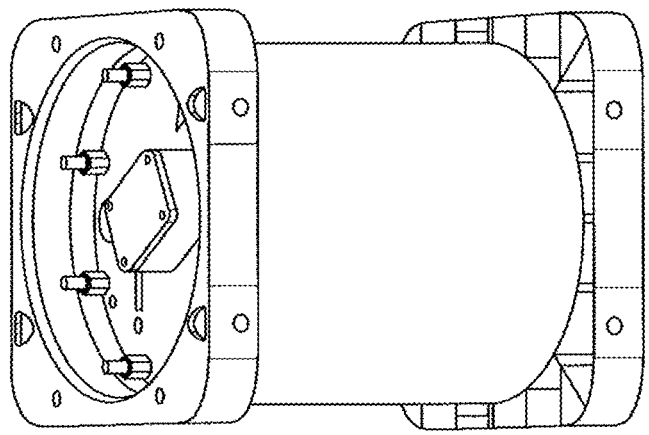
FIG. 1D shows an assembled ED device with an opaque shell.
Figure 1C:
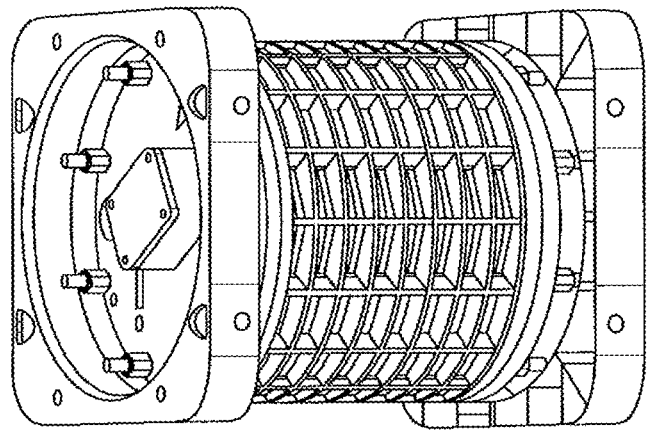
FIG. 1C shows an assembled ED device with a transparent shell.

"Cross-flow" electrodialysis (ED) devices with the dilute and concentrate streams flowing in perpendicular directions have been described in prior patents. The stack of cell pairs in a device can be assembled from one or more modular units, called sub-blocks. FIG. 1A shows an example of a sub-block. FIG. 1B shows a stack of four sub-blocks before insertion into a housing. As the term is used herein a "cell stack" refers to a single or to a stack of multiple of the sub-blocks. FIG. 1C shows an assembled ED device with a transparent shell. FIG. 1D shows an assembled ED device with an opaque shell. FIG. 1E shows a computational fluid dynamic (CFD) model of a four sub-block ED device.

Figure 2B:
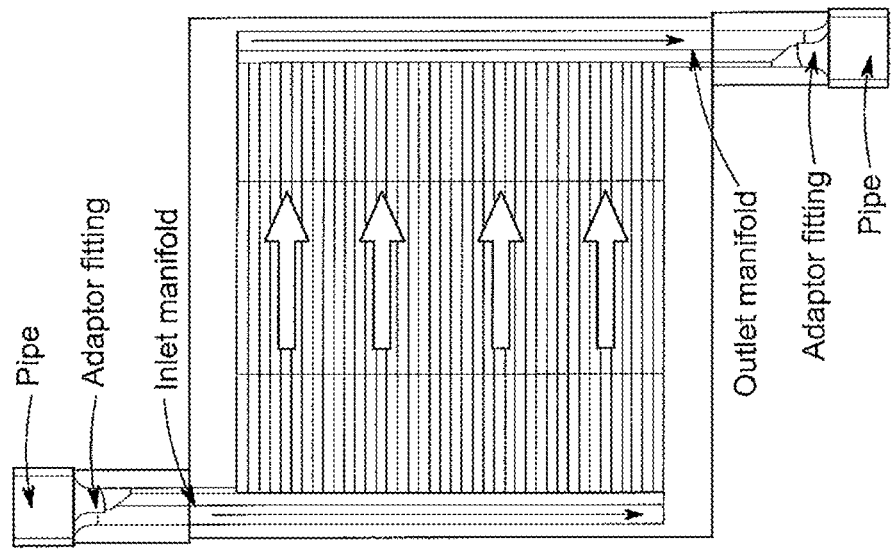
FIG. 2B illustrates fluid being distributed among all of the diluting compartments of an ED device in parallel via an inlet manifold.
Figure 2A:
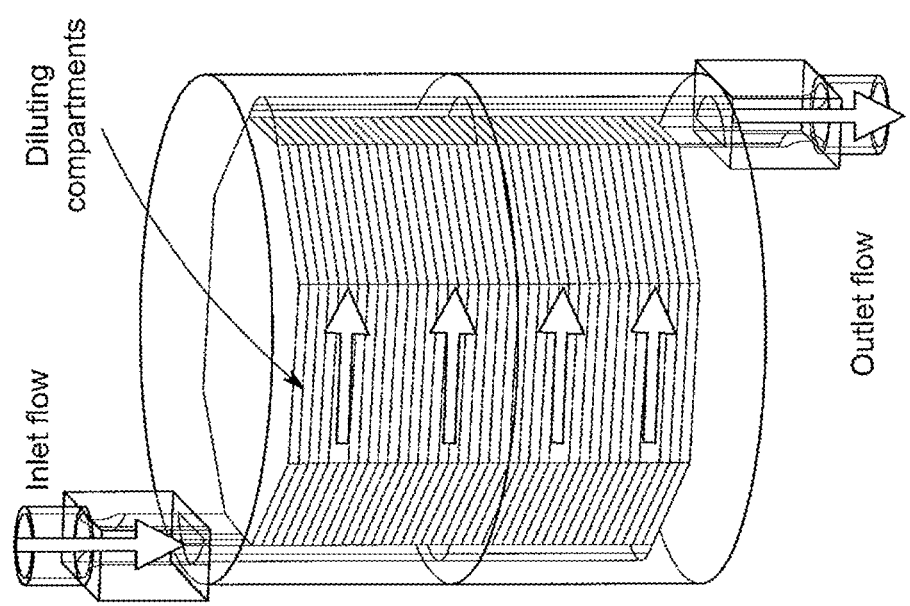
FIG. 2A illustrates fluid being delivered into the diluting compartments of an ED device via an external pipe to an adapter fitting.
Figure 2C:
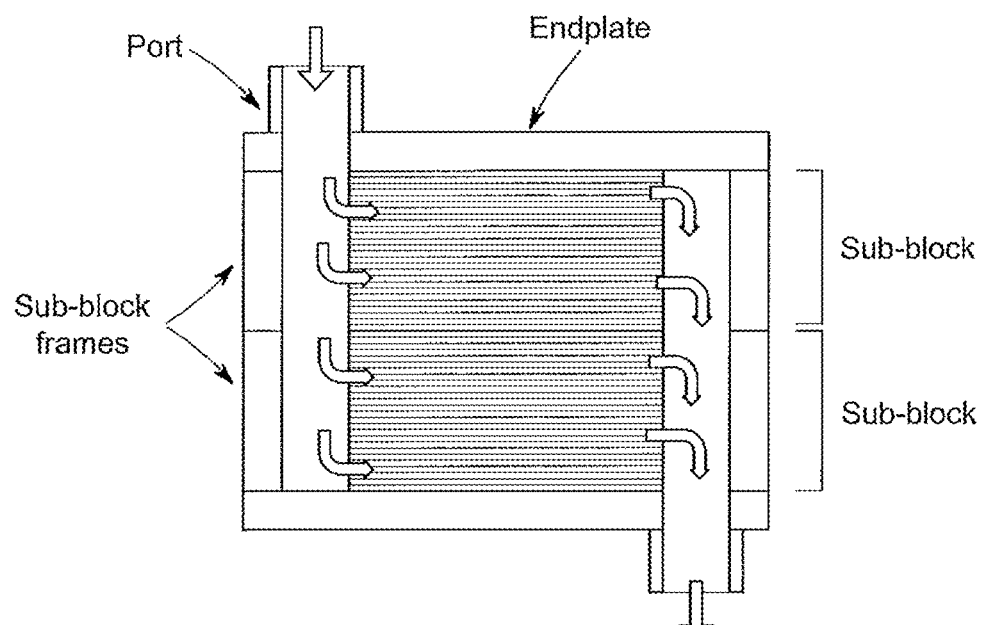
FIG. 2C illustrates a single pass configuration of an ED device.

Fluid can be delivered into the diluting compartments of an ED device via an external pipe to an adapter fitting as illustrated in FIG. 2A. The fluid then distributed among all of the diluting compartments in parallel via an inlet manifold as illustrated in FIG. 2B. Similarly, the product from all the diluting compartments can be collected in an outlet manifold, and delivered via adaptor fitting to an external pipe. The flow into and out of the concentrating compartments can be similarly arranged. This flow configuration is commonly called "single pass." A single pass configuration of an ED device is illustrated in FIG. 2C.

Figure 2D:
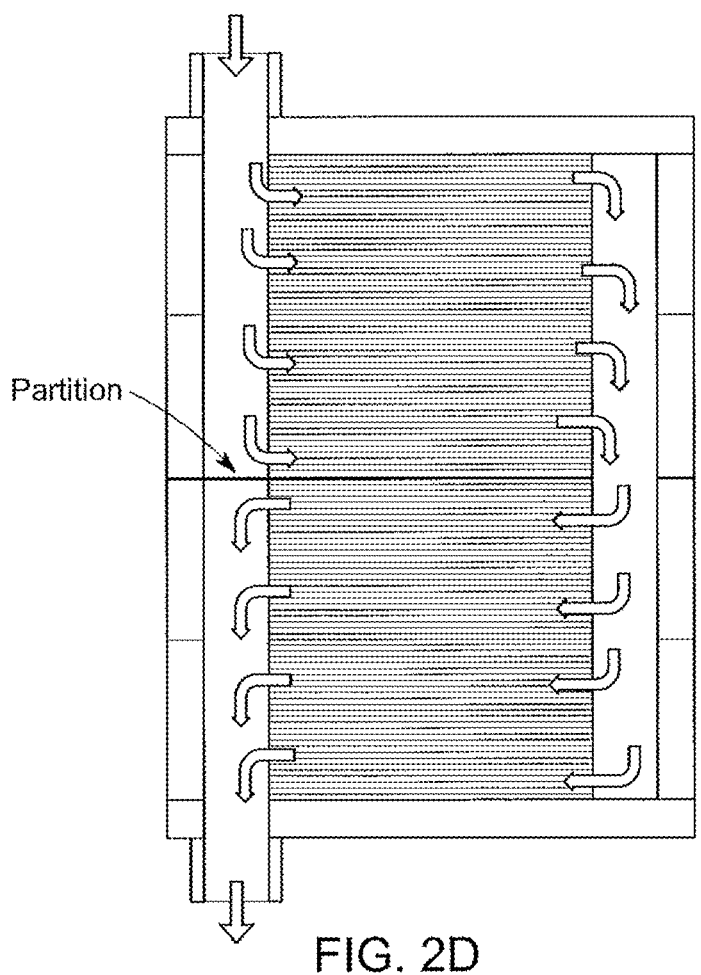
FIG. 2D illustrates a dual pass configuration of an ED device.

Using partitions, the flow through the diluting and concentrating compartments can be arranged in a serpentine manner. FIG. 2D shows a "two pass" arrangement for the diluting stream, for example, and more passes can be achieved by adding partitions. Multiple passes in a device increase flow path length, residence time, ion transfer, and ion removal, while still maintaining the velocity in an optimal process range.

Current efficiency for a cell pair in an ED device can be defined as follows:

$$\eta_i = \frac{\left[q_{di}\left(\frac{1}{2}\sum_i C_i|z_i|\right)_{in} - q_{do}\left(\frac{1}{2}\sum_i C_i|z_i|\right)_{out}\right]F}{I} = 100\% \quad (1)$$

where:
$q_{di}$=flow rate per dilute compartment at inlet
$q_{do}$=flow rate per dilute compartment at outlet
$C_i$=concentration of ion i
$\eta_i$=current efficiency
$|z_i|$=absolute value of valence of ion I (for example $z_i$-1 for $Na^+$)
F=Faraday's constant=96485 Coulomb/equiv
I=current
Subscripts in=at inlet out=at outlet In an ideal ED device, all of the applied current flows through each cell pair in series, the ion exchange membranes are perfectly selective, there are no mechanical cross-leaks between the dilute and concentrate, and there are no external leaks. The current efficiency, defined by Equation 1, is therefore 100%.

Figure 3:
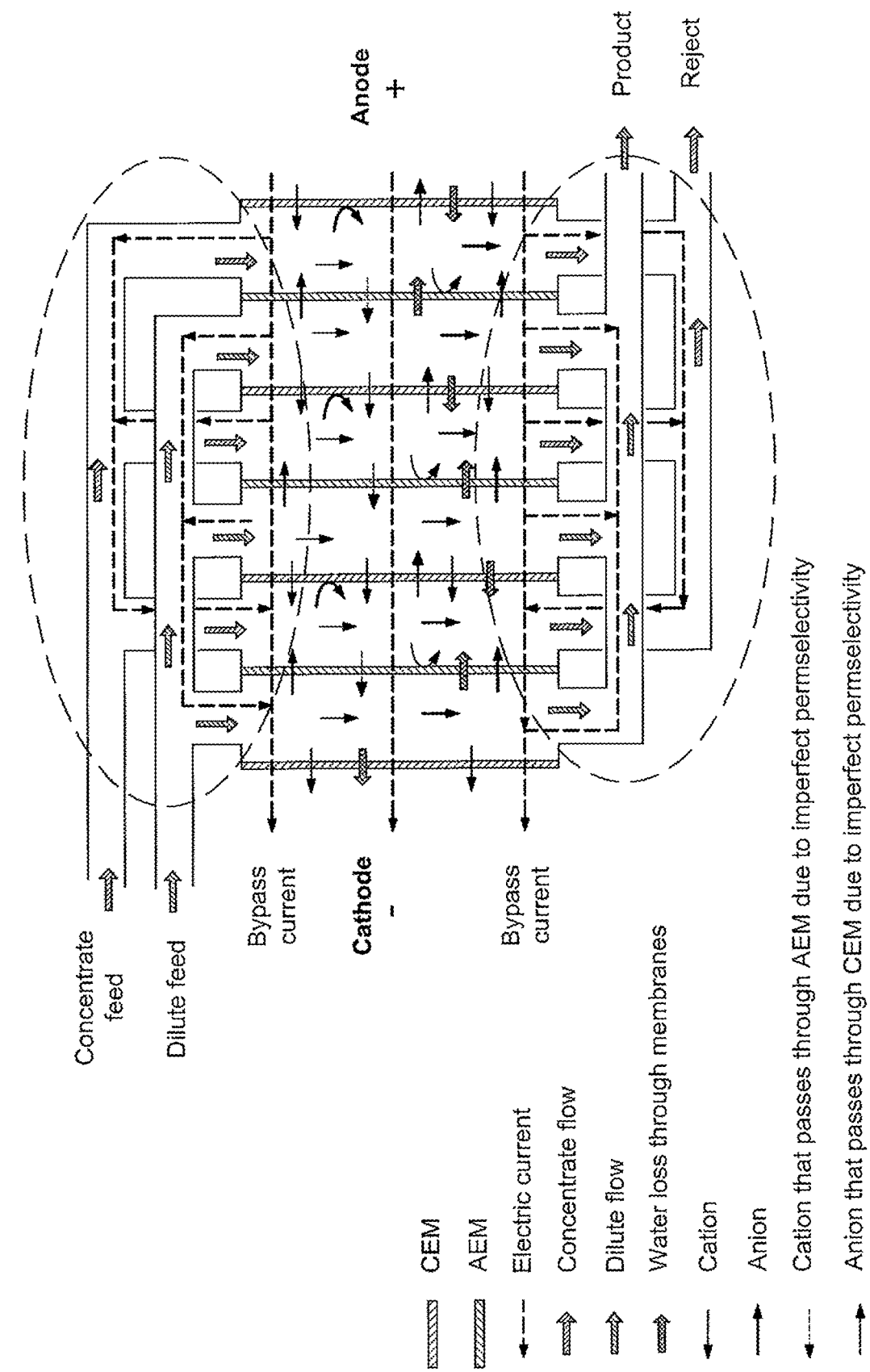
FIG. 3 illustrates a non-ideal ED process with inefficiency and water loss.

In an actual ED device, the current efficiency would not be 100%, because the membranes are not perfectly selective. A cation exchange membrane with a selectivity of 98%, for example, would result in approximately 98% of the current carried by cations transferred out of the dilute to the concentrate, and 2% of the current carried by anions transferred back into the dilute from the concentrate. The current efficiency would therefore decrease by about 2%. Mechanical cross-leaks from the concentrate into the dilute would also reduce the net ion transfer rate out of the dilute, and therefore the overall current efficiency. Further, because the solutions flowing into and out of the cell pairs through the inlet and outlet manifolds are conductive, a fraction of the current will bypass the cell pairs by flowing through the manifolds; it would not participate in ion transfer, and the current efficiency would decrease accordingly. FIG. 3 shows a non-ideal ED process with the locations of the current bypass indicated by the dashed ovals.

Figure 4:
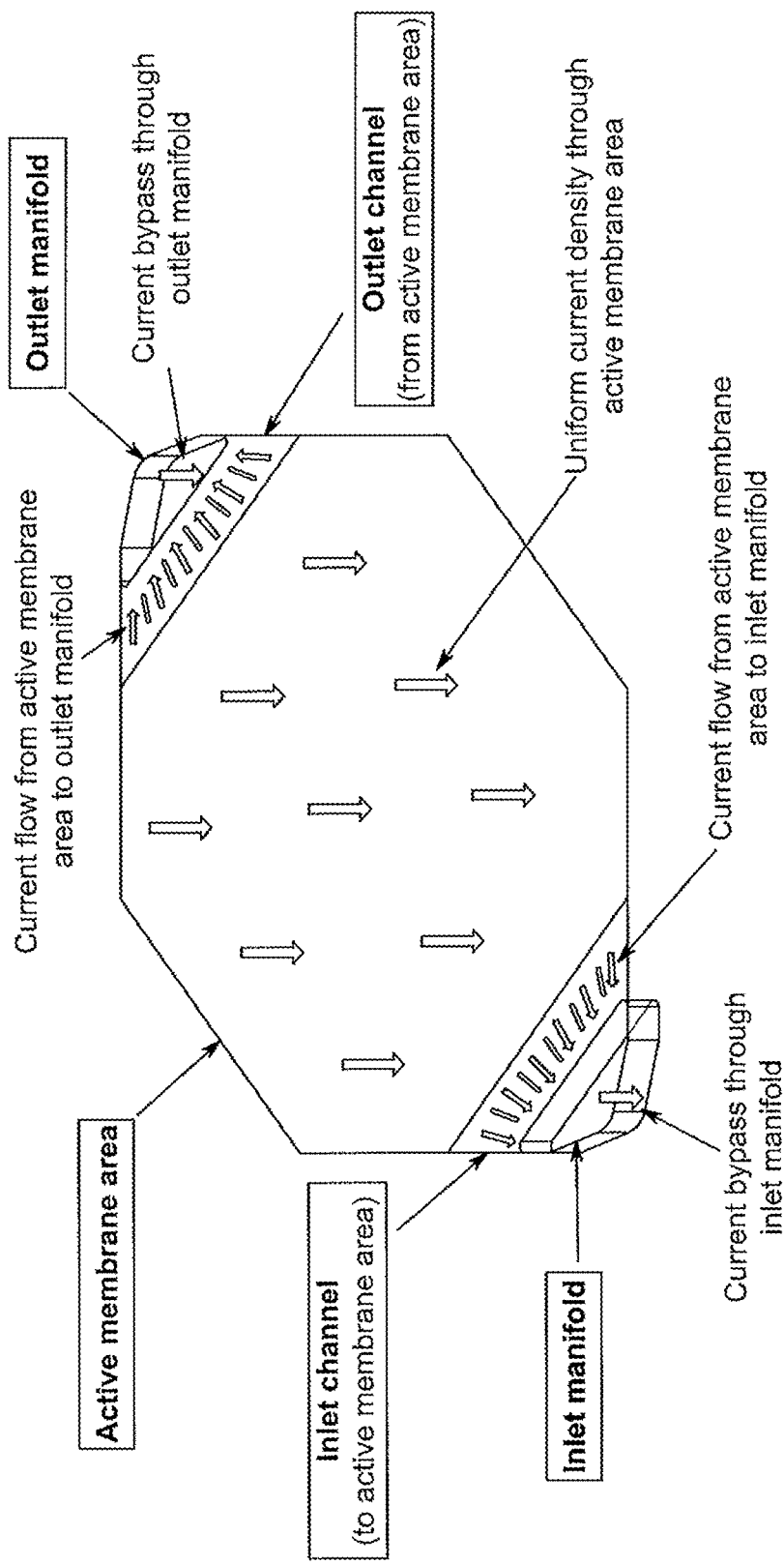
FIG. 4 illustrates a simplistic model for current flow in a dilute or concentrating cell of an ED device.
Figure 5:
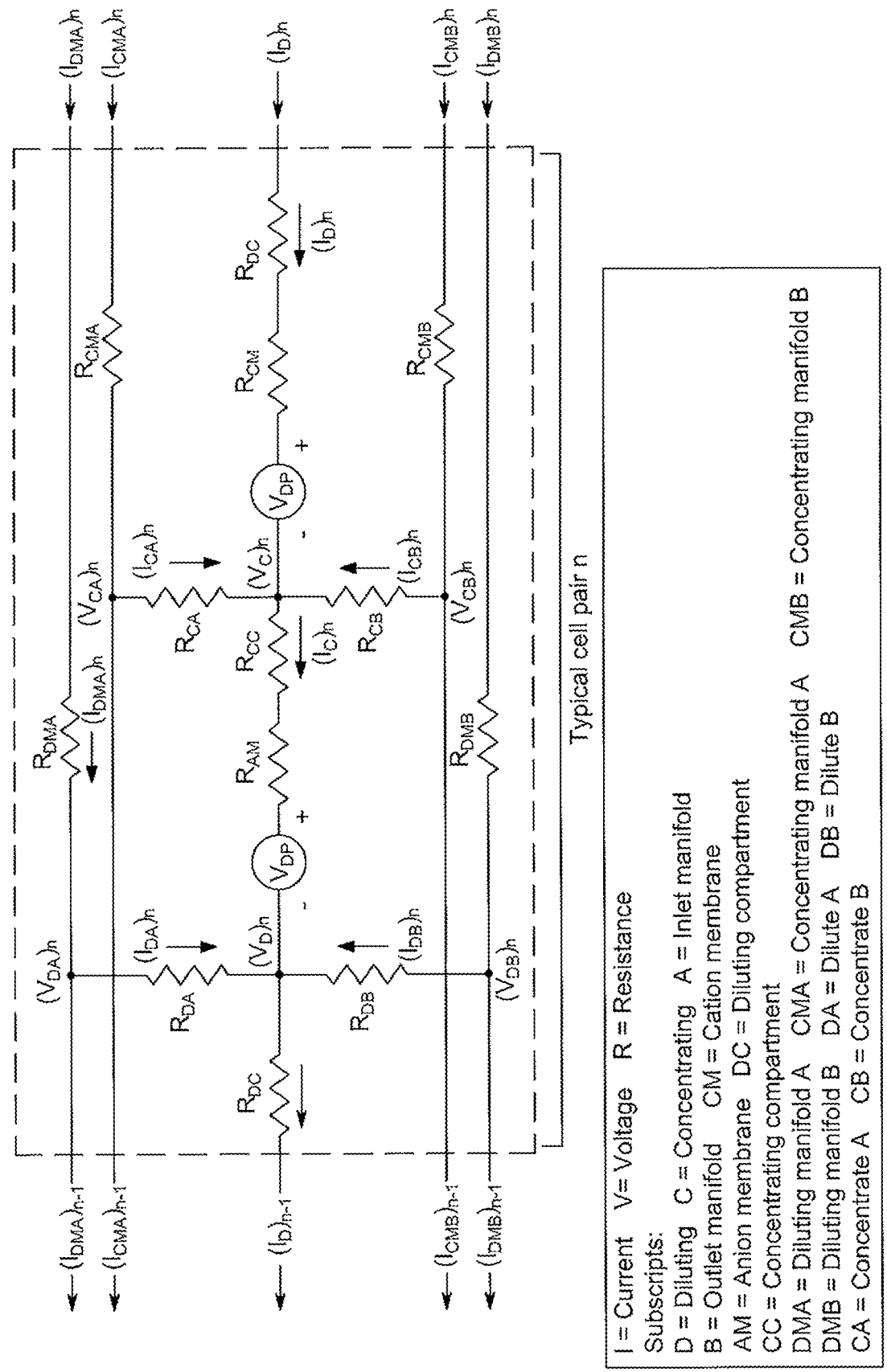
FIG. 5 is an electrical resistance network model for simulation of current flow in an ED device.

A resistor network model was developed to simulate current bypass and estimate current efficiency under different operating conditions in an ED device. The model simplistically assumed that the current flow in a dilute or concentrate cell is as shown in FIG. 4, wherein arrows indicate current flow. The network model for a cell pair is shown in FIG. 5. The voltage sources $V_{DP}$ represent the Donnan potentials across the membranes, which must be included in the voltage drop across a cell pair.

Figure 6:
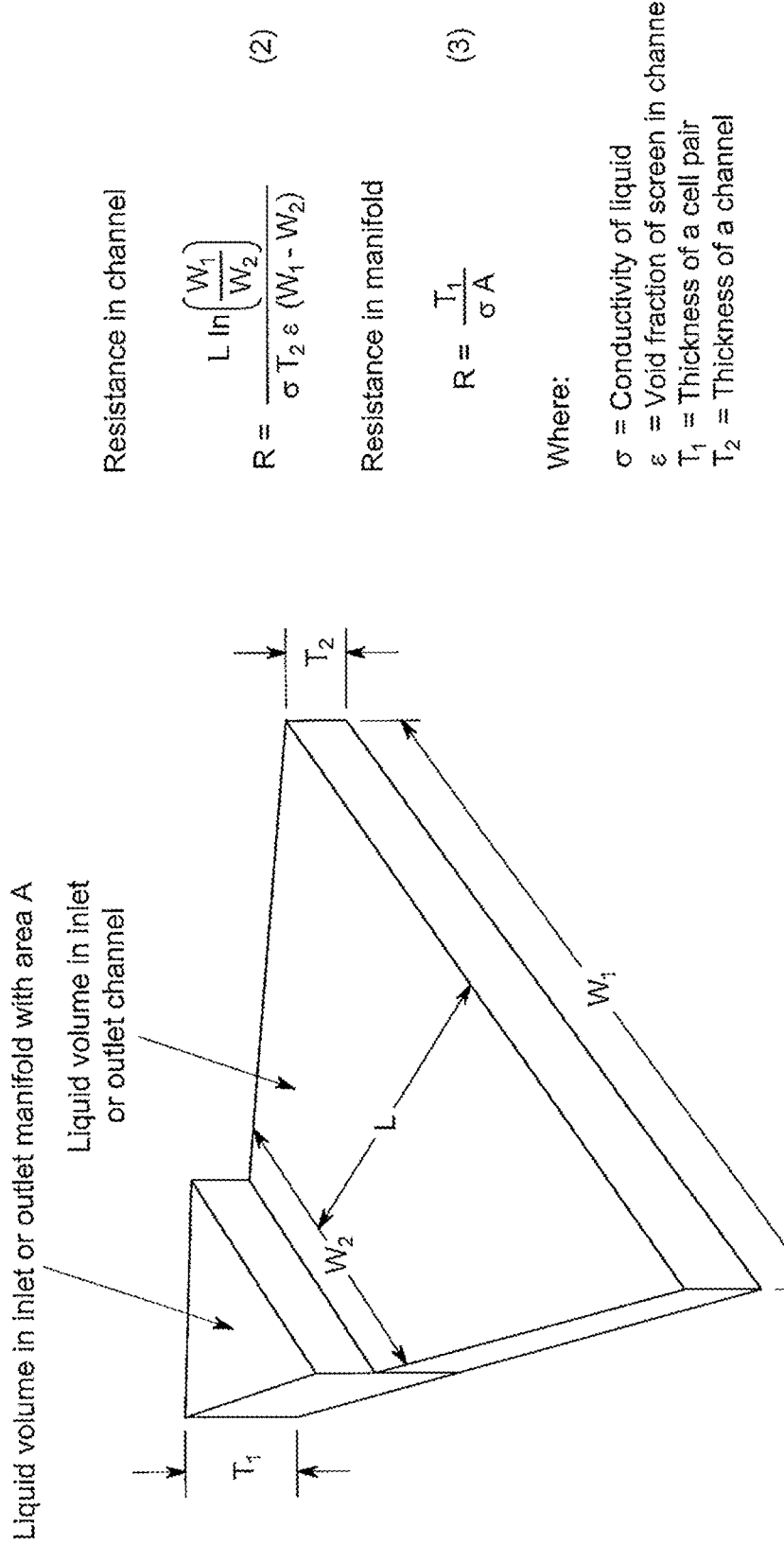
FIG. 6 illustrates calculation of electrical resistance to bypass current for a design with triangular ports.

The electrical resistance within a channel of an ED device may be calculated using Equation 2 in FIG. 6. The resistance increases as the widths of a channel decreases, the distance between the manifolds and the active membrane area increases, the liquid conductivity decreases, and/or the channel thickness decreases. The electrical resistance in a slice of a manifold corresponding to a cell pair may also be calculated using Equation 3 in FIG. 6. The resistance increases as the cross-sectional area of a manifold decreases, the liquid conductivity decreases, and/or the thickness of a manifold slice increases.

As the electrical resistances of the channels and/or manifolds increase, the current that bypasses each cell pair is reduced, and a larger fraction of the total current will preferentially flow through the active membrane area, thus becoming effective in ion transfer.

Simulations have been performed and indicate that the highest current efficiency is that of a single sub-block in a pass. The current efficiency varies within a pass, and is highest in the cell pairs at the ends, and lowest at the cell pair in the middle. (See FIG. 7.) The average current efficiency decreases as the number of cell pairs in a pass increases. (See FIGS. 7 and 8.) Current efficiency is a function of the applied current, dilute and current flow rates, dilute and concentrate inlet concentrations, and temperature. (See FIG. 8.) Current efficiency decreases linearly as the ratio of average concentrate concentration to average dilute concentration increases. (See FIG. 9.) The average concentration is the mathematical average of the inlet and outlet concentrations, respectively.

A CFD model was developed for the previously described four sub-block, single pass, cross-flow ED device as illustrated in FIGS. 2A and 2B. This model will subsequently be referred to as the base design.

Figure 10B:
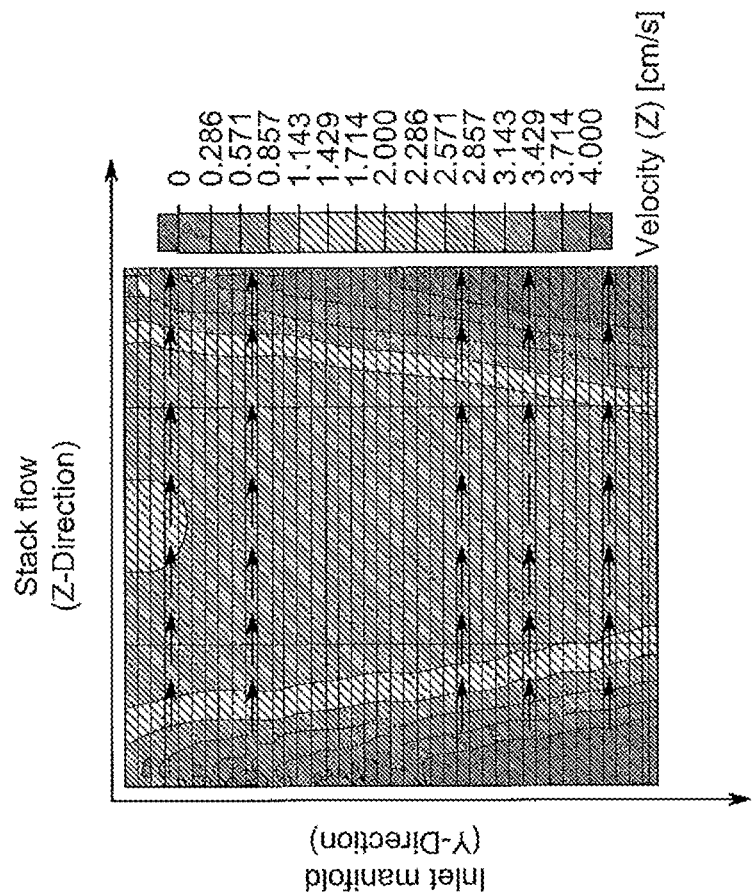
FIG. 10B illustrates results of a CFD simulation of flow in a stack of the four sub-blocks of the base design of FIG. 10A.
Figure 10A:
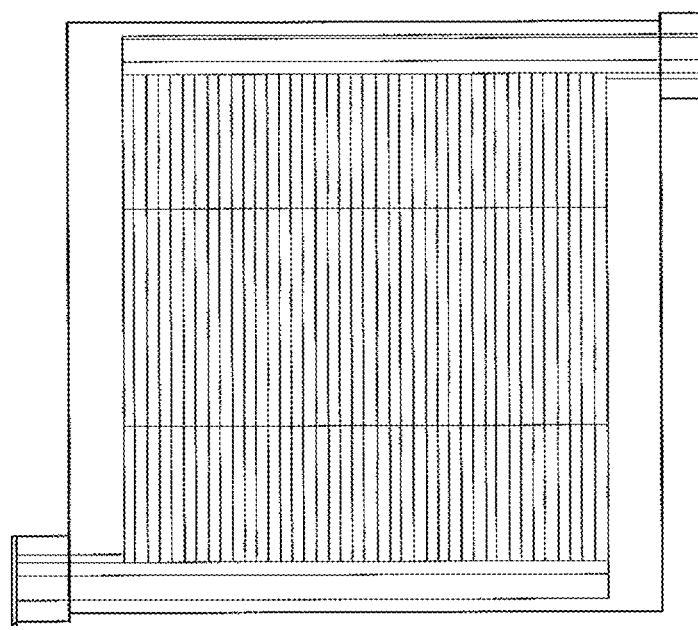
FIG. 10A is a cross-section of a base design of an ED device.
Figure 10C:
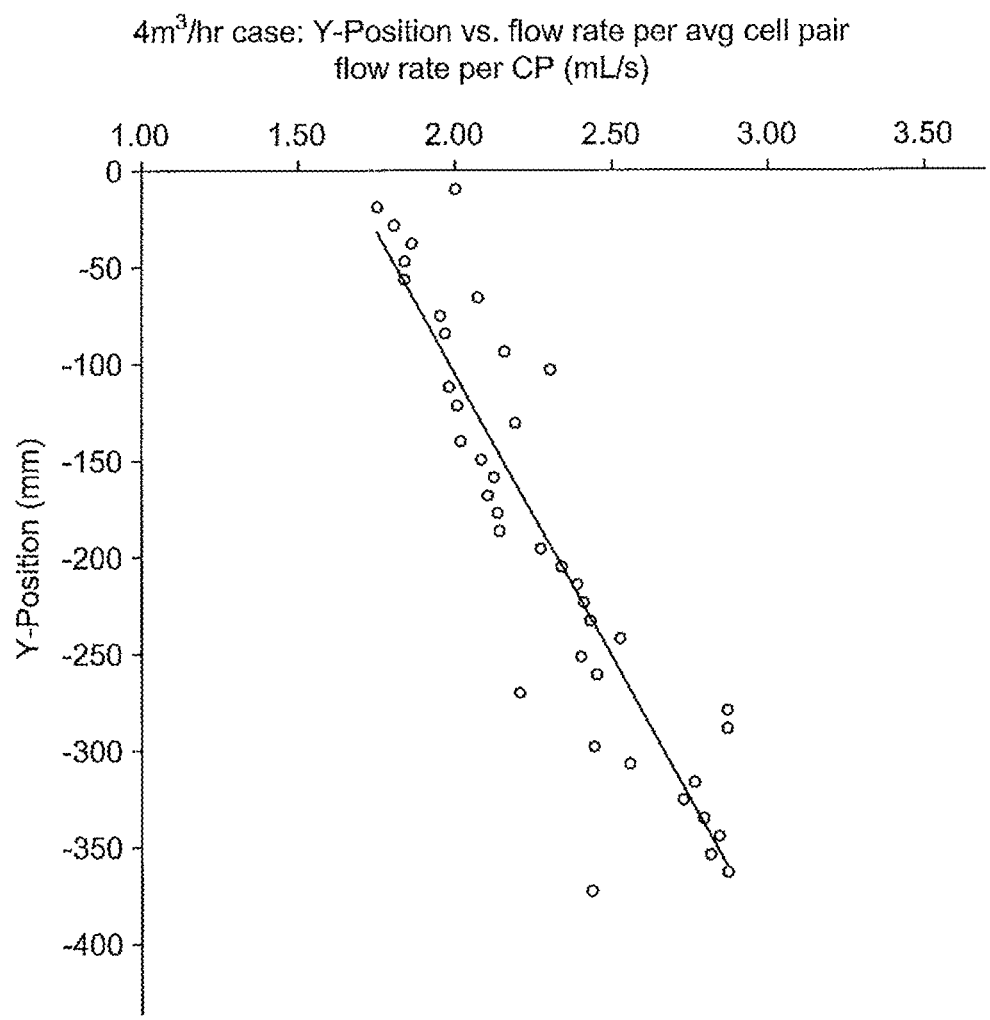
FIG. 10C is a graph illustrating vertical position vs. flow rate through cell pairs in the base design of FIG. 10A.

FIG. 10A shows a center cross-section of the base design. To simplify the computation, each 100 cell pair sub-block was divided into 10 sections; each section represents 10 cell pairs. A flow simulation was then performed on this geometry. As can be seen in the plot illustrated in FIG. 10B, the Z-component of flow velocity through each cell in the ZY-plane is non-uniform, resulting in variation in flow rate per cell pair as shown in FIG. 10C, the flow rate being lowest at the top cell pairs near the fluid entrance to the manifold.

Figure 11A:
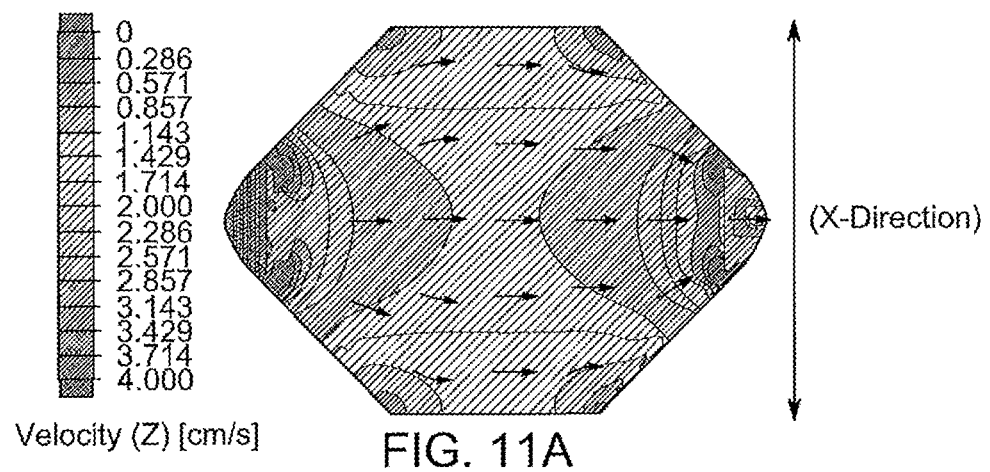
FIG. 11A illustrates of a CFD simulation of flow in an uppermost cell pair in the base design of FIG. 10A.
Figure 11B:
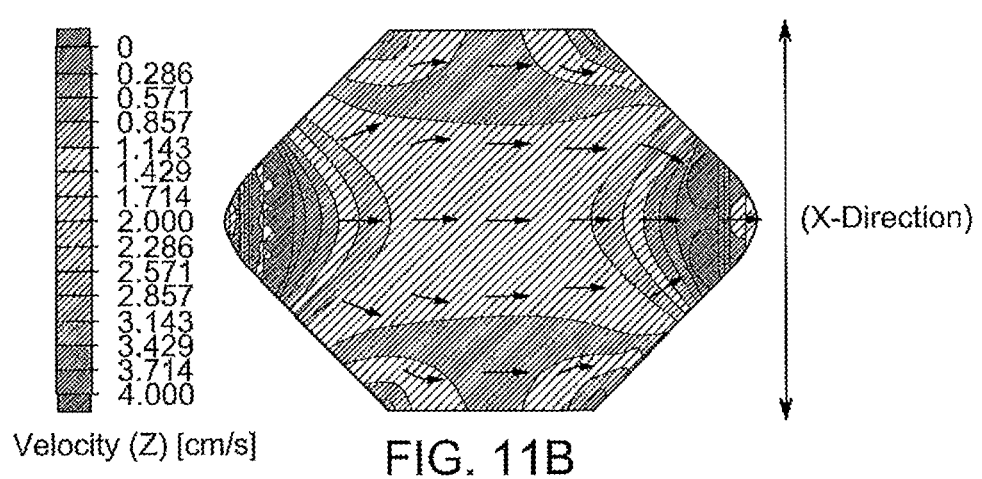
FIG. 11B illustrates of a CFD simulation of flow in an central cell pair in the base design of FIG. 10A.
Figure 11C:
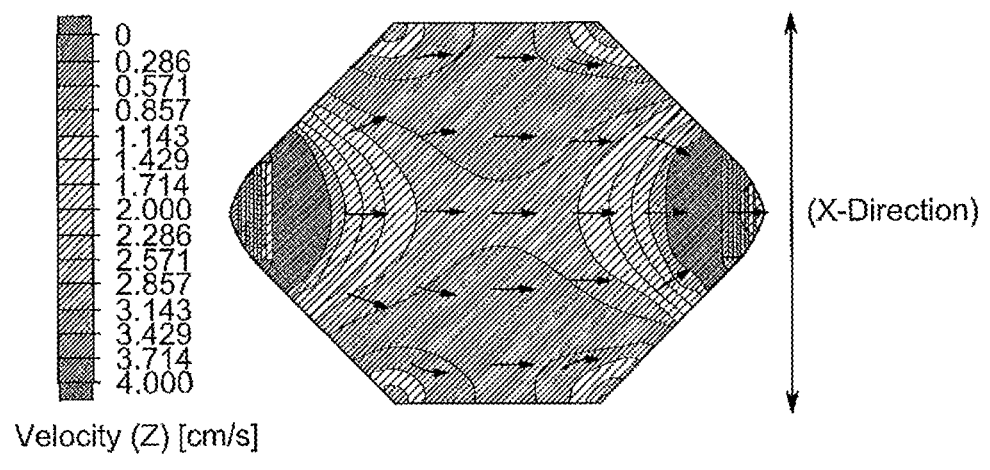
FIG. 11C illustrates of a CFD simulation of flow in an lowermost cell pair in the base design of FIG. 10A.

The distribution of Z-velocity was further characterized using ZX-section planes through the top, middle, and bottom of the stack (FIGS. 11A-11C), with the bulk Z-velocity in the top section approximately half that of the bottom.

Figure 7:
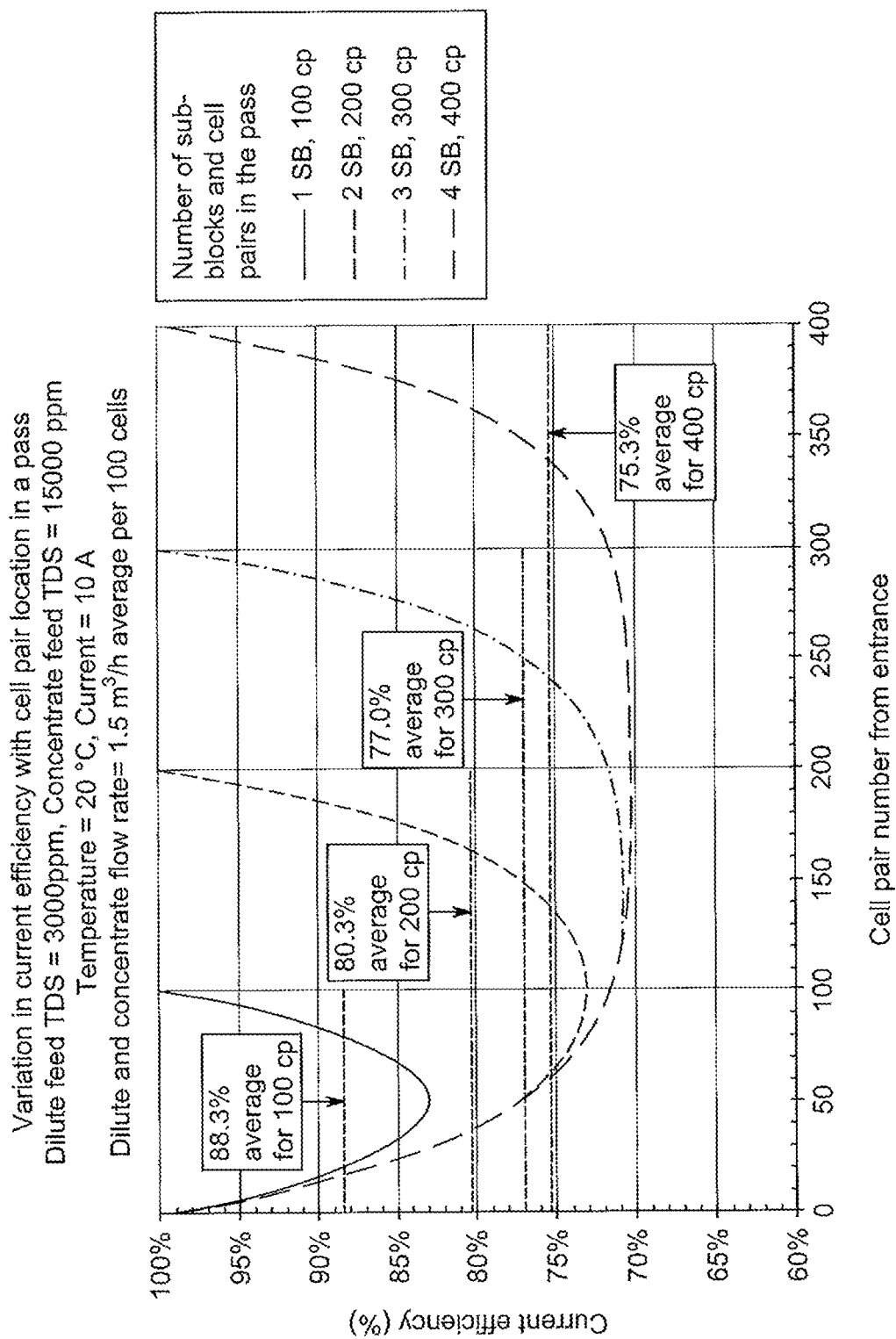
FIG. 7 is a chart illustrating an example of variation in current efficiency with cell pair location in a pass.

As shown in FIG. 7, the current efficiency, and therefore the fraction of current that flows through the membranes, is highest in the cell pairs at the top and bottom ends of a pass. A higher current density will increase the risk of both current limiting and scaling in zones with low flow velocity. Furthermore, lower flow rate through the initial diluting cells of a pass will prevent these cells from operating at their highest current efficiency for salt removal. It would be advantageous, therefore, to ensure that all cell pairs are optimized for flow.

As discussed previously, the fraction of applied current that bypasses the stack of cell pairs through the manifolds can be reduced by increasing the electrical resistance in the channels and manifolds. Previous designs have been proposed which decrease the current bypass by reducing the cross-sectional area of the inlet and outlet manifolds. Although effective at improving current efficiency, these changes result in an increase in pressure drop through the manifolds and across the ED device.

Figure 8:
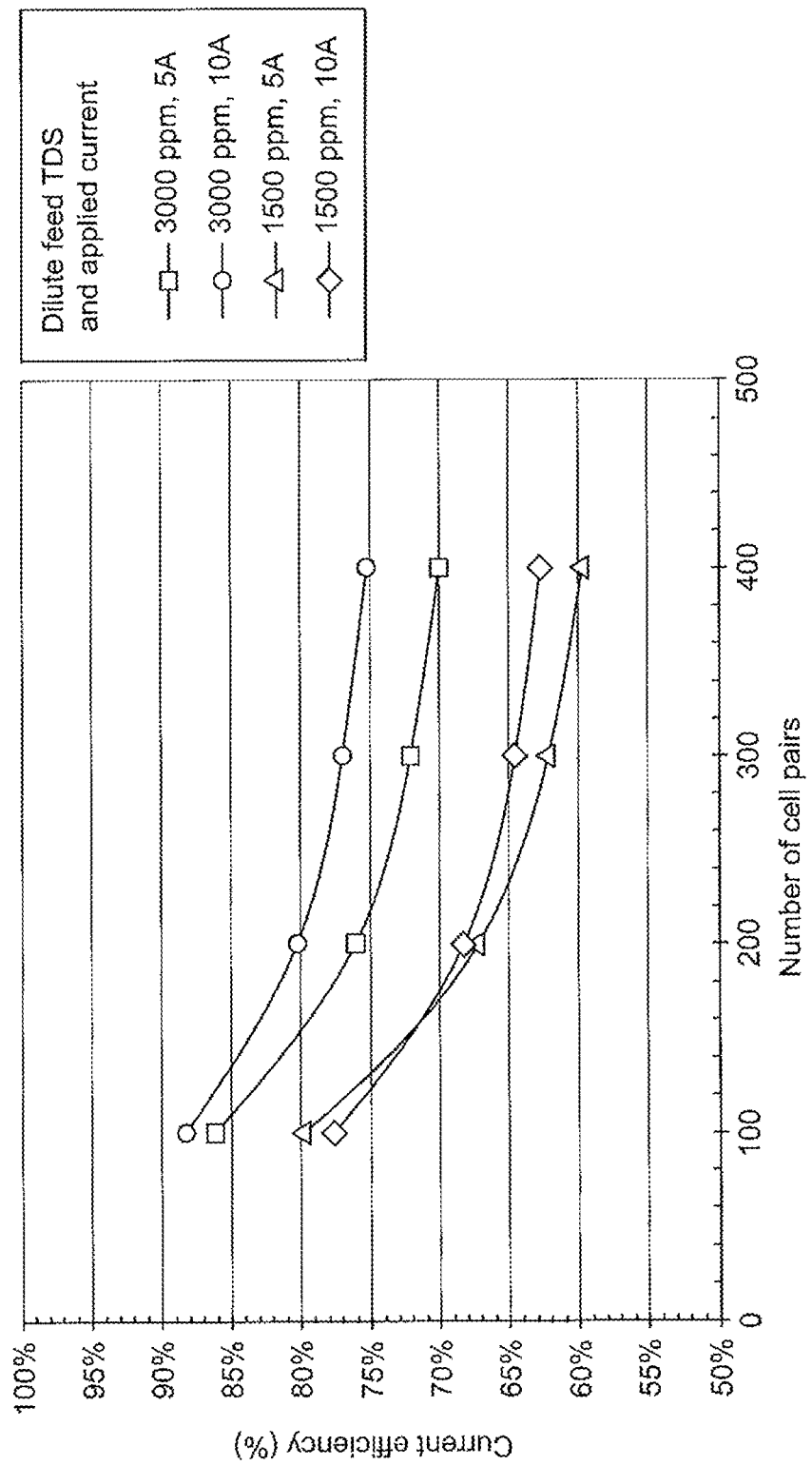
FIG. 8 is a chart illustrating an example of average current efficiency as a function of number of cell pairs in a pass.
Figure 9:
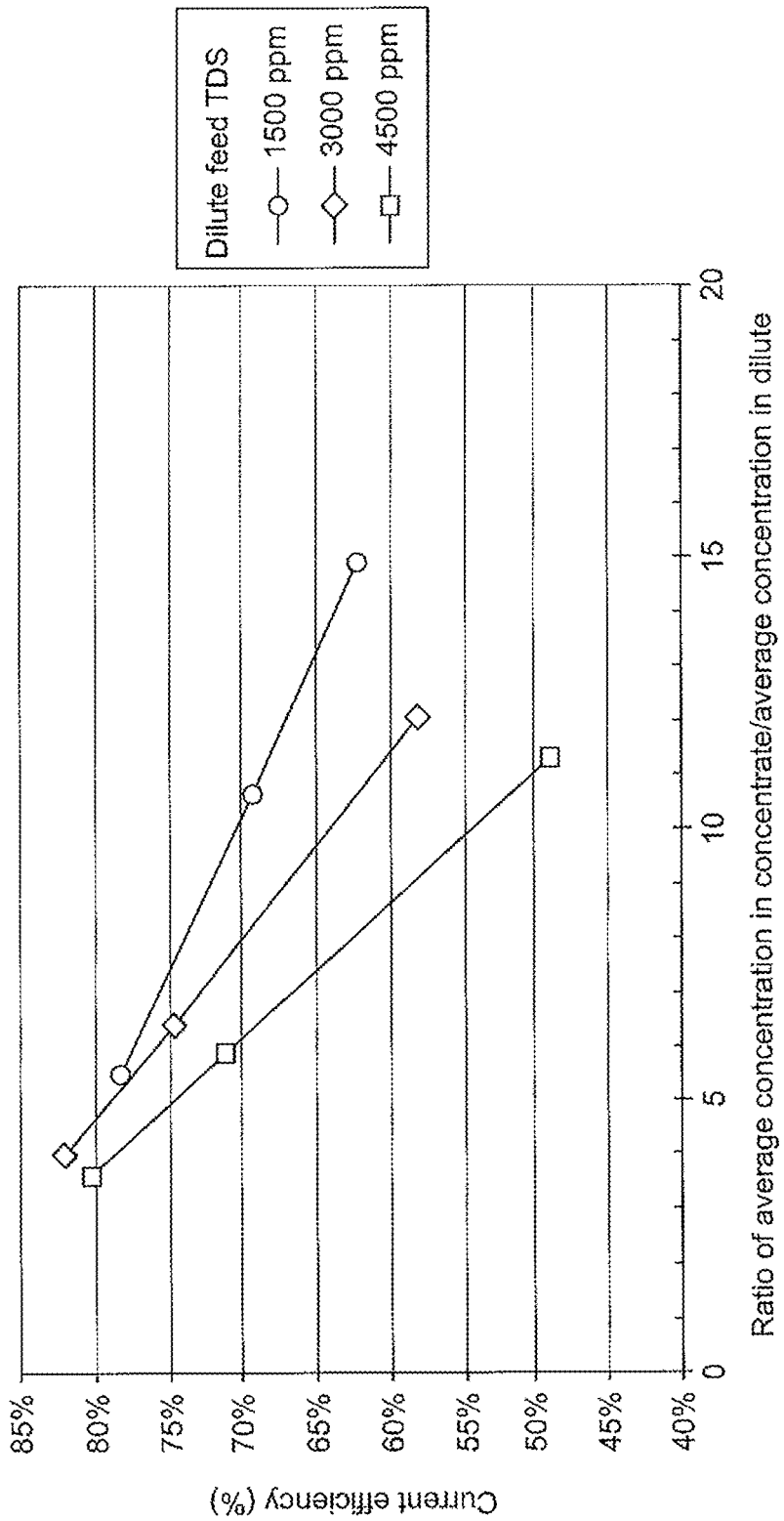
FIG. 9 is a chart illustrating an example of average current efficiency as a function of dilute feed concentration and ratio of average concentration in concentrate/average concentration in dilute.

FIGS. 7 and 8 show that the current efficiency decreases as the number of cell pairs in electrical communication with a common set of manifolds increases.

In the ideal design of a fluidic manifold, fluid resistances will be minimized, while the electrical resistance to bypass current will be maximized. This can be accomplished by operating the sub-blocks fluidically in parallel but electrically isolated from each other except through the cell pairs.

The technical challenges are therefore to decrease current bypass within an individual sub-block, to decrease current bypass through the fluidic manifolds between sub-blocks, to ensure that there is sufficient flow to the first cell pairs in a pass, to improve flow distribution amongst all cell pairs in a pass, and to minimize the pressure required to operate such an ED device. Aspects and embodiments disclosed herein include structures and methods to meet these challenges.

Aspects and embodiments disclosed herein include flow directing features which may be disposed within the fluidic manifolds of ED devices, to maximize current efficiency, normalize flow distribution, and minimize pressure drop.

As the term is used herein, a flow directing feature or a fluid flow director may include or consist of any of conduits, channels, ramps, pipes, tubes, baffles, vanes, or other embodiments. The profile of these features may be a mathematical function, for example: linear, polynomial, trigonometric, logarithmic, conic section, or freely generated.

Designs of fluidic manifolds may consist of the above features forming one or more conduits, directed towards one or more sub-blocks, and where flow within each conduit may be further subdivided through the use of additional flow directing features.

Fabrication of these features may be accomplished through any of a number of techniques, including, but not limited to: 3D-printing, CNC machining, or injection molding.

Figure 12A:
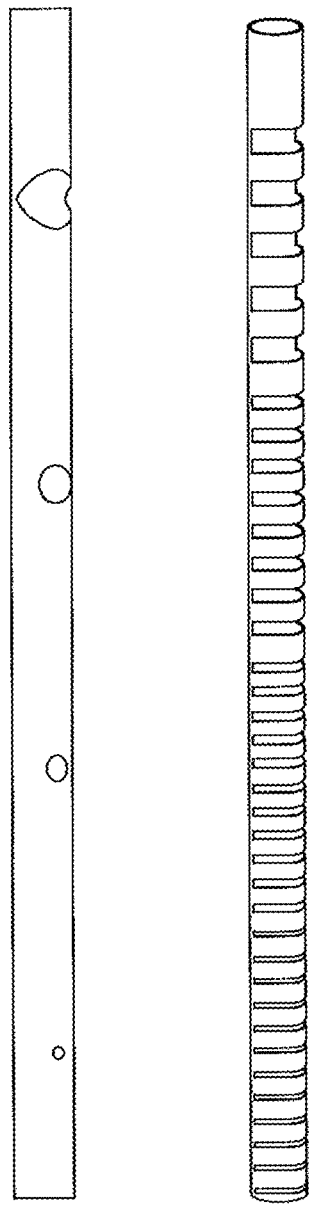
FIG. 12A illustrates flow-directing features for an ED device in the form of tubular conduits.
Figure 12B:
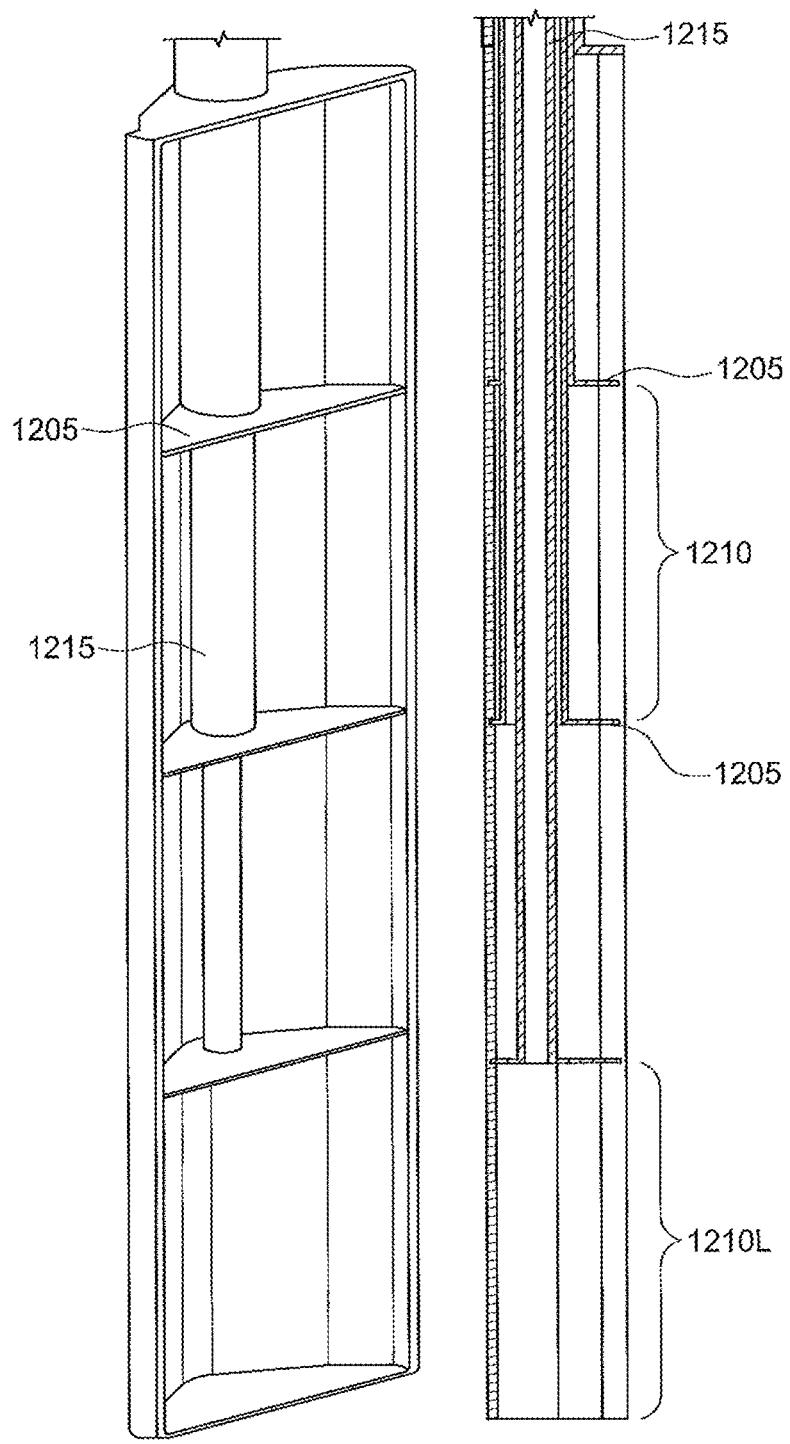
FIG. 12B illustrates flow-directing features for an ED device in the form of concentric tubular conduits with baffles.
Figure 12C:
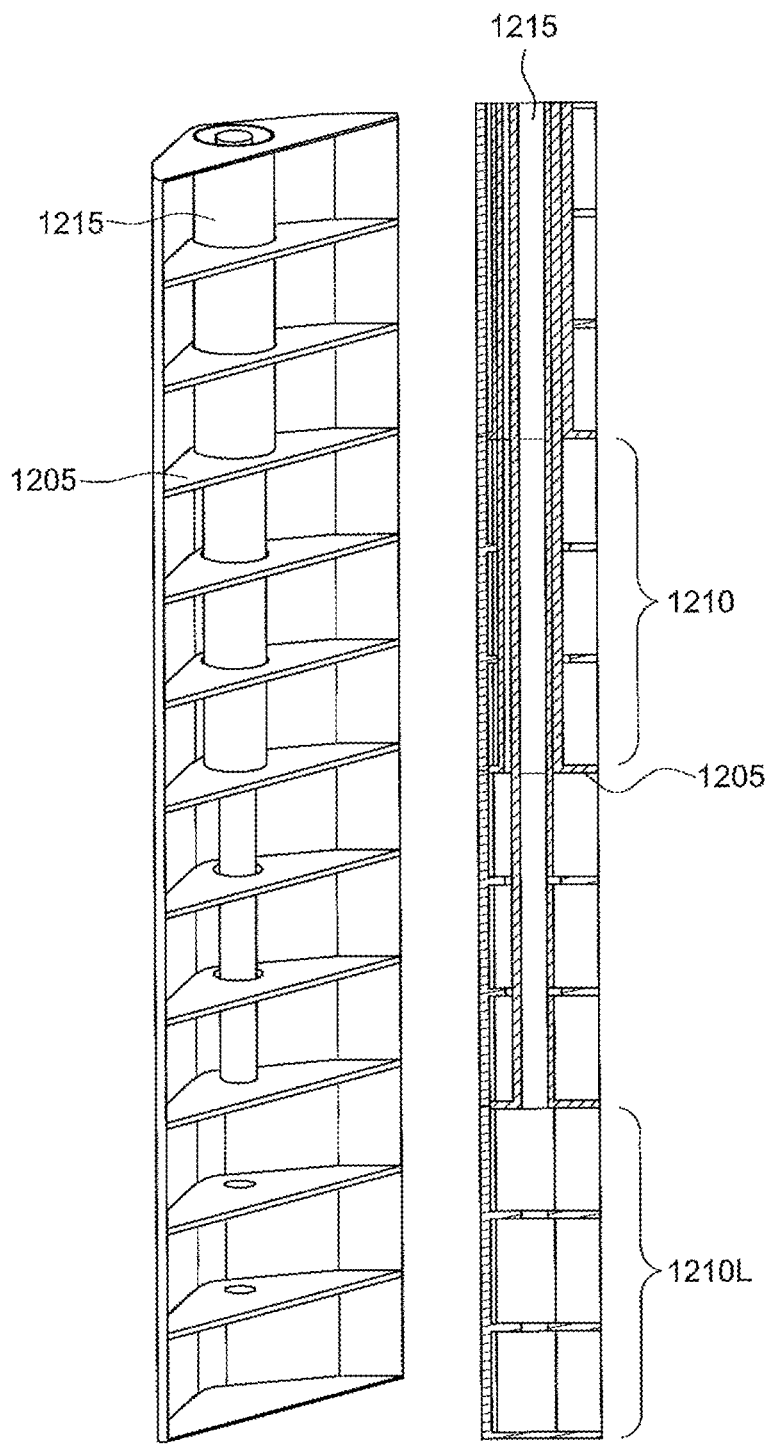
FIG. 12C illustrates other flow-directing features for an ED device in the form of concentric tubular conduits with baffles.
Figure 12D:
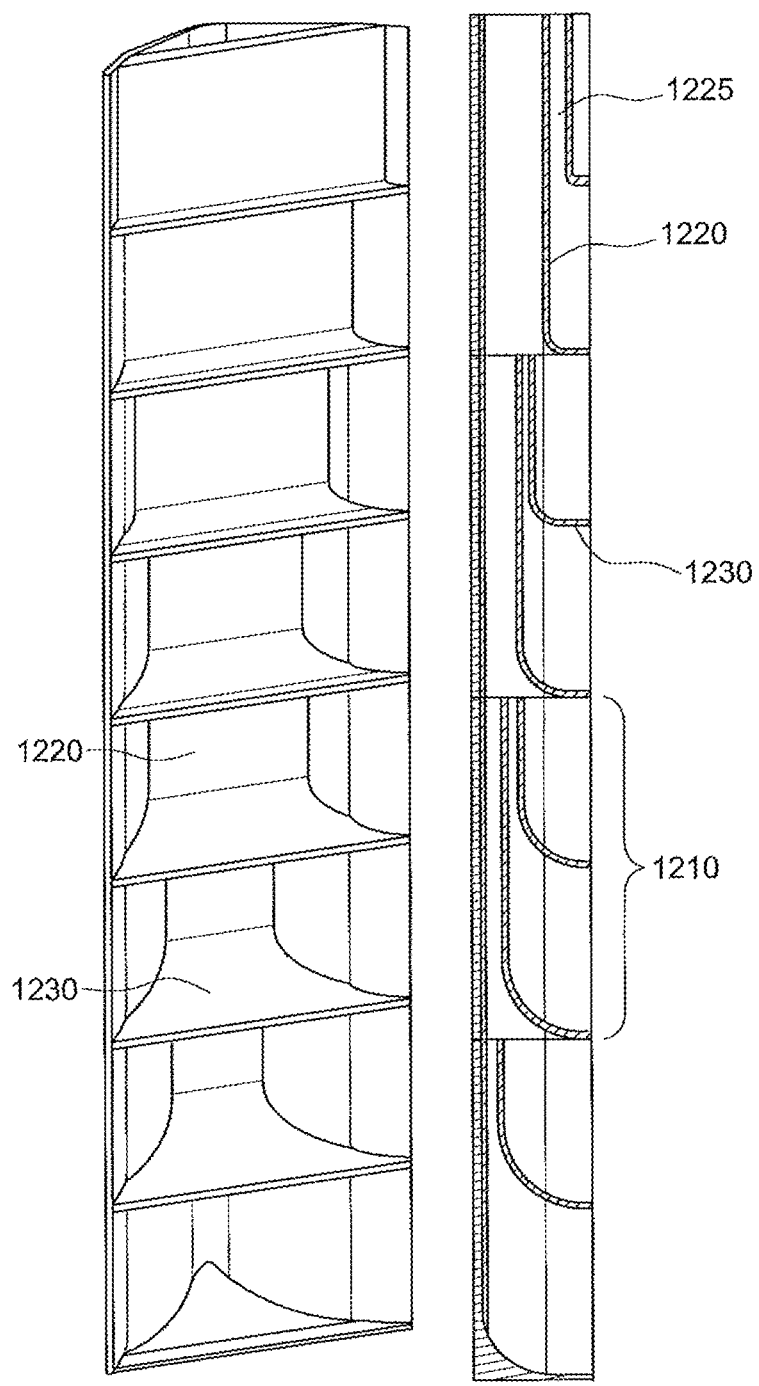
FIG. 12D illustrates flow-directing features for an ED device in the form of parallel conduits with baffles and ramps.
Figure 12E:
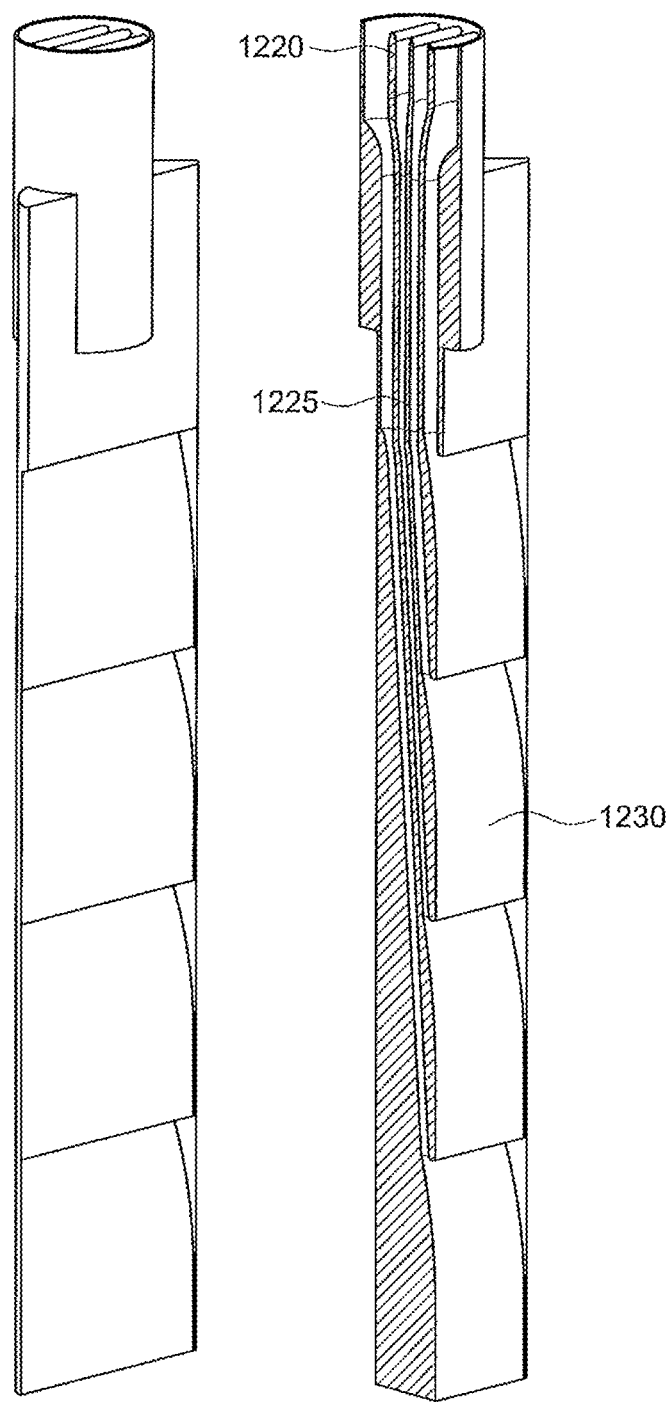
FIG. 12E illustrates other flow-directing features for an ED device in the form of parallel conduits with baffles and ramps.

Examples of fluid flow director may include: tubular fluid conduits (FIG. 12A), concentric tubular fluid conduits 1215 with baffles 1205 (FIGS. 12B and 12C), and parallel conduits 1225 with walls 1220 and ramps 1230 (FIGS. 12D and 12E).

As illustrated in FIG. 12A, pairs of baffles 1205 may define different fluid delivery regions 1210 along a length of the fluid flow director. In other embodiments, for example, as illustrated in FIG. 12B, multiple baffles 1205 may be included in a single fluid delivery region 1210. Individual of the concentric tubular conduits 1215 (which, in other embodiments may have cross-sections other than circular) may deliver fluid to different of the fluid delivery regions 1210. In some embodiments a lowermost fluid delivery region 1210L may not include a fluid conduit 1215. Each fluid delivery region 1210 may deliver fluid to a single sub-module or sub-block (SB1, SB2, SB3, SB4 in FIGS. 13A and 13B) of the cell stack. The sizes, e.g., diameters, of the concentric tubular conduits 1215 and spaces between adjacent concentric tubular conduits 1215 may be selected to deliver predetermined amounts of fluid to different of the sub-blocks or different regions of the cell stack. In some embodiments, the sizes of the concentric tubular conduits 1215 are selected such that a same amount or a substantially same amount of fluid flow or fluid flow velocity is provided to the different sub-blocks or different regions of the cell stack. In other embodiments, the sizes of the concentric tubular conduits 1215 are selected such that a same amount or a substantially same amount of fluid flow or fluid flow velocity is provided to a sub-set, for example, sub-blocks or regions in upper and lower regions of the cell stack while a different, for example, lower amount of fluid flow or fluid flow velocity is provided to other sub-blocks or regions in the cell stack, for example, sub-blocks or regions in a central region of the cell stack.

Figure 15A:
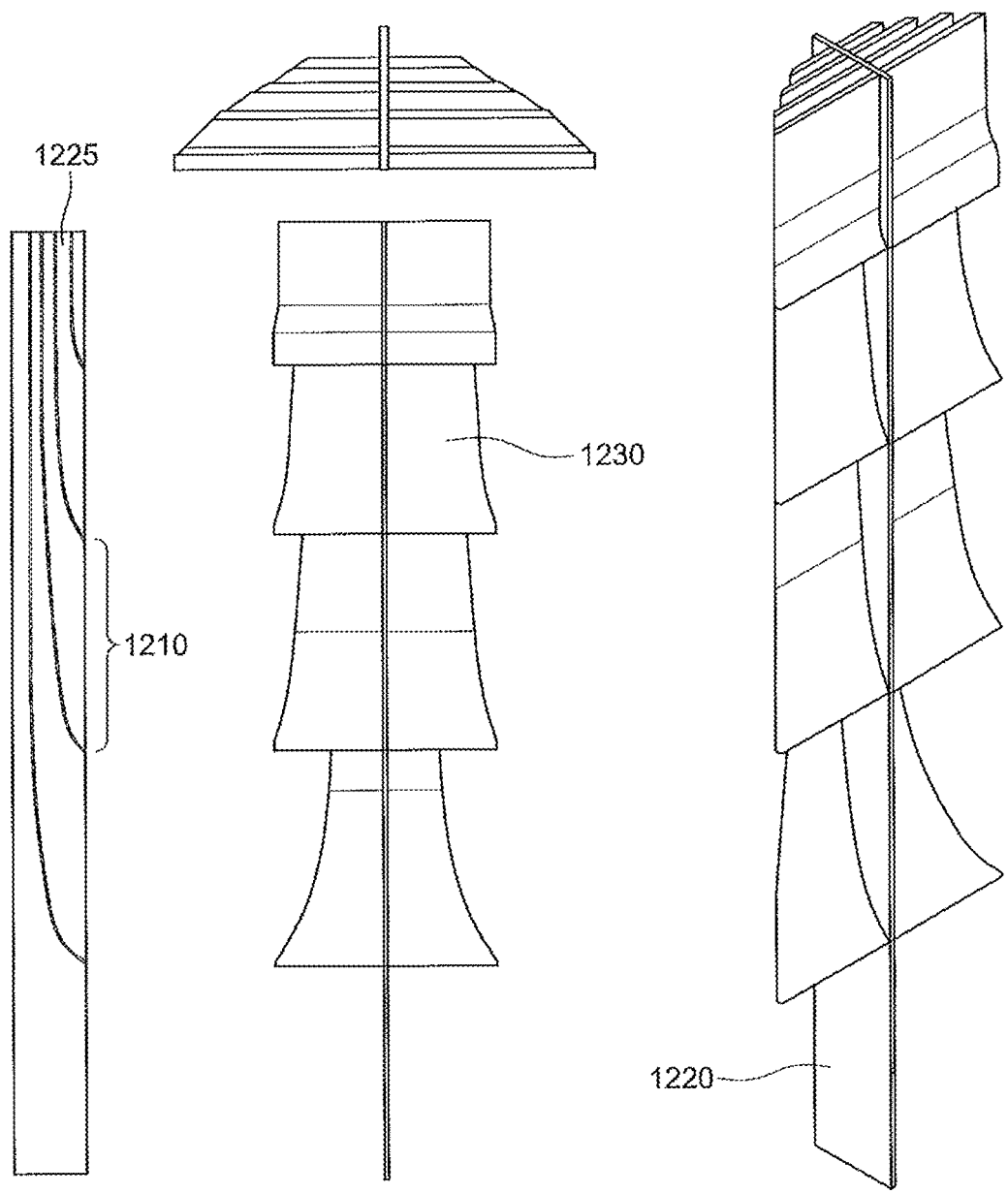
FIG. 15A illustrates side, front, top, and isometric views of a manifold insert for an ED device including fluid conduits defined by linearly profiled baffles and elliptical ramps.

As illustrated in FIG. 12D, embodiments of a fluid flow director may include ramps 1230 located at lower ends of conduits 1225 defined by the walls 1220. The conduits 1225 may terminate at the ramps 1230. The ramps 1230 may be formed of regions of the walls 1120 defining the conduits 1125 that curve toward the cell stack with an axis of curvature on the cell stack side of the walls 1120 (FIG. 12D) or with an axis of curvature opposite the cell stack side of the walls 1120 (FIG. 12E). In some embodiments, as illustrated in FIG. 13B, the ramps 1230 may be horizontally arranged plates that meet the walls 1220 at substantially 90° angles. In other embodiments, for example as illustrated in FIG. 15A, the walls 1220 may form the ramps 1230 by curving along an entirety or substantial entirety of their lengths. As also illustrated in FIG. 15A an additional wall 1220 may divide the fluid delivery regions 1210 defined by the ramps 1230 into two or more portions.

The sizes, for example, length, width, and/or cross-sectional areas of the conduits 1225 may be selected to deliver predetermined amounts of fluid to different of the sub-blocks or different regions of the cell stack. In some embodiments, the sizes of the conduits 1225 are selected such that a same amount or a substantially same amount of fluid flow or fluid flow velocity is provided to the different sub-blocks or different regions of the cell stack. In other embodiments, the sizes of the conduits 1225 are selected such that a same amount or a substantially same amount of fluid flow or fluid flow velocity is provided to a sub-set, for example, sub-blocks or regions in upper and lower regions of the cell stack while a different, for example, lower amount of fluid flow or fluid flow velocity is provided to other sub-blocks or regions in the cell stack, for example, sub-blocks or regions in a central region of the cell stack.

Figure 13A:
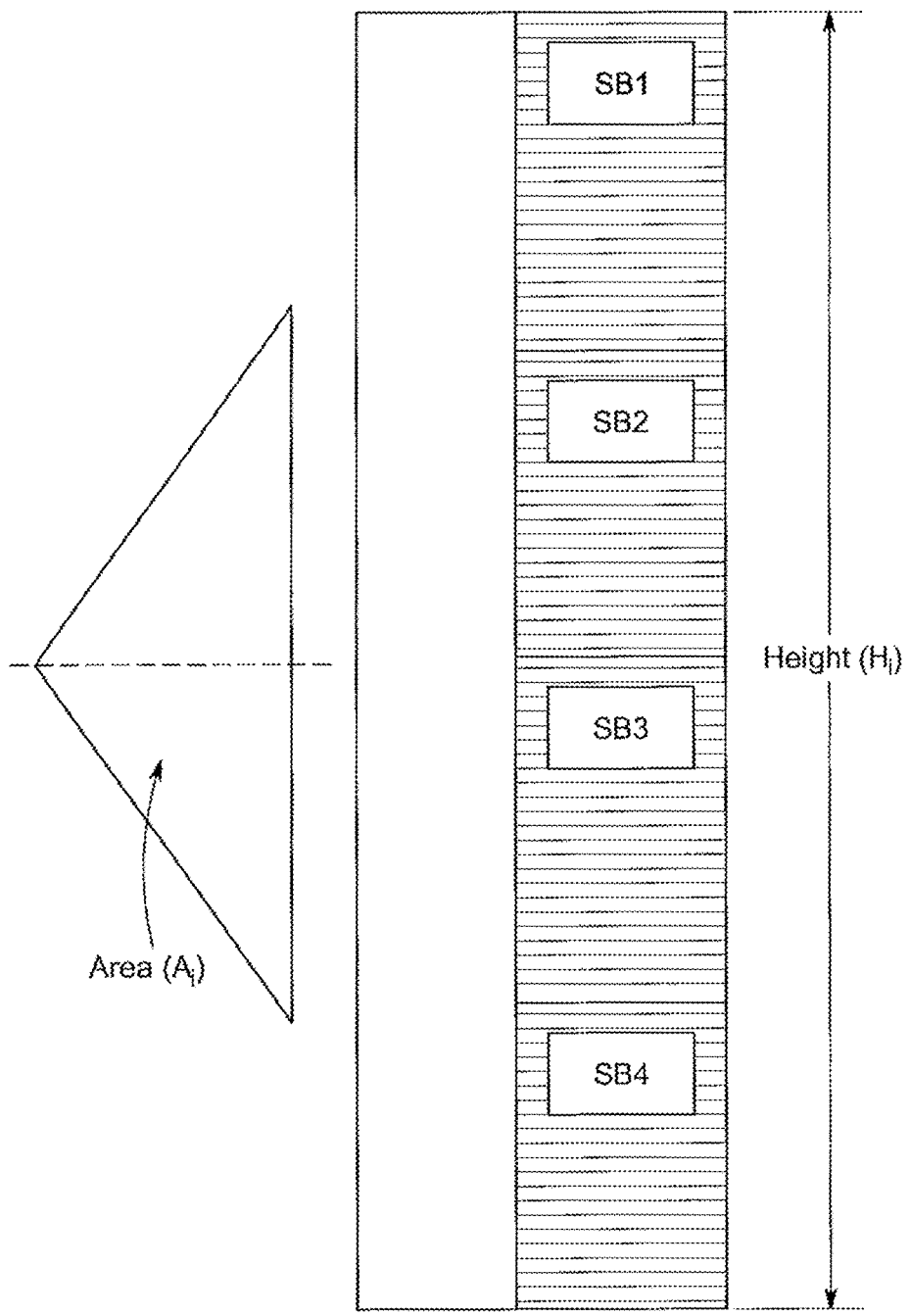
FIG. 13A illustrates the configuration of the manifold in the base design of FIG. 10A.
Figure 13B:
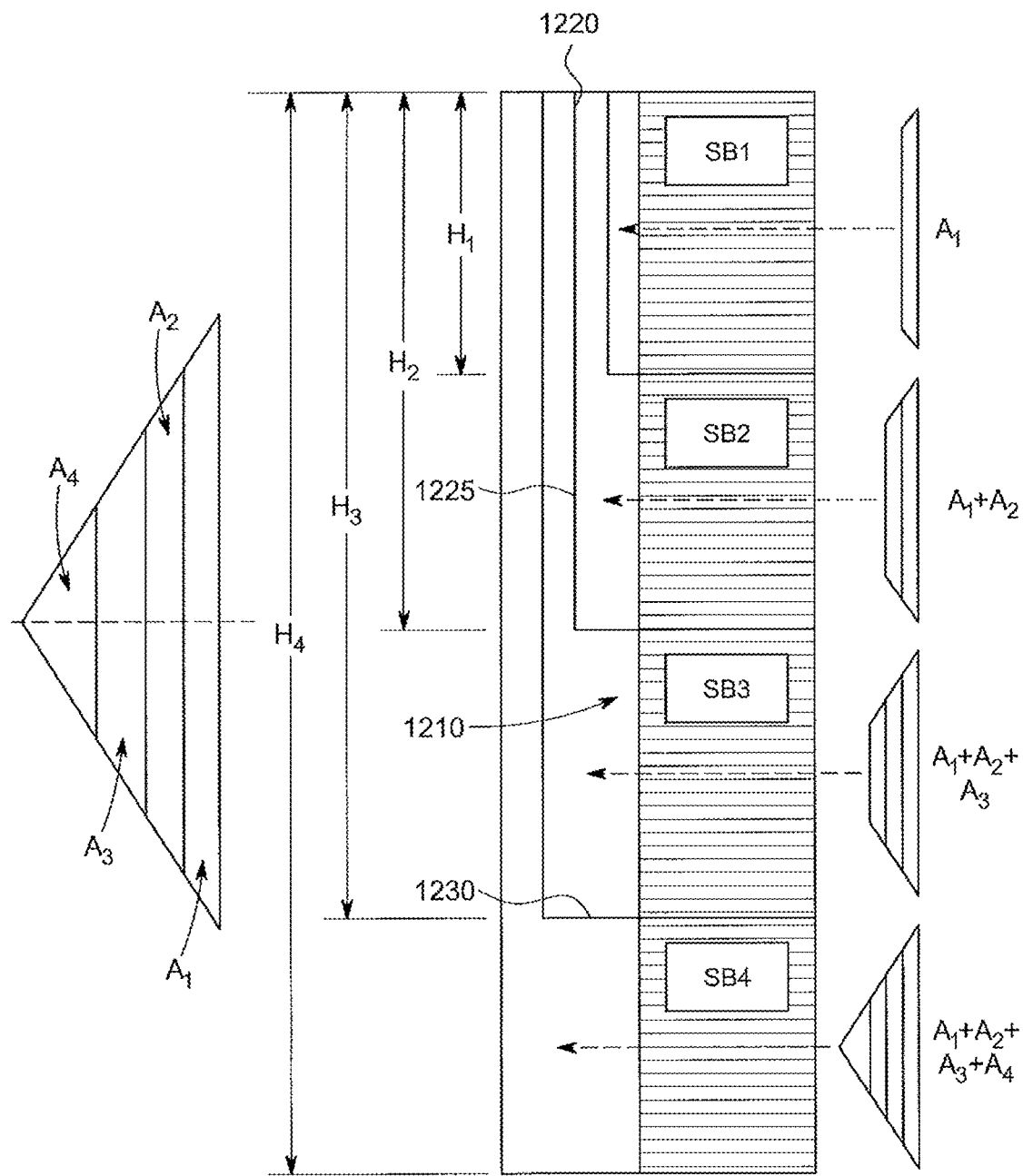
FIG. 13B illustrates a modified manifold including features that increase current efficiency and improve flow distribution.

In the base design illustrated in FIG. 10A, the inlet manifold has an initial cross-sectional area A, and stack height H, (FIG. 13A). In the embodiment illustrated in FIG. 13B, the flow manifold has been divided into four conduits 1125, with cross-sectional areas $A_1$, $A_2$, $A_3$ and $A_4$. The conduits are formed by internal baffles or walls 1220 that bend at the bottom to form ramps 1230 that may contact the interfaces between sub-blocks SB1, SB2, SB3, and SB4. Each conduit 1125 therefore communicates fluidically with only one sub-block. The conduits 1225 of any of FIGS. 12C, 12D, or FIG. 13B or conduits defined between or within the different concentric tubes 1215 in FIGS. 12A and 12B may be fluidically isolated from one another. A sum of the cross-sectional areas of the conduits 1225 of any of FIGS. 12C, 12D, or FIG. 13B or conduits defined between or within the different concentric tubes 1215 in FIGS. 12A and 12B may be less that the cross-sectional area of the flow manifold.

In other embodiments, ramps 1230 of a fluid flow director may not extend completely to the cell stack, but rather may terminate at a distance, for example, between 0.5 mm and 2 mm, less than 2 mm (or about 2 mm), less than 1 mm (or about 1 mm), or less than 0.5 mm (or about 0.5 mm) from the cell stack and form gaps having these dimensions between the ramps 1230 and the cell stack. The gaps may facilitate insertion or removal of the fluid flow directors from the flow manifolds. The fluid flow director may thus define fluid flow paths through the flow manifold between different portions of the cell stack that have cross-sectional areas less than that of the flow manifold.

Figure 14:
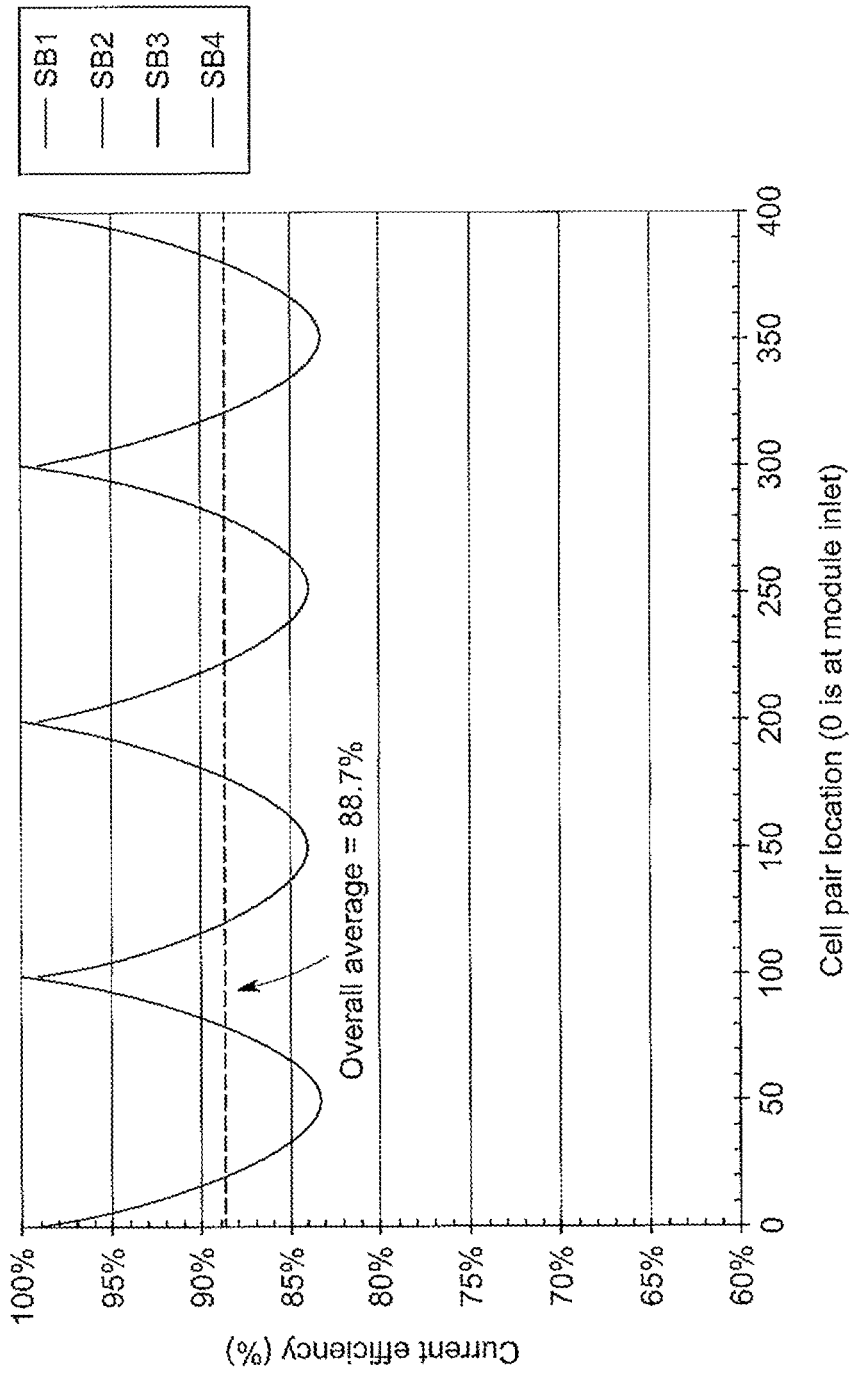
FIG. 14 is a chart illustrating an example of current efficiency vs. cell pair location in a single pass ED device with four electrically isolated sub-blocks.

In a configuration as illustrated in FIG. 13B, henceforth known as the "optimized design," flow of current from one sub-block to another via the manifolds is restricted. Within each sub-block, current can still bypass the stack through the section of manifolds in fluid communication with it. To calculate the current efficiency, each sub-block can therefore be modeled as if it were an ED device with only one sub-block. FIG. 14 shows the results of a current efficiency calculation for a device with four sub-bocks; the average current efficiency being equal to that of a single sub-block from FIG. 7.

Figure 15B:
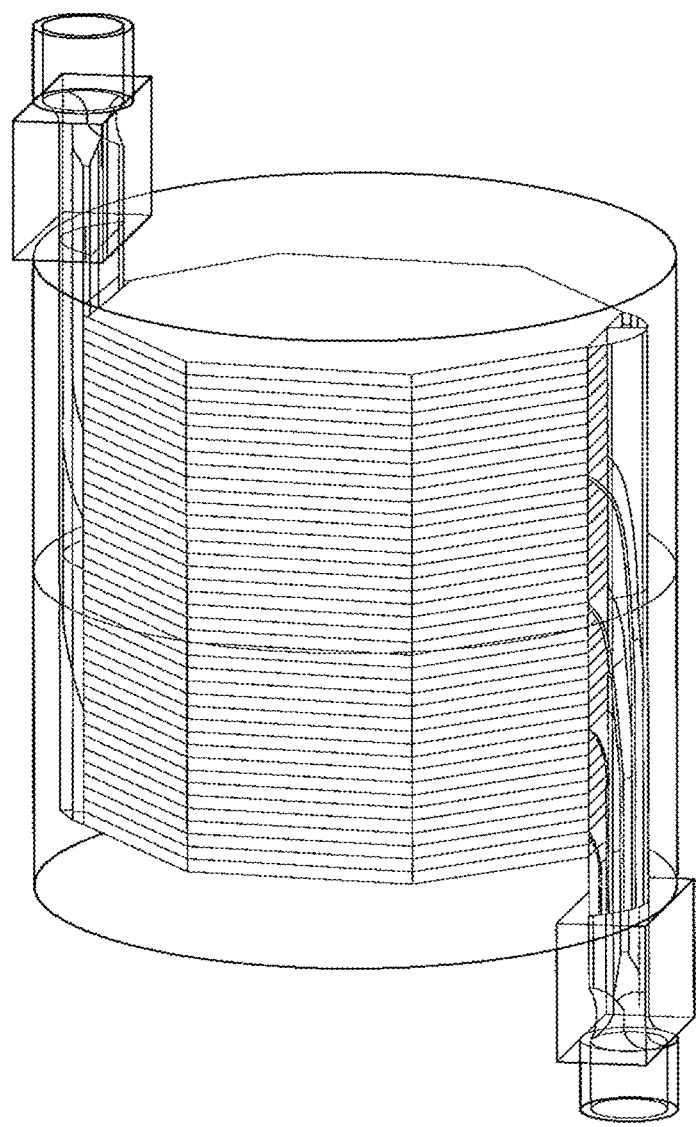
FIG. 15B illustrates a CFD model of an ED device including the manifold of FIG. 15A.

In various embodiments, an ED device as disclosed herein may include one or more of a fluid flow director disposed within the inlet manifold and having a surface configured to alter a flow path of the fluid introduced into the inlet manifold and direct the fluid into the one of the depleting compartments or the concentrating compartments, and a second fluid flow director disposed within the outlet manifold and having a surface configured to alter a flow path of the fluid introduced into the outlet manifold via one of the depleting compartments or the concentrating compartments FIG. 15A shows one non-limiting embodiment of the optimized design, consisting of fluid conduits defined by linearly profiled baffles and elliptical ramps. The structure including the baffles and ramps illustrated in FIG. 15A may be formed as an insert that may be removably inserted into the manifold of the base design. FIG. 15B shows the optimized design, as incorporated to the CFD model. FIG. 15C illustrates a comparison of the center cross-section of an ED device for both the base and optimized designs. In the optimized design, the conduits are electrically isolated and hydraulically parallel.

Figure 15D:
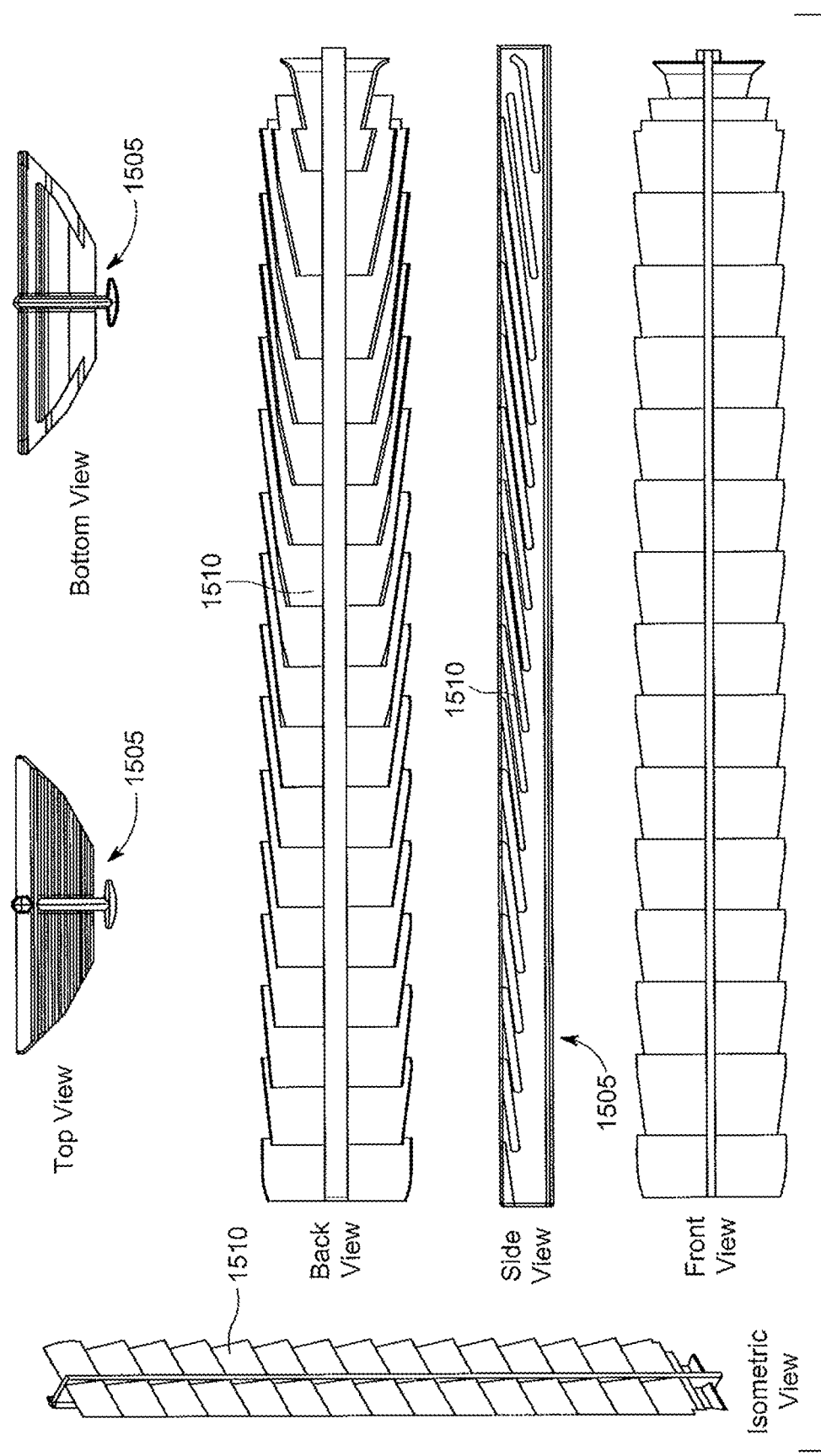
FIG. 15D illustrates views of a single piece modification to the manifold insert of FIG. 15A for use in ED devices with eight sub-blocks.
Figure 15E:
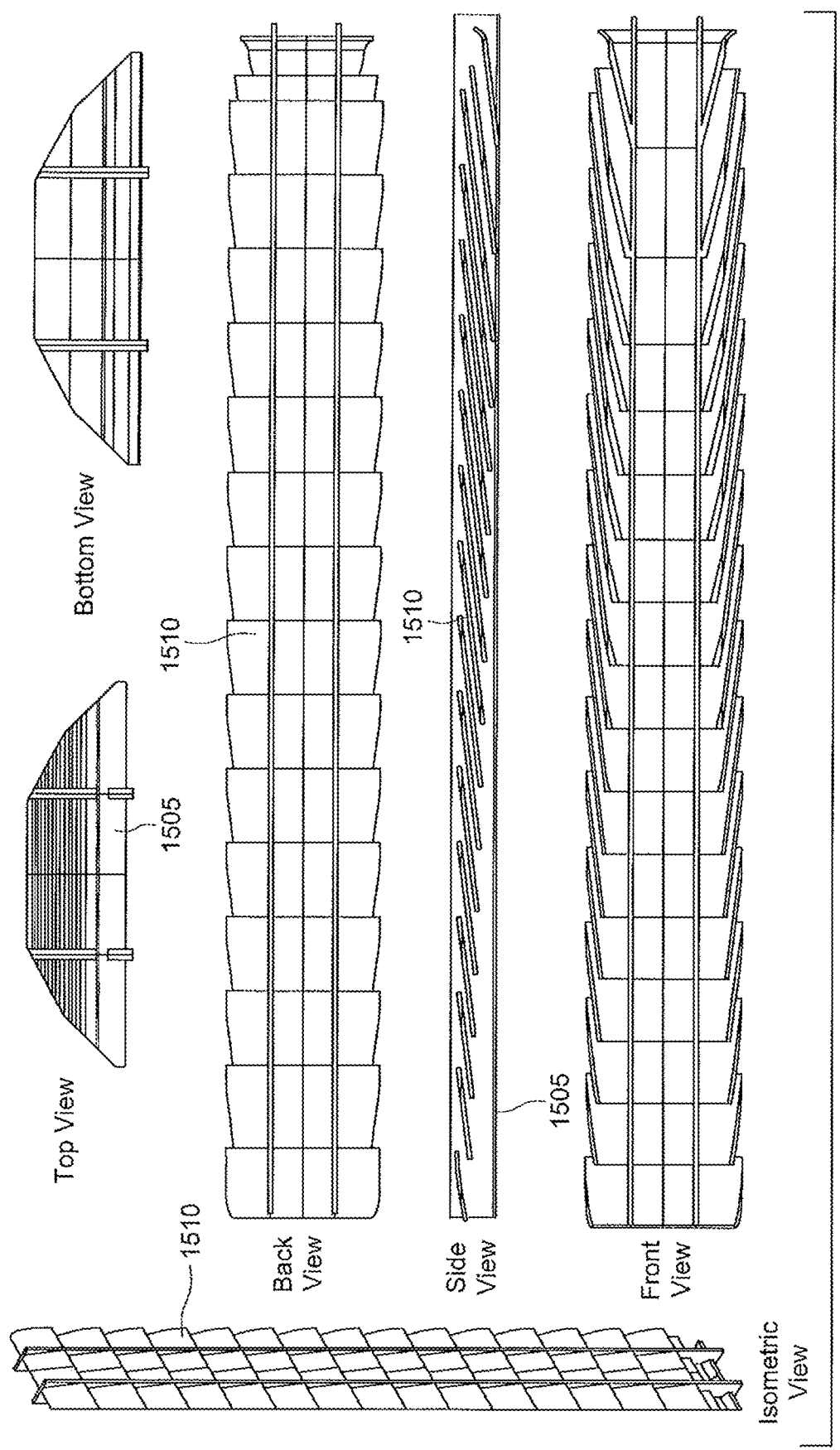
FIG. 15E illustrates views of a two piece modification to the manifold insert of FIG. 15A for use in ED devices with eight sub-blocks.

The optimized design of FIG. 15A may be expanded for use in ED modules having greater than the four sub-blocks illustrated in FIGS. 15B and 15C. For example, a single piece design for an eight sub-block insert is illustrated in FIG. 15D and a two-piece design for an eight sub-block insert is illustrated in FIG. 15E. FIGS. 15D and 15E illustrate these designs in isometric view, top view, bottom view, back view, side view, and front view. In the eight sub-block designs a small conduit 1505 is maintained at the back of the manifold, down the back of the insert, with flow shearing off at each individual ramp 1510. The ramps in the embodiments illustrated in FIGS. 15D and 15E are substantially planar, as opposed to the curved ramps of the embodiment illustrated in, for example, FIGS. 12D, 12E, and 15A. The term "ramp" as used herein included both curved and flat or planar ramps.

Figure 15F:
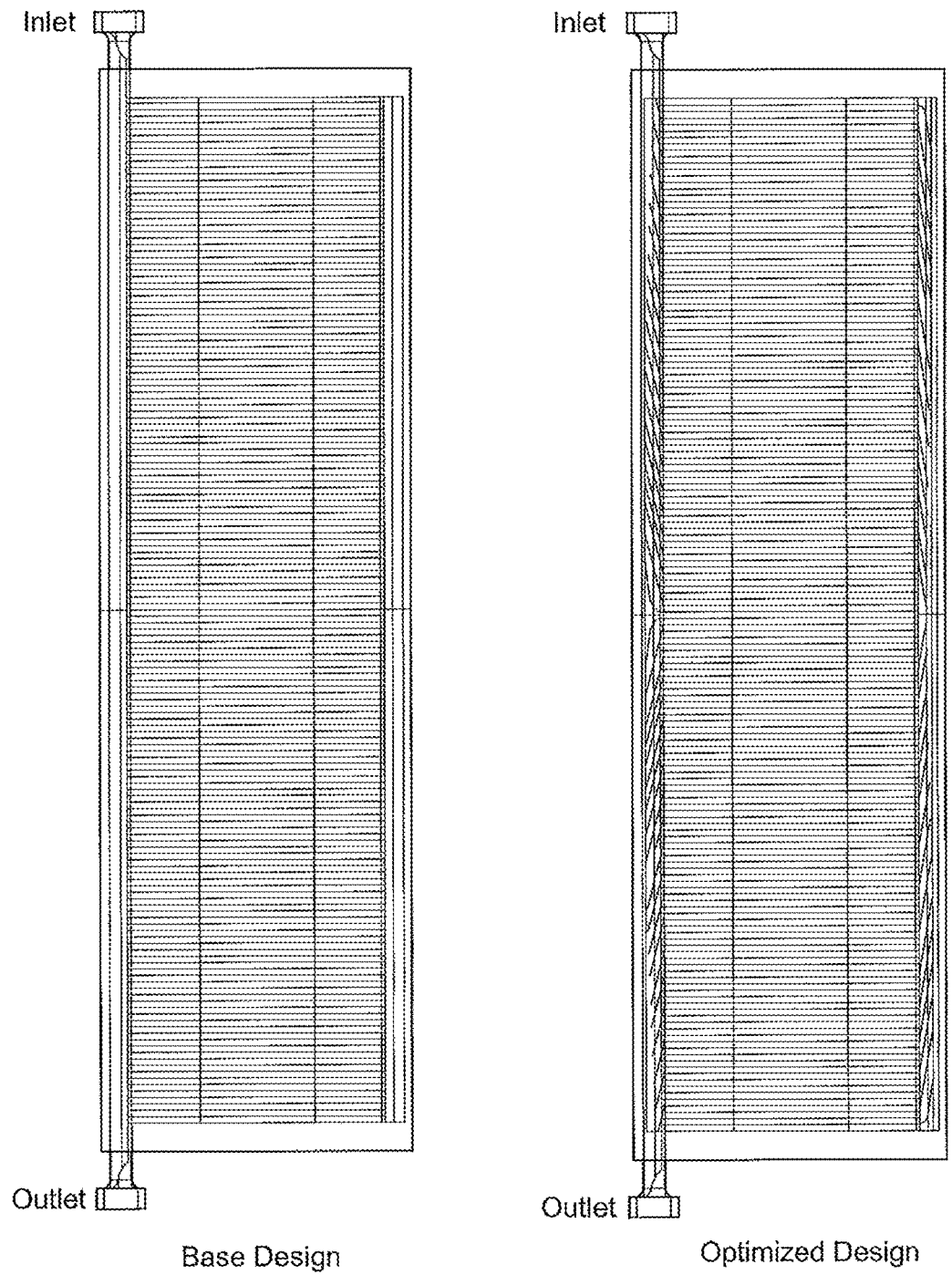
FIG. 15F illustrates a comparison between the manifold of an eight sub-block ED device having the base design and that an eight block ED device including four of the manifold inserts of FIG. 15D.

FIG. 15F illustrates a comparison of the center cross-section of an eight sub-block ED device for both the base and optimized designs.

As discussed above, the distribution of flow was simulated at varying operational flow rates, then optimized using CFD software. Characterizations were then performed for component Z-velocity, flow rate per average cell pair, and pressure drop.

Figure 16A:
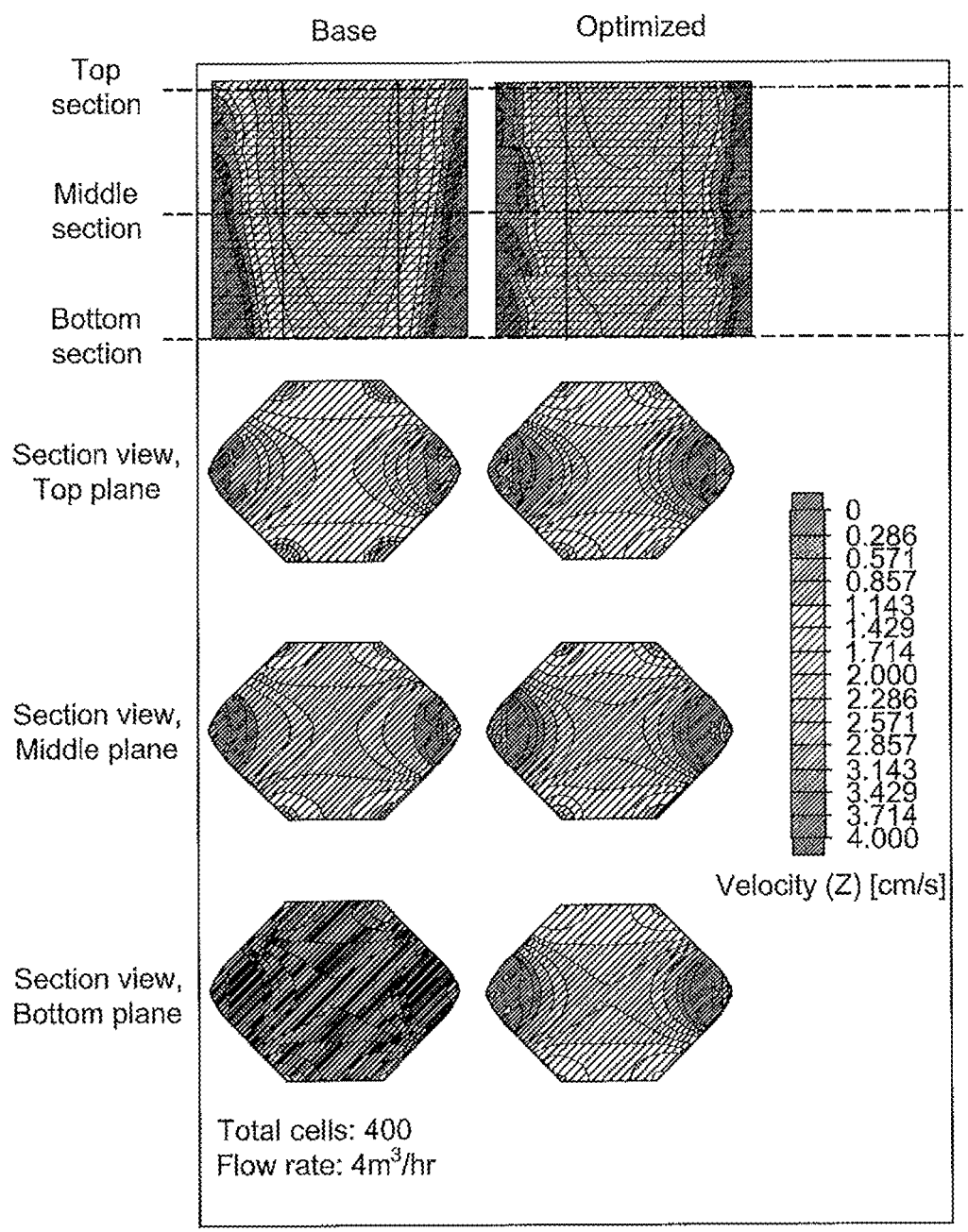
FIG. 16A illustrates a CFD simulation of the component Z-velocity through the center ZY planes, as well as through the top, middle, and bottom ZX planes, for the base and optimized designs at a flow rate of 4 m³/hr.
Figure 16B:
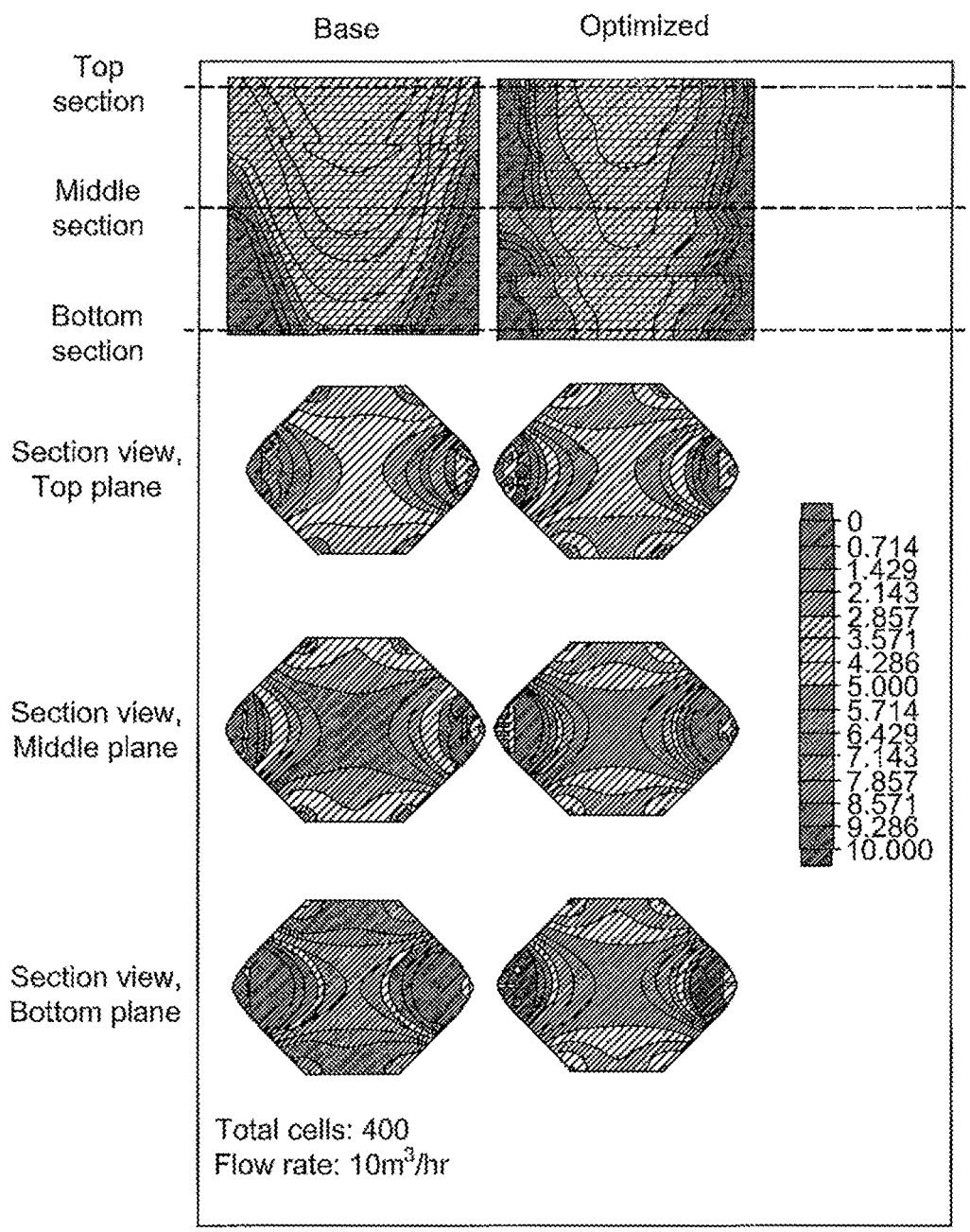
FIG. 16B illustrates a CFD simulation of the component Z-velocity through the center ZY planes, as well as through the top, middle, and bottom ZX planes, for the base and optimized designs at a flow rate of 10 m$^3$/hr.

FIGS. 16A and 16B illustrate the component Z-velocity through the center ZY planes, as well as through the top, middle, and bottom ZX planes, for the base design and optimized designs of FIGS. 15A-15C, a device flow rate of 4 m³/hr and 10 m³/hr, respectively. For the base design, across all flow rates, Z-velocity through the center ZY-plane varies, as does Z-velocity in the top, middle, and bottom ZX-planes, by roughly 2-4×. By comparison, Z-velocity appears constant across all planes, for all flow rates in the optimized design.

Figure 16C:
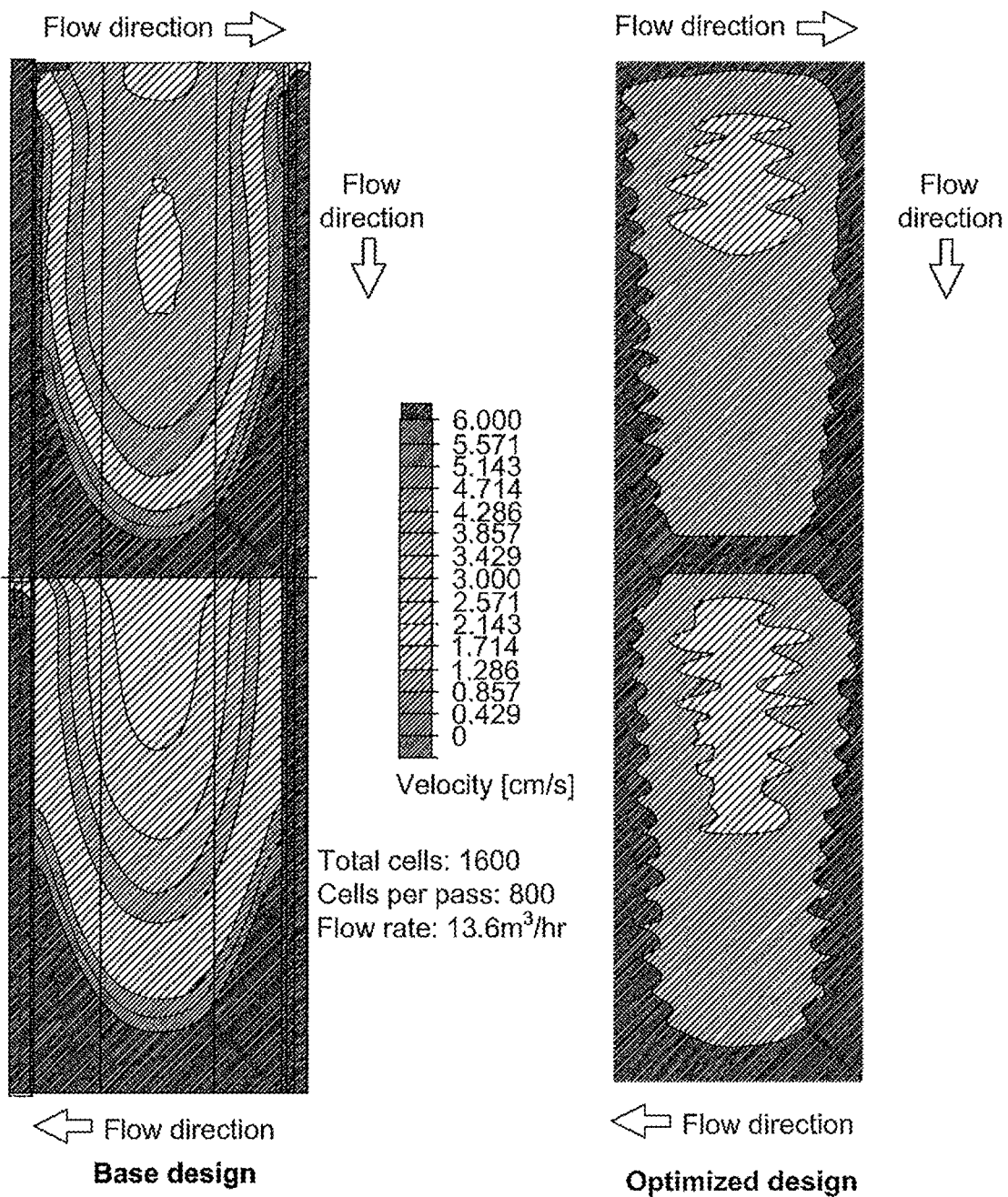
FIG. 16C illustrates a CFD simulation of the component Z-velocity through the center ZY planes for the base and optimized designs illustrated in FIG. 15F.
Figure 16D:
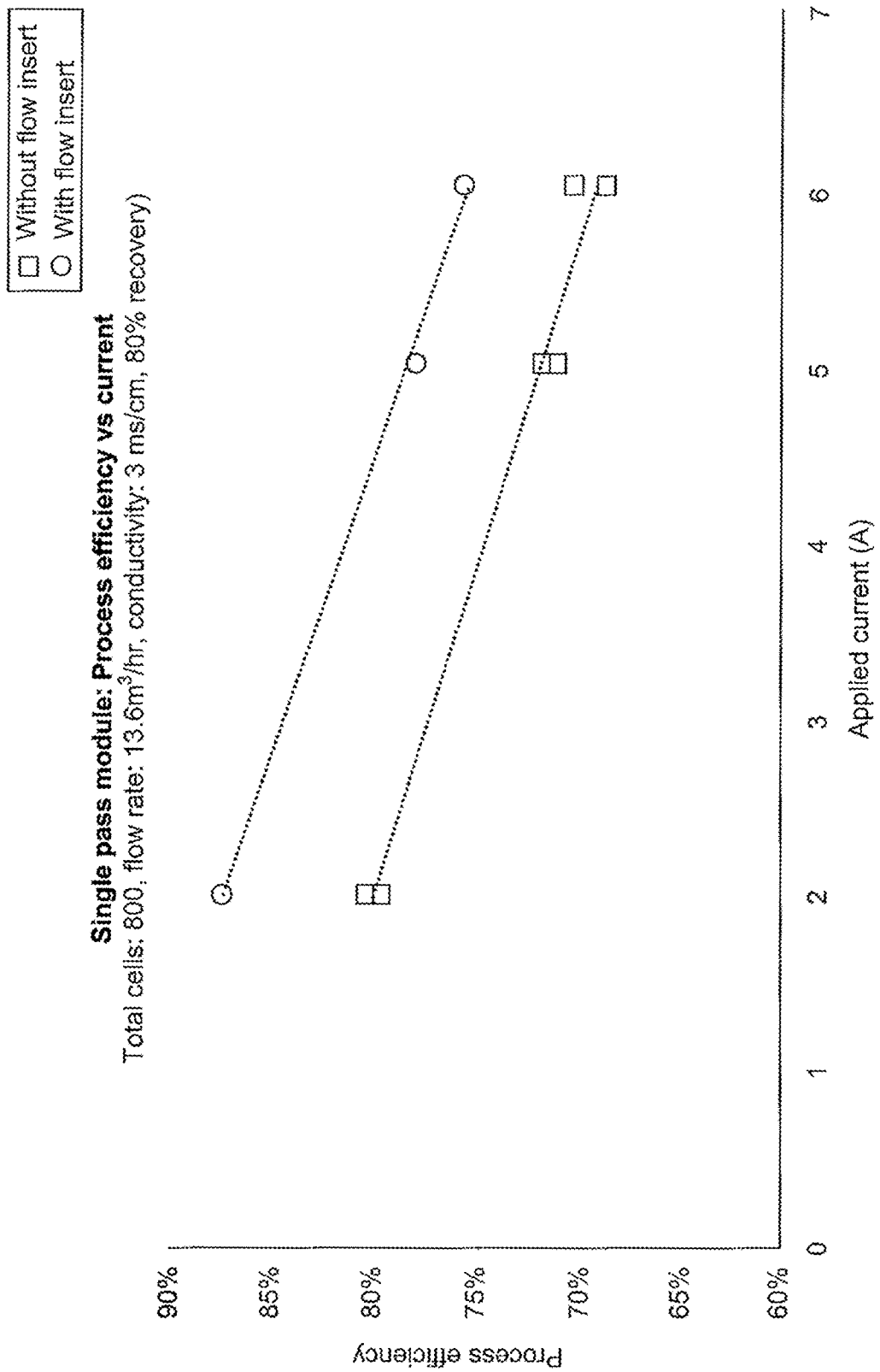
FIG. 16D illustrates process efficiency vs. current (fluid flow rate) for the base and optimized designs illustrated in FIG. 15F.

FIG. 16C illustrates a CFD simulation of the component Z-velocity through the center ZY planes for the base and optimized designs illustrated in FIG. 15F. The Z-velocity through the center ZY plane of the optimized design is substantially more uniform than that of the base design. FIG. 16D illustrates process efficiency vs. current (fluid flow rate) for the base and optimized designs illustrated in FIG. 15F. The process efficiency for the optimized design is about 5% higher than that of the base design for each of the measured fluid flow rates.

Figure 17A:
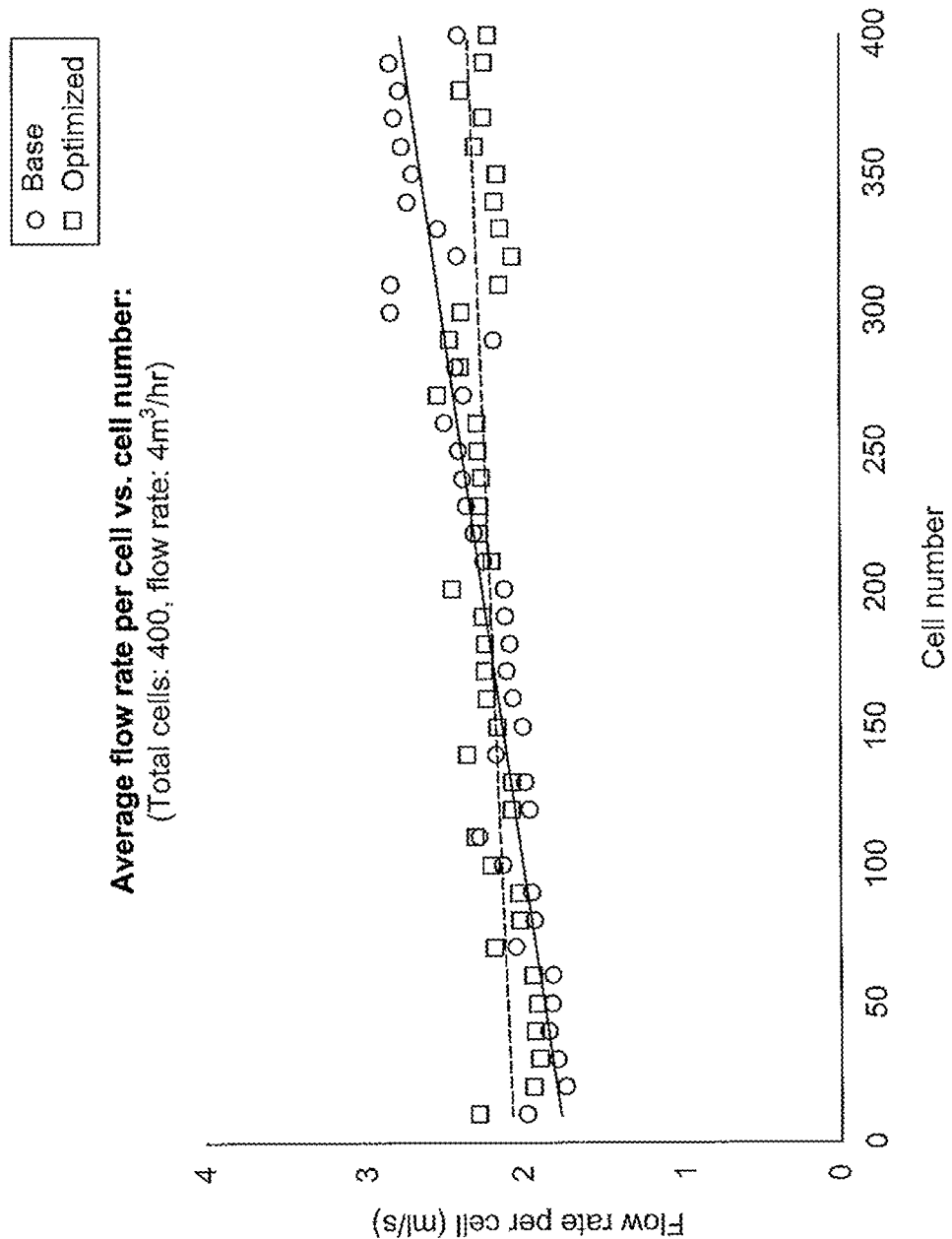
FIG. 17A is a chart of the results of CFD simulation of flow rates per cell pair at different heights (Y axis positions), for base and optimized designs of a ED device at a flow rate of 4 m$^3$/hr.
Figure 17B:
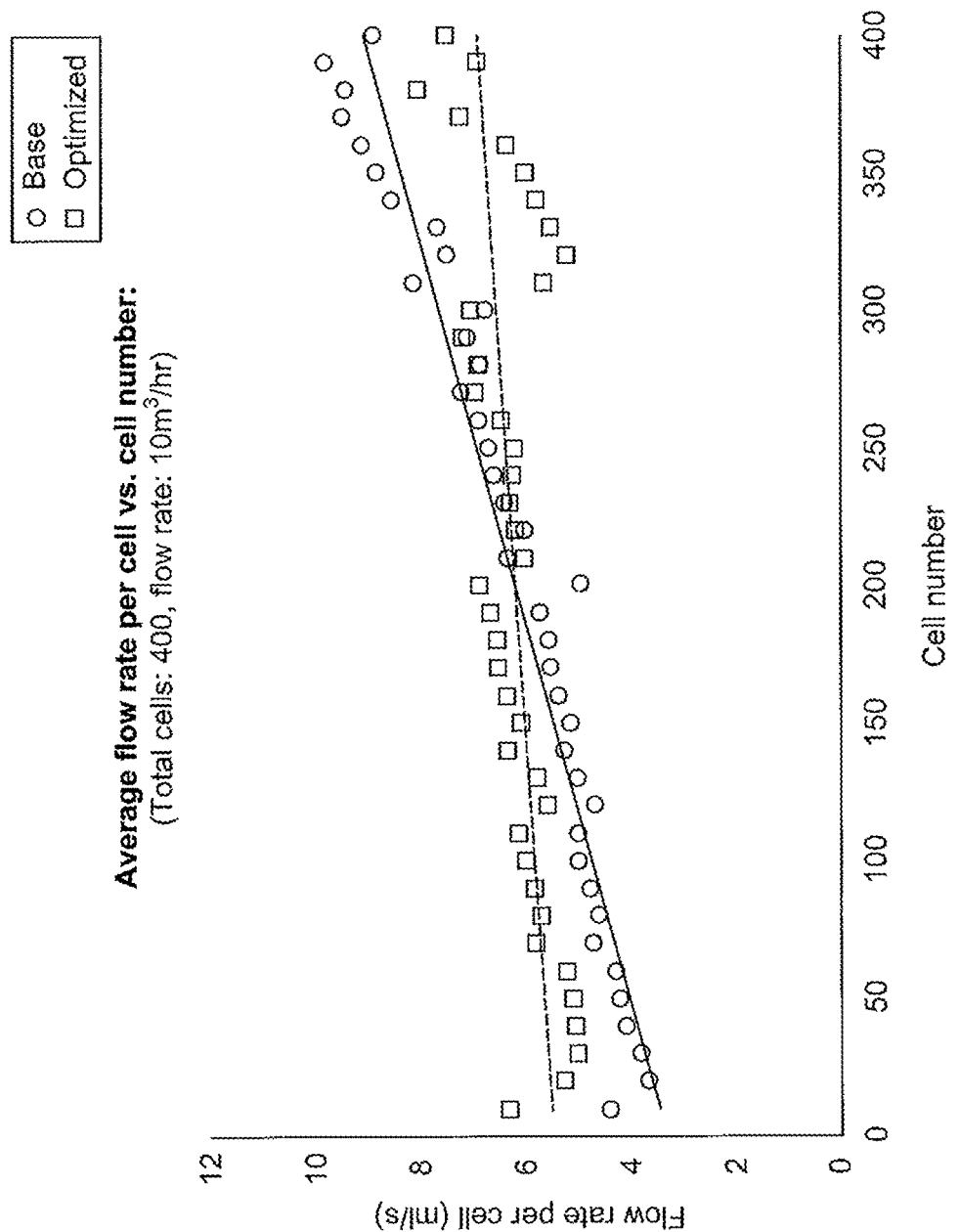
FIG. 17B is a chart of the results of CFD simulation of flow rates per cell pair at different heights (Y axis positions), for base and optimized designs of a ED device at a flow rate of 10 m$^3$/hr.

FIG. 17A is a chart of the results of CFD simulation of flow rates per cell pair at different heights (Y axis positions), for base and optimized designs of a ED device at a flow rate of 4 m³/hr and FIG. 17B is a chart of the results of CFD simulation of flow rates per cell pair at different heights (Y axis positions), for base and optimized designs of a ED device at a flow rate of 10 m³/hr. Reinforcing the above, the flow rate per average cell is closer to uniform for the optimized design.

FIGS. 18A and 18B show the pressure distribution at the center cross-section, expressed as percent of maximum pressure. In the base design (FIG. 18A), the inlet pressure to the sub-blocks is uniform while the outlet pressure varies such that the pressure drops across the sub-blocks increase from the top sub-block to the bottom (see also FIG. 19B). In the optimized design (FIG. 18B), the inlet and outlet pressure to the sub-blocks vary such that the pressure drop across the sub-blocks are nearly uniform (see also FIG. 19C).

Figure 19A:
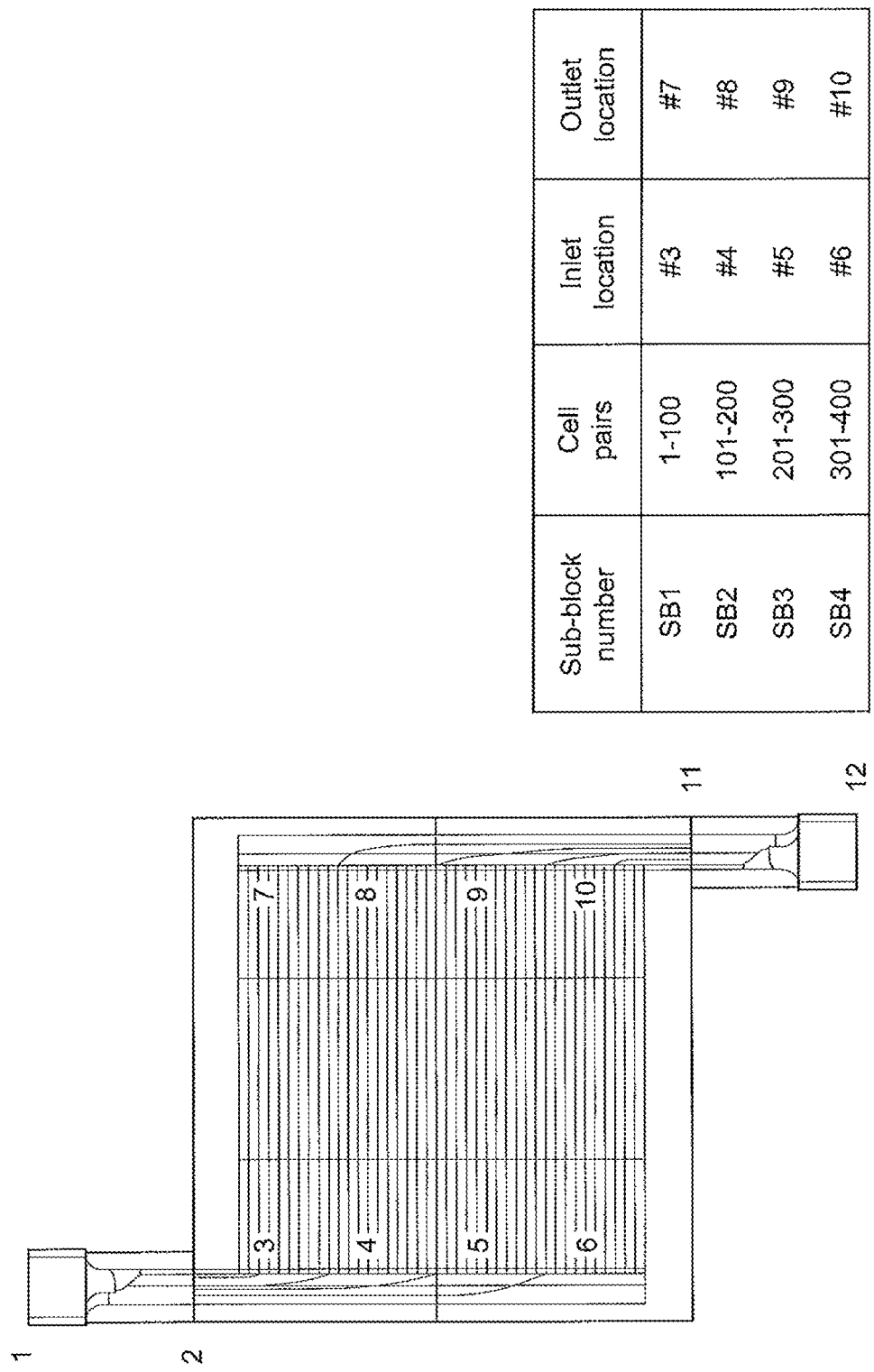
FIG. 19A illustrates measurement locations for pressure drop vs. flow rate in a CFD simulation of the base and optimized ED system designs.
Figure 19B:
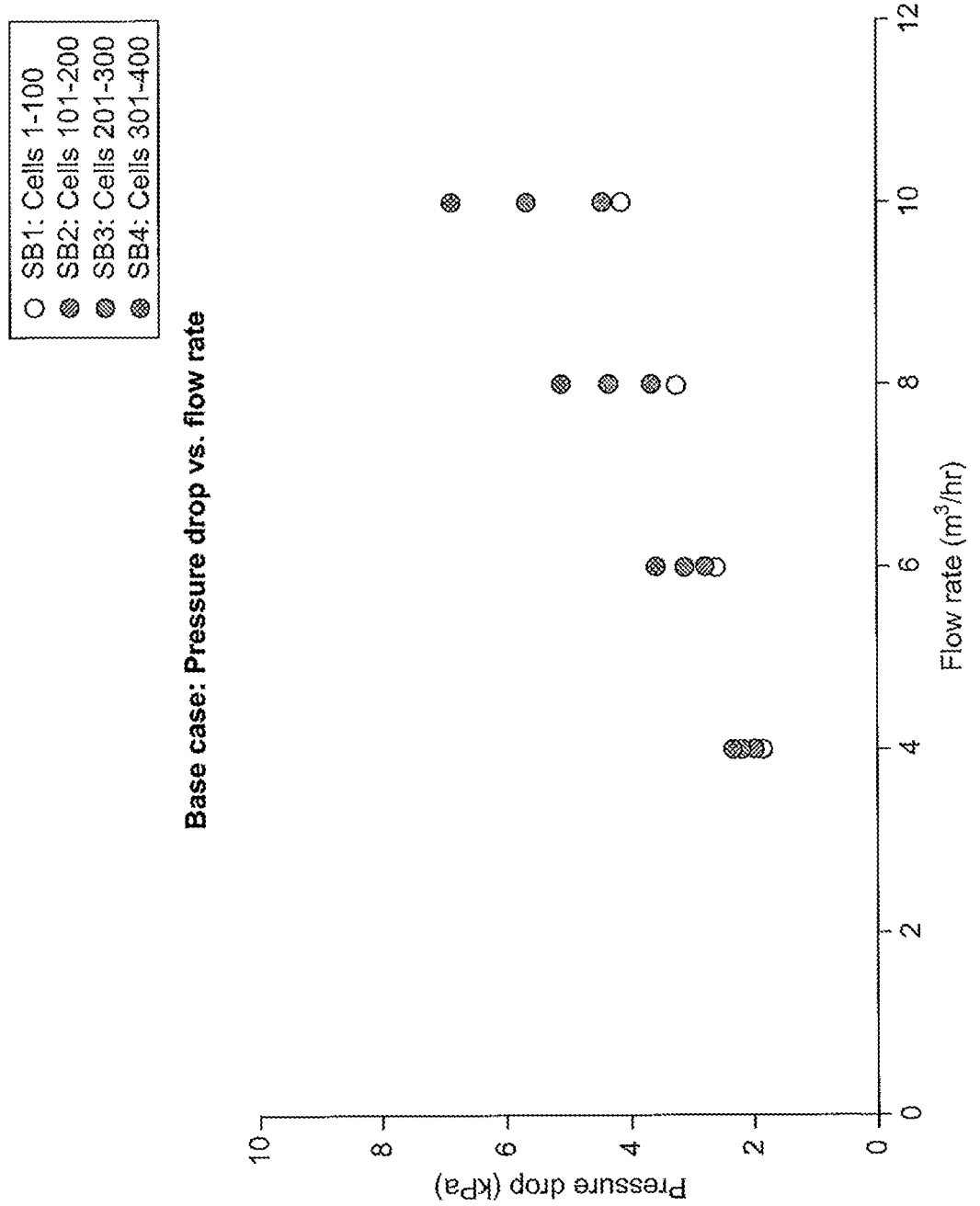
FIG. 19B is a chart of the results of a CFD simulation of pressure drop vs. flow rate for the different sub-blocks in the base ED system design.
Figure 19C:
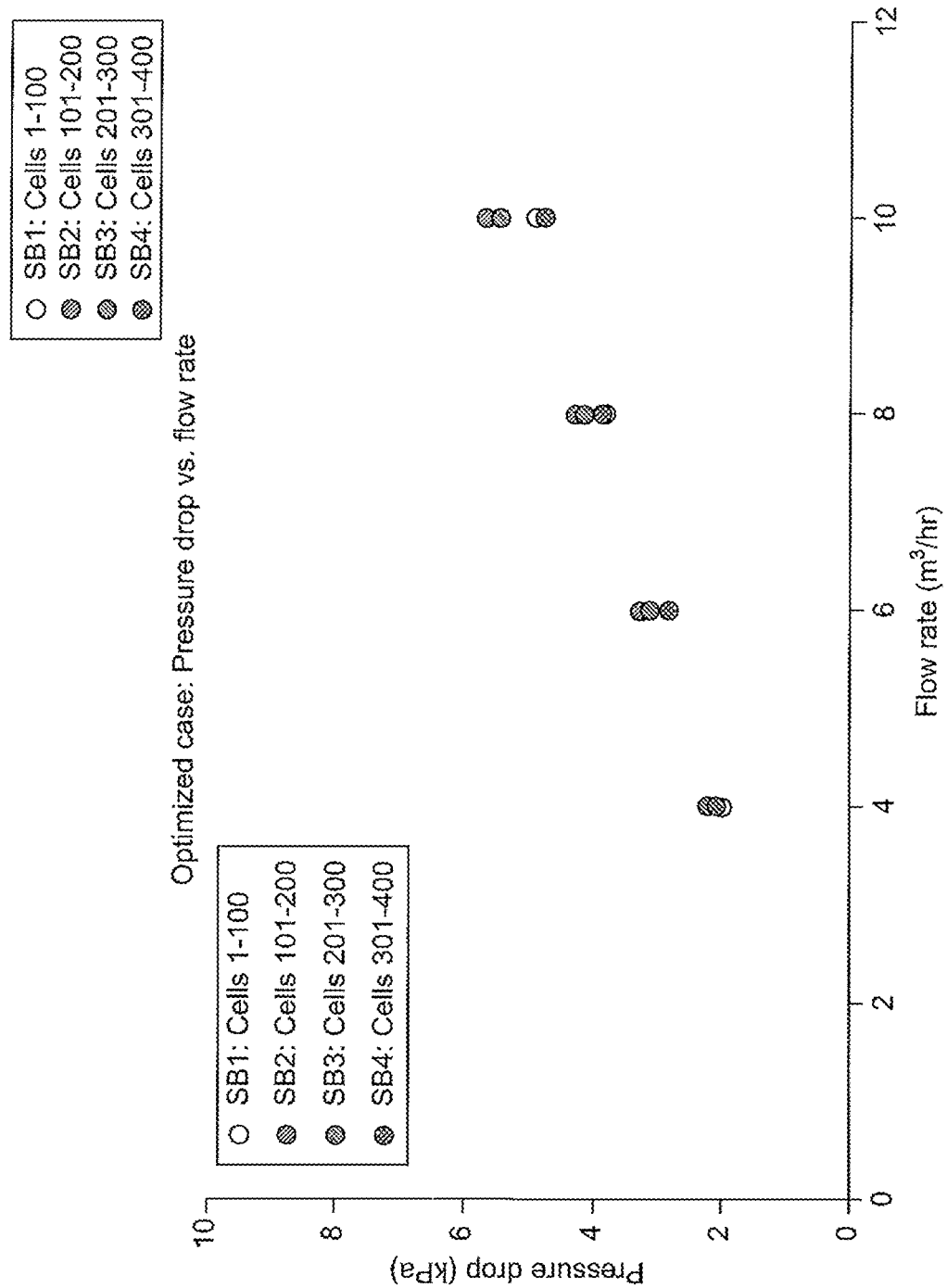
FIG. 19C is a chart of the results of a CFD simulation of pressure drop vs. flow rate for the different sub-blocks in the optimized ED system design.

FIG. 19A shows the locations for pressure measurements in the CFD simulation and defines the differential pressures for individual sub-blocks and the overall device. FIGS. 19B and 19C display the variation in pressure drop across sub-blocks 1 through 4 for different feed flow rates. The pressure drops are more uniform in the optimized design, as would be anticipated with a more uniform distribution of flow rate per cell pair.

In another aspect, features that improve the flow distribution among cell pairs in a pass are provided. In the current cross-flow devices manufactured by Evoqua Water Technologies the inlet and outlet manifolds are approximately triangular in cross-section, as shown in FIG. 4. An adapter fitting transitions the feed flow in a pipe to the inlet manifold. This design will be referred to as the initial design.

FIGS. 10B and 10C show the results from a CFD simulation of flow in a stack of four sub-blocks, each with 100 cell pairs. The flow is not evenly distributed among the cells. A comparison of flow velocity distribution in three horizontal planes, one close to the entrance of the manifold, one in the middle of the stack, and one at the bottom of the stack shows that the flow through the first few cell pairs is lower with relatively large zones of low velocity (see FIGS. 11A-11C).

As shown earlier in FIG. 7, the current efficiency (and therefore the fraction of current that flows through the membranes) is highest at the cell pairs at the two ends of a pass. The resulting higher current density would increase the risk of current limiting and scaling in the zones with low flow velocity. Lower flow rate through the first few diluting cells in a pass would also mean that the full potential of higher current efficiency in salt removal is not utilized.

The technical challenges are therefore to reduce current bypass through the inlet and outlet manifolds and to improve flow distribution among the cell pairs in a pass and particularly to ensure that there is sufficient flow to the first few cell pairs.

Disclosed herein are designs for inlet and outlet flow manifolds in ED devices to improve current efficiency and flow distribution to the cell pairs.

Figure 20D:
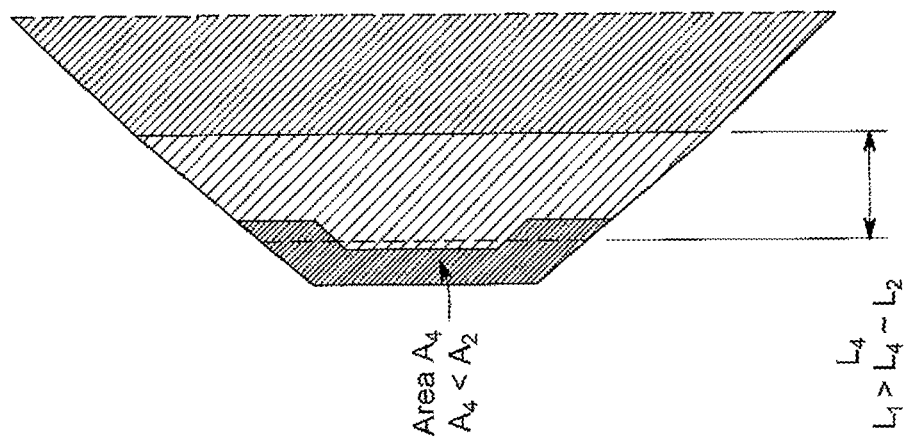
FIG. 20D illustrates the cross-section of an alternate design of a manifold of a ED device.
Figure 20C:
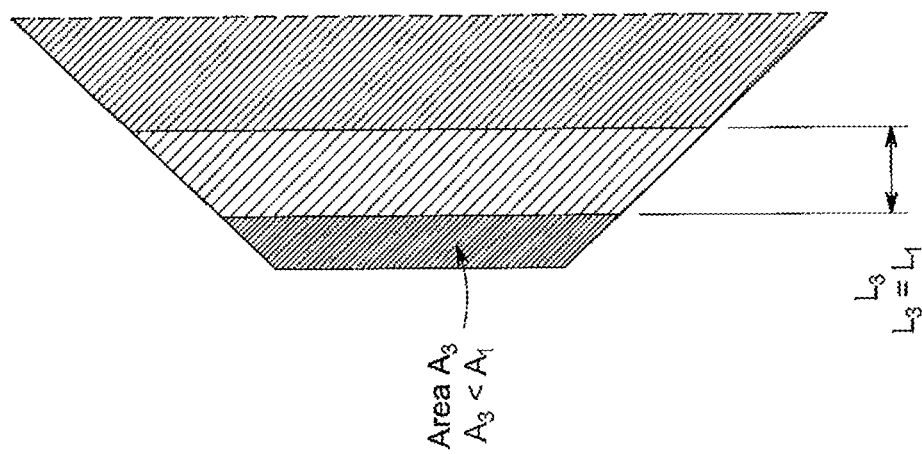
FIG. 20C illustrates the cross-section of an alternate design of a manifold of a ED device.

As discussed earlier the current efficiency in a cell pair can be increased by increasing the electrical resistances in the inlet and outlet channels and manifolds. Starting with an initial design as illustrated in FIG. 20A, with manifold cross-sectional area A1 and distance L1 from the edge of the active membrane area to the edge of the manifold, there are alternative designs that can increase the current efficiency. A smaller manifold, for example, as shown in FIG. 20B would increase the resistance in the channels with distance $L_2 > L_1$ and also increase the resistance in the manifolds with $A_2 < A_1$. A smaller manifold as shown in FIG. 20C would increase the resistance in the manifolds with $A_3 < A_1$. The resistance in the channels would not change with $L_3 = L_1$. A cross-section that is an isosceles trapezoid with "wings" is shown in FIG. 20D. The cross-sectional area of the manifold of FIG. 20D is smaller than that in FIG. 20B while the mean distance of the manifold from the active area is about the same. The equation for resistance in FIG. 6 may not be applicable to this design, even assuming a mean distance $L_4$, because the flow pattern of the bypass current may be more complex. The wings may direct flow towards the lower velocity zones in the active membrane area.

Figure 21:
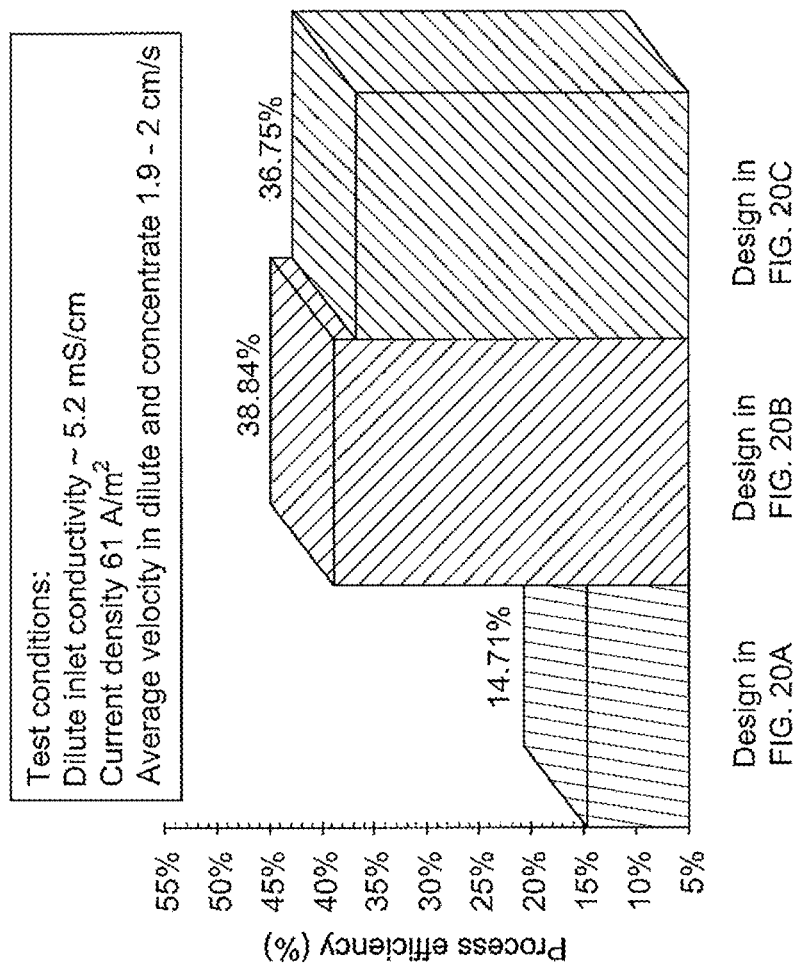
FIG. 21 shows simulated process efficiencies for the manifold designs in FIGS. 20A-20C.

FIG. 21 shows simulated process efficiencies for the manifold designs in FIGS. 20A-20C. The process efficiency increases as the manifold cross-section decreases, as expected, and the two designs with the same smaller area have similar efficiency. Process efficiency is related to current efficiency and is defined by the equations in FIG. 21.

Figure 22:
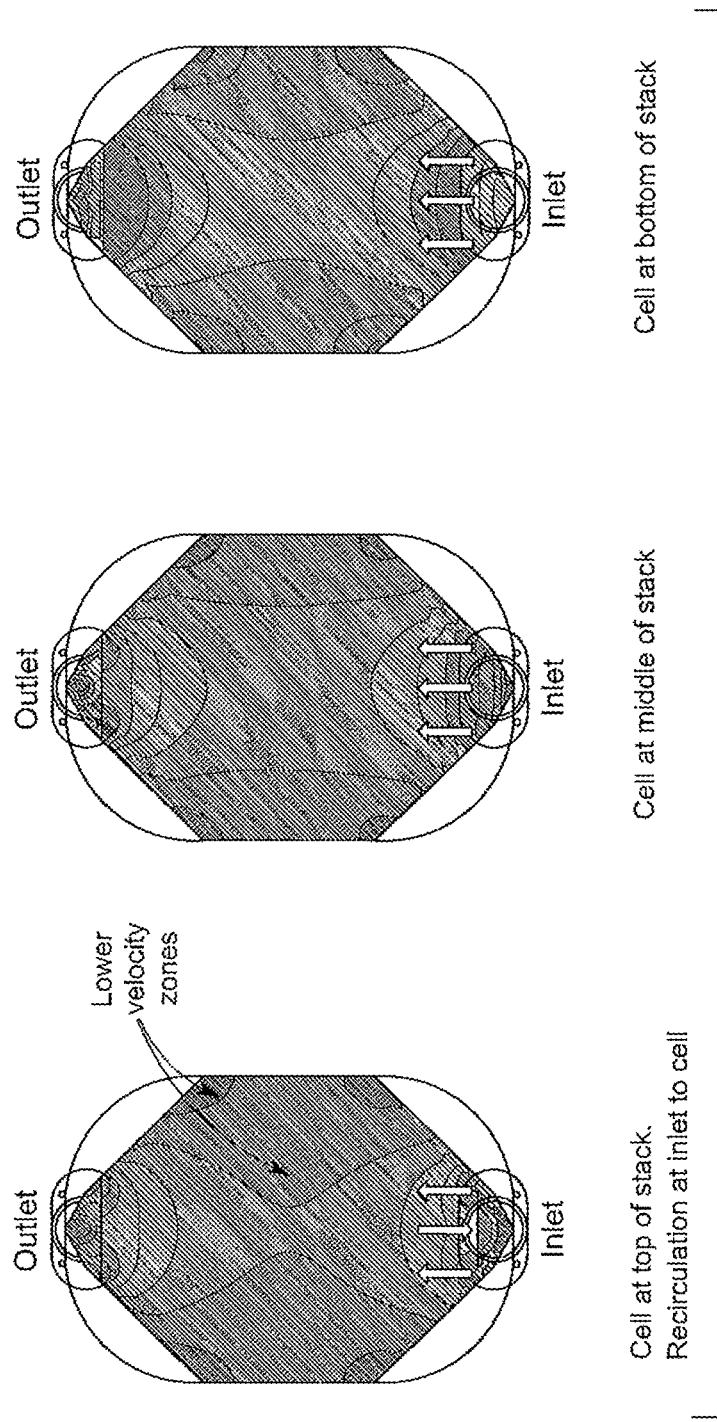
FIG. 22 illustrates the results of the CFD simulation of the ED device of FIG. 20 in cells at the top, middle, and bottom of the cell stack of the ED device.

FIG. 22 shows that the flow distribution among the cell pairs in the initial design is not uniform. The cell pairs near the top of the cell stack have a lower feed flow rate than cell pairs at lower positions in the cell stack.

One potential solution to increase the uniformity of flow through the different cells in the initial design is to incorporate protrusions into a manifold to influence the flow distribution to the cell pairs in the pass. The protrusions may be wedges, vanes, baffles, bumps, or combinations thereof. The protrusions may also have holes or slots to allow a portion of the flow to pass directly through to reduce vortices or eddies downstream.

Figures 23A, 23B:
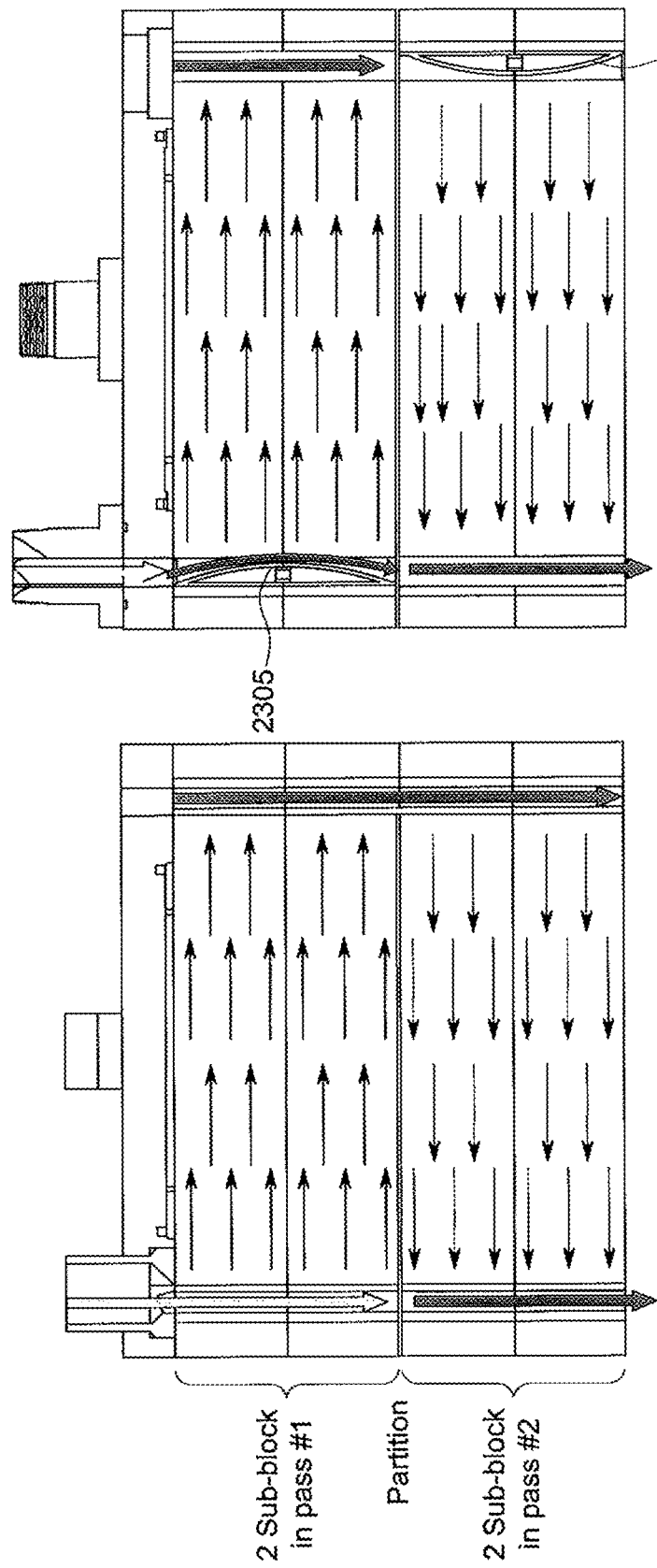
FIG. 23A is a cross-section of an ED module with four sub-blocks in a two pass configuration.
FIG. 23B is a cross-section of an ED module with four sub-blocks in a two pass configuration with curved protrusion inserts installed in the manifolds.

A comparison between the existing design and a design including protrusions in the inlet manifolds of a two-pass ED device is illustrated in FIGS. 23A and 23B in which the design including the protrusions 2305 is presented in FIG. 23B. The profile of each protrusion 2305 is an arc which extends from the start of a manifold to the end. The arc may be circular or elliptical or freely generated. As the term is used herein, a "fluid flow director" includes embodiments such as the protrusions 2305.

CFD analysis was carried out for two ED devices illustrated in FIGS. 23A and 23B, each with four sub-blocks arranged in two fluid passes. Each sub-block contains 100 cell pairs so the total number of cell pairs per pass is 200. The first device had manifold cross-sections as shown in FIG. 23A and the second had protrusions with circular profiles inserted into manifolds with the same cross-sections as shown in FIG. 23B.

Figure 24B:
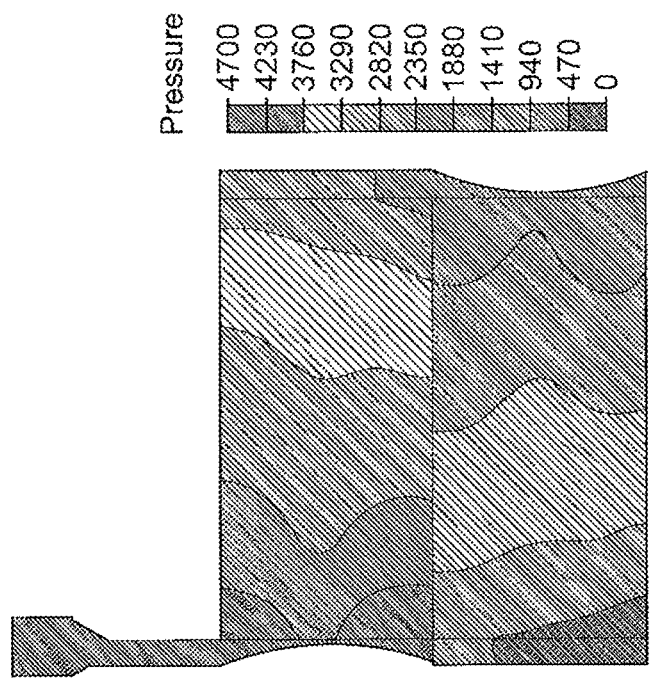
FIG. 24B illustrates results of a simulation of pressure distribution through the center of the entire module of FIG. 23B.
Figure 24A:
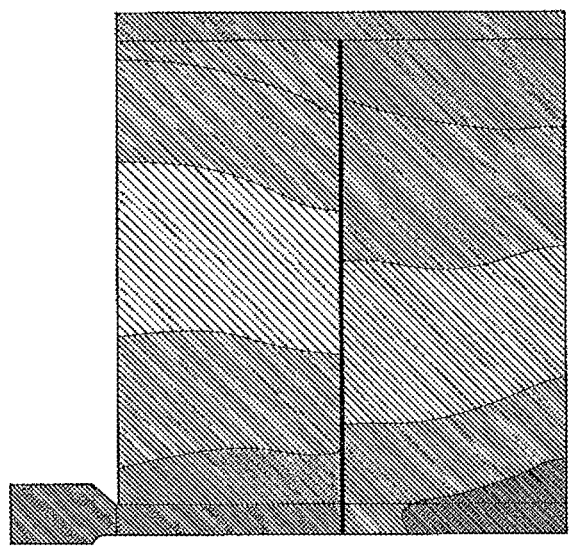
FIG. 24A illustrates results of a simulation of pressure distribution through the center of the entire module of FIG. 23A.
Figure 25:
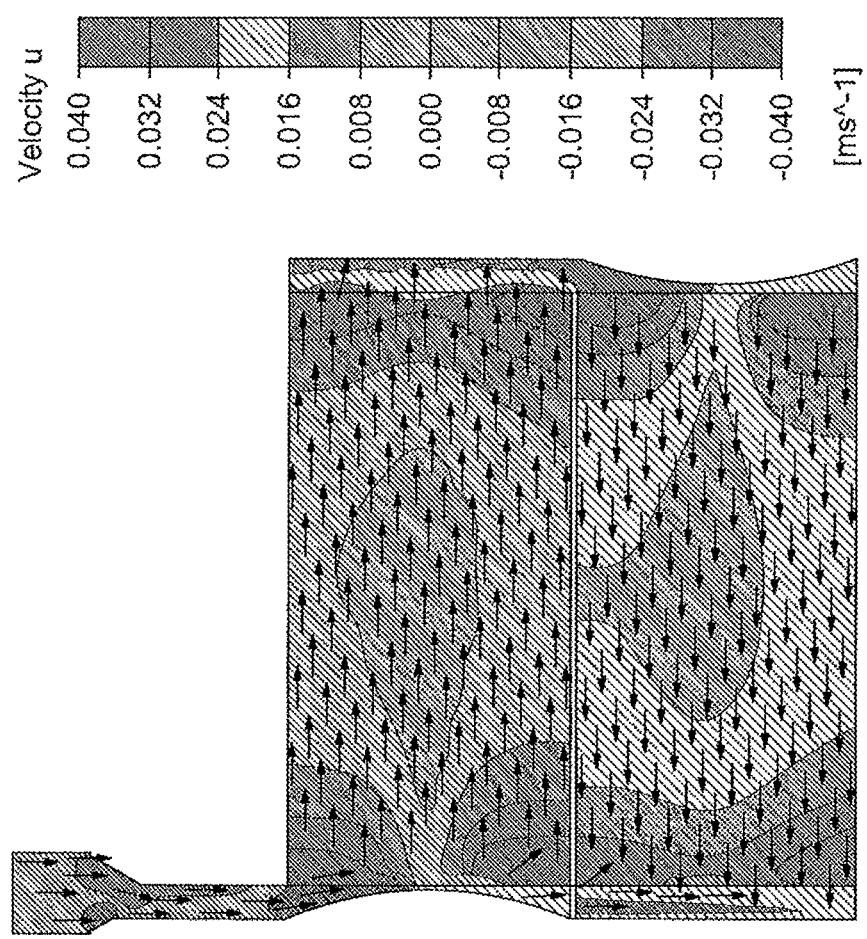
FIG. 25 illustrates results of a simulation of velocity distribution through the center of the entire module of FIG. 23B.
Figure 26:
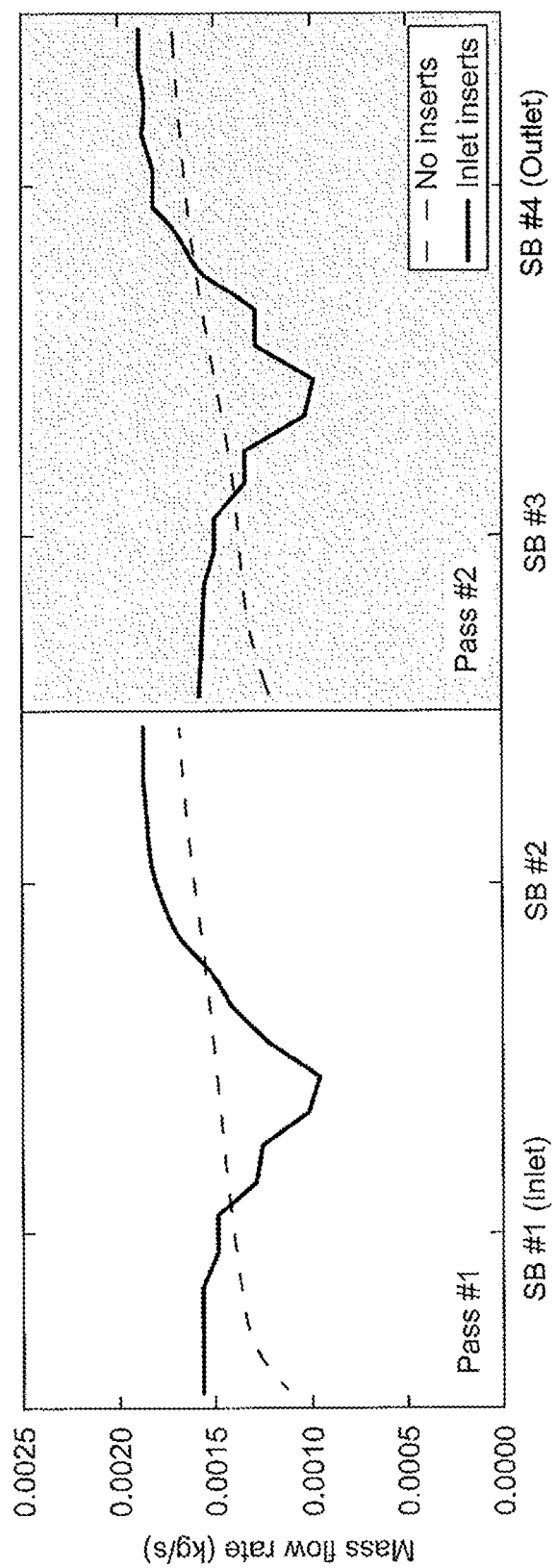
FIG. 26 illustrates results of a simulation of mass flow profiles (per cell pair) through the modules of FIG. 23A and FIG. 23B.

FIG. 24A shows the pressure distribution through the base case module. The pressure per pass increases gradually from the top to the bottom, which would correspond with a similar velocity profile through the stack. FIG. 24B demonstrates the how the pressure field can be manipulated using protrusions in the manifold. This example of a curved insert shows a desirable parabolic pressure field with highest pressure at the top and bottom of the pass and the lowest pressure in the middle of the pass. This corresponds to the flow field shown in FIG. 25. FIG. 26 shows plots of the flow rate per cell pair entering the active area per pass in ED devices with and without the protrusions illustrated in FIG. 23B, respectively. Without protrusions the flow rate per cell is lowest at the first cell in the pass and increases through the pass. The protrusions change the flow distribution so that the flow rate per cell is highest at both ends of a manifold, where the current efficiency and current density in the active membrane area are expected to be highest (see curve for 200 cell pairs in FIG. 7). The higher flow rates would reduce the risk of current limiting and scaling in the cells at the ends and would increase overall salt removal in the pass.

For manifolds with uniform cross-sectional area, the network model described earlier had predicted that the bypass current would be highest midway in a pass. Reducing the cross-sectional area would reduce the bypass current and increase current efficiency. The protrusions in the ED device of FIG. 23B result in inlet manifold cross-sectional areas that vary through each pass, smallest at the midpoint of the manifold, which would restrict the bypass current.

Figure 27:
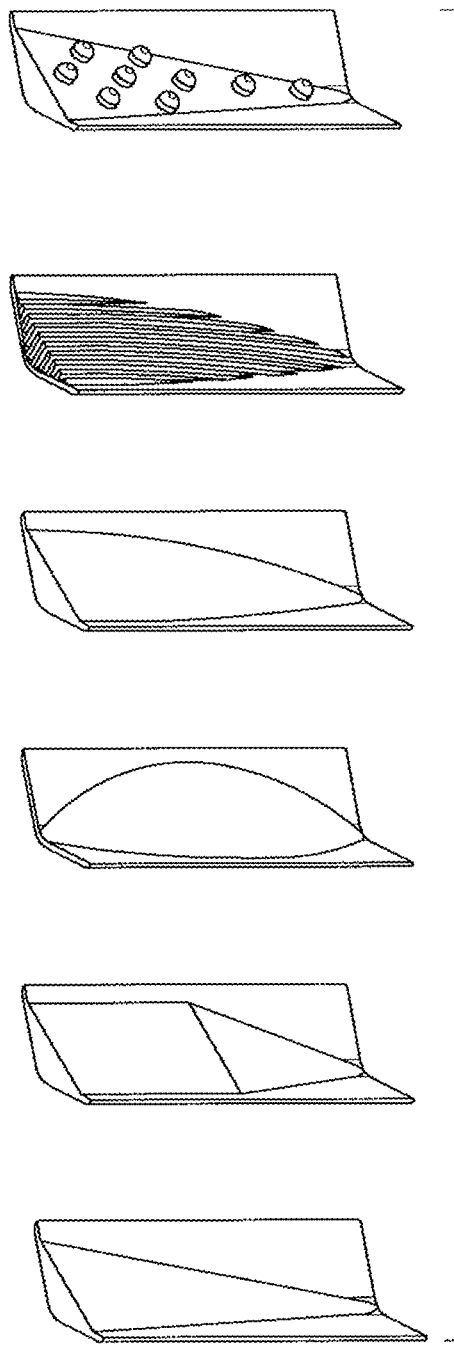
FIG. 27 illustrates several examples of possible outlet manifold inserts.

To further reduce the bypass current additional inserts in the outlet manifolds of each pass may be incorporated. The shape of the inserts may be optimized to occupy the most volume in the outlet manifolds while maintaining a desired flow profile. Similar to the inlet inserts, providing an ED device with inserts that produce a small cross-sectional area at the midpoint of the outlet manifold would greatly reduce the current bypass. The geometry of the inlet manifold insert or the outlet manifold insert could comprise of wedges, vanes, baffles, bumps or combinations thereof. Holes or slots could also be incorporated to allow a portion of the flow to pass directly through to reduce vortices/eddies downstream or distribute the flow. Various possible manifold outlet insert designs are shown in FIG. 27.

Figure 28:
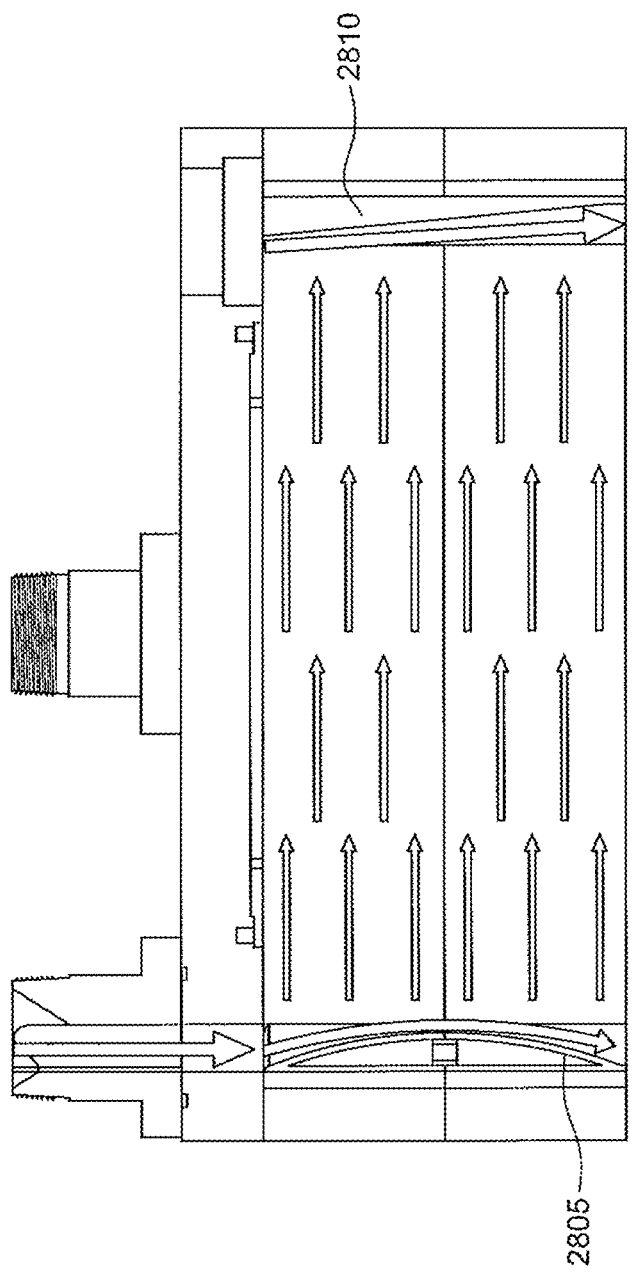
FIG. 28 is a cross-section of the first pass of an ED module with four sub-blocks in a two pass configuration with a curved protrusion insert installed in the inlet manifold and a straight tapered insert installed in the outlet manifold.
Figure 29:
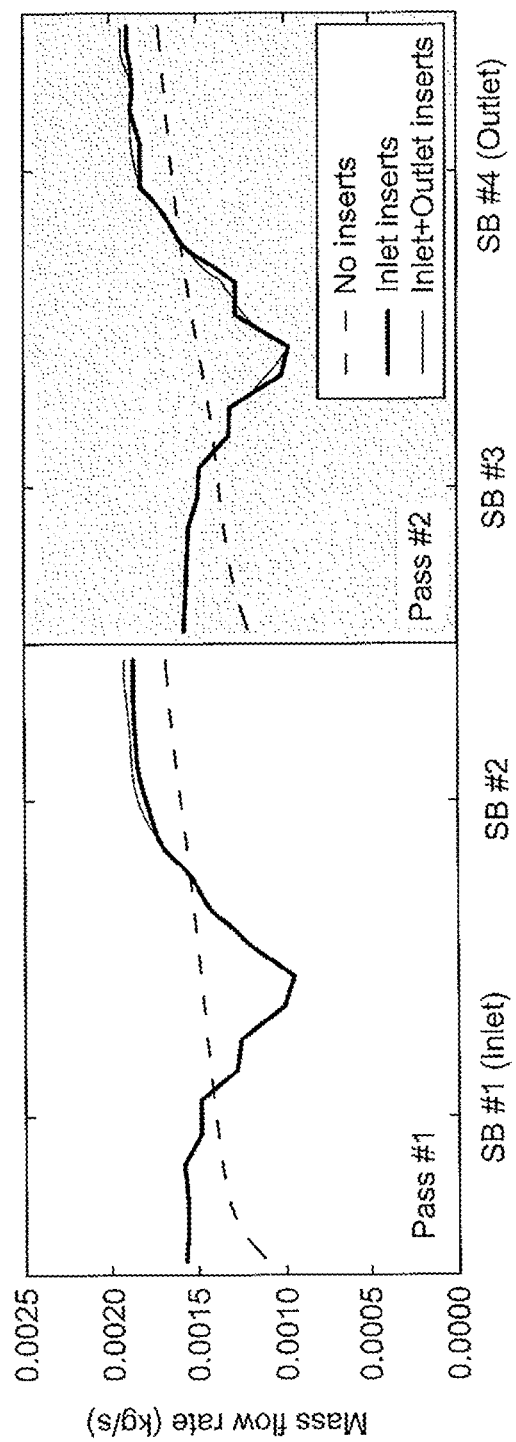
FIG. 29 illustrates results of a simulation of mass flow profiles (per cell pair) through the modules of FIG. 28 with and without the outlet manifold insert.

CFD analysis was carried out for preliminary outlet manifold insert designs using the same previous CFD setup: a two stage, two sub-block/stage module. FIG. 28 shows the first stage of the module with the inlet and outlet manifold inserts. The inlet manifold insert 2805 is in the form of an arc and the outlet manifold insert 2810 has a linear taper with a widest portion at the top of the module and a narrowest portion at the bottom of the module. As the term is used herein, a "fluid flow director" includes embodiments such as the inlet manifold insert 2805 and the outlet manifold insert 2810. The inlet insert was a smooth continuous curve with an apex in the middle of the pass reducing the manifold to a five mm channel. The outlet insert had a straight taper that restricted the outlet manifold to a four mm channel at the top and provided a wide-open channel at the bottom. The simulated flow rate was set to 12 gpm. The mass flow rate profiles (per cell pair) are plotted in FIG. 29 and show that if the outlet insert geometry is smooth and gradual, the flow profiles largely remain unchanged when the outlet insert is provided.

Experiments were carried out with two cross-flow ED devices, each with two passes, two sub-blocks per pass. The first device had manifold cross-sections as shown in FIG. 20B and the second had protrusions with circular profiles as illustrated in FIG. 23B inserted into manifolds with the same cross-sections.

The dilute and concentrate flow rates were in the range of 40-41 liters/minute, corresponding to average velocity of ~2.5 cm/s in the compartments. The dilute and concentrate compartments were fed from separate tanks containing NaCl solutions. The starting concentrations were 556 mol/m$^3$ in the dilute feed tank and 796 mol/m$^3$ in the concentrate. The applied current was 10A.

The product from the dilute compartments was recycled back to the dilute feed tank and the reject from the concentrate compartments was recycled to the concentrate feed tank. Over the duration of the experiment the concentration of dissolved salt decreased in the dilute tank and increased in the concentrate.

Figure 30:
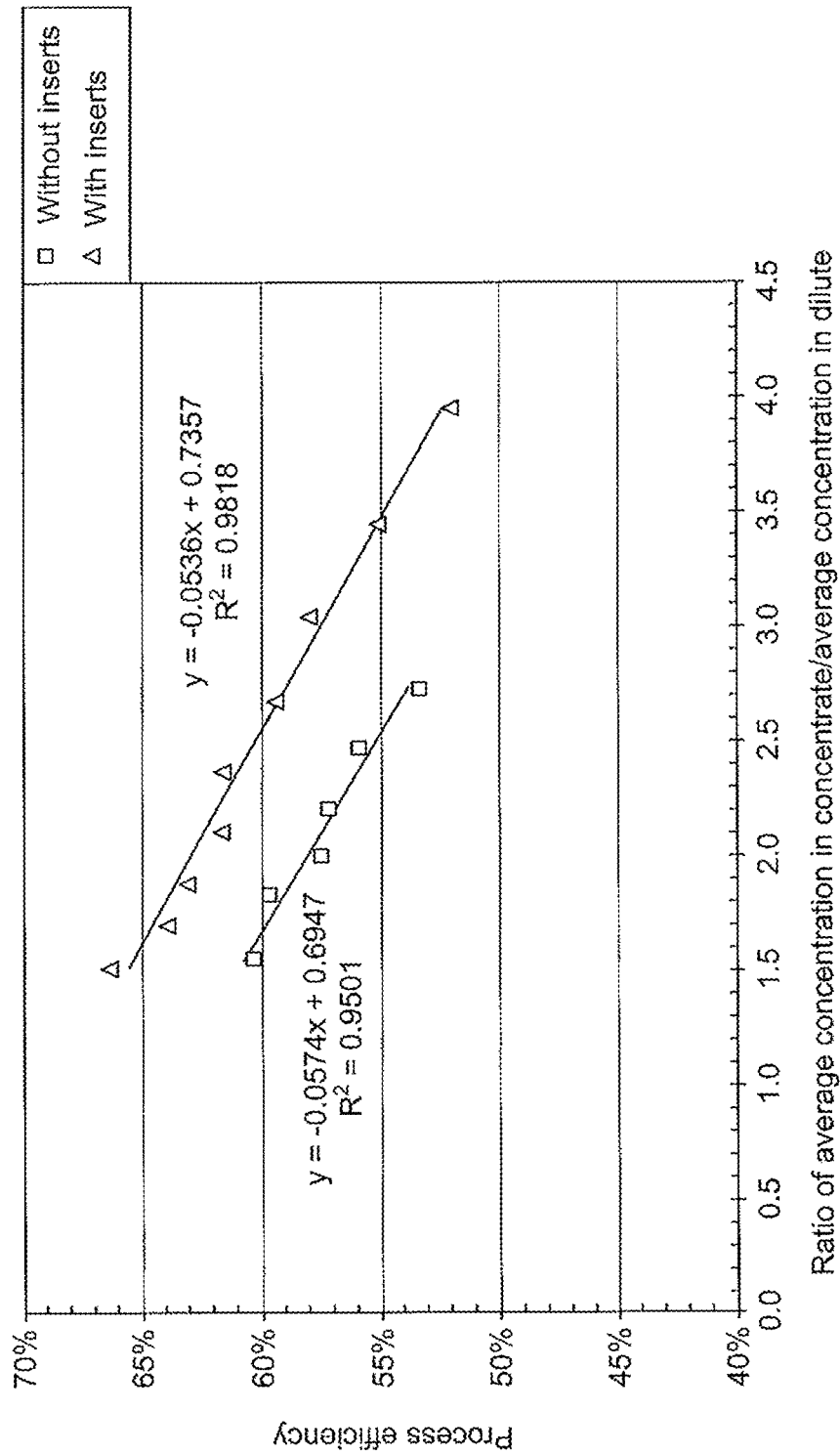
FIG. 30 is a chart of process efficiency vs. ratio of average concentrations in concentrate over dilute in an ED device as illustrated in FIG. 20B and an ED device as illustrated in FIG. 23B.

FIG. 30 shows the process efficiency vs. the ratio of average concentration in the concentrate over the average concentration in the dilute. The ratio increased as the desalination progressed. The efficiency was approximately 10% higher in the device with inserts, the result of improved flow distribution and reduction in manifold cross-section area in the middle of each pass.

Figure 31B:
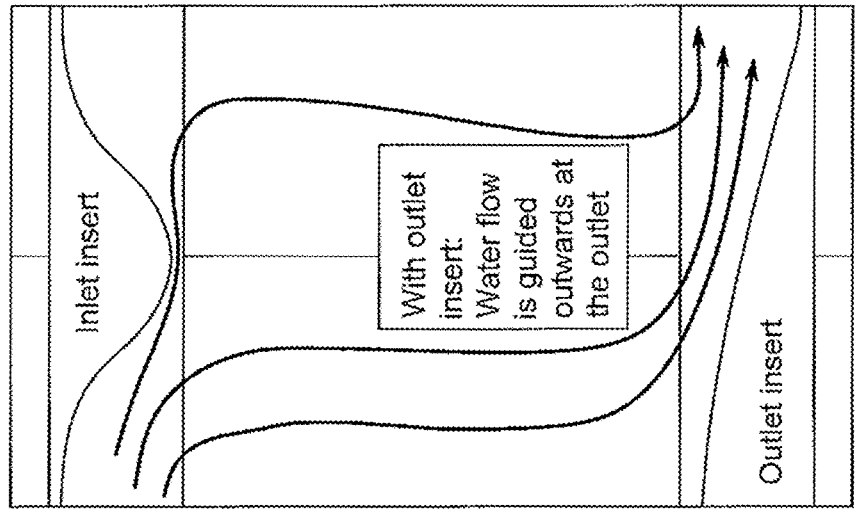
FIG. 31B illustrates fluid flow through an outlet manifold of an ED device with a sloping outlet manifold insert.
Figure 31A:
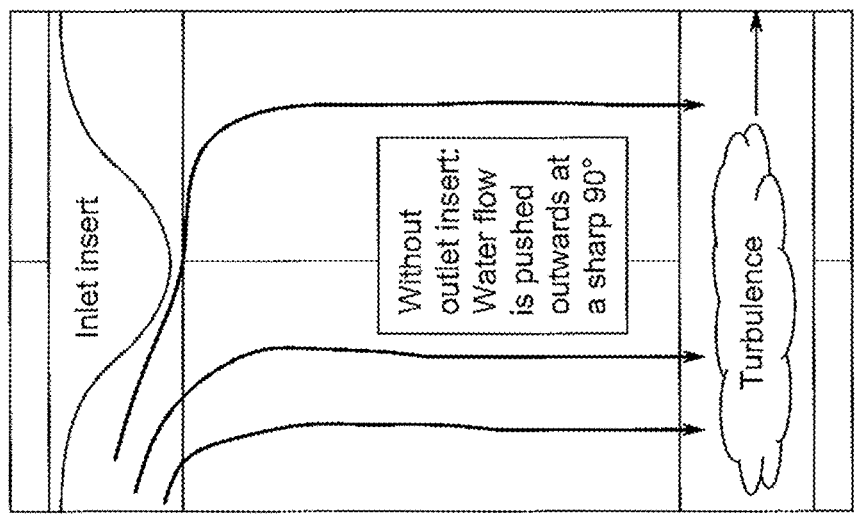
FIG. 31A illustrates fluid flow through an outlet manifold of an ED device without an outlet manifold insert.

Additional testing was performed in which an outlet insert was incorporated into the electrochemical separation apparatus to improve flow distribution. Outlet inserts placed in the sub-blocks had sloping or tampered surfaces such that turns that were 90° without the inserts was transformed into slopes that guided the water flow to turn instead of generating turbulence at the corners of the turns. A comparison between fluid flow with and without the outlet inserts is illustrated in FIGS. 31A and 31B. Guiding of the water flow with an insert in the outlet manifold of the ED device was found to help reduce the pressure drop within the module. However, the outlet insert causes a restriction to the flow of the liquid through the outlet manifold, similar to choking the flow in the path of a water pipe by placing an object in the flow path of the pipe. The overall combined effect was that the pressure drop actually reduced slightly as compared to without the outlet insert, which was an unexpected result. The use of the sloped or tapered outlet insert also increased the process efficiency and reduced the energy consumption of the ED apparatus. This data is shown in FIGS. 32A and 32B.

A further aspect includes a fluidic adaptor to transition flow from external piping with one geometrical cross-sectional shape to the inlet manifold of an ED device with a different geometrical cross-sectional shape. The fluidic adaptor includes a fluid passage that comprises at least one tapered section, or, in some embodiments, two tapered sections. Each tapered section has a characteristic length for developing flow. In some embodiments the two tapered sections do not overlap.

Figure 33:
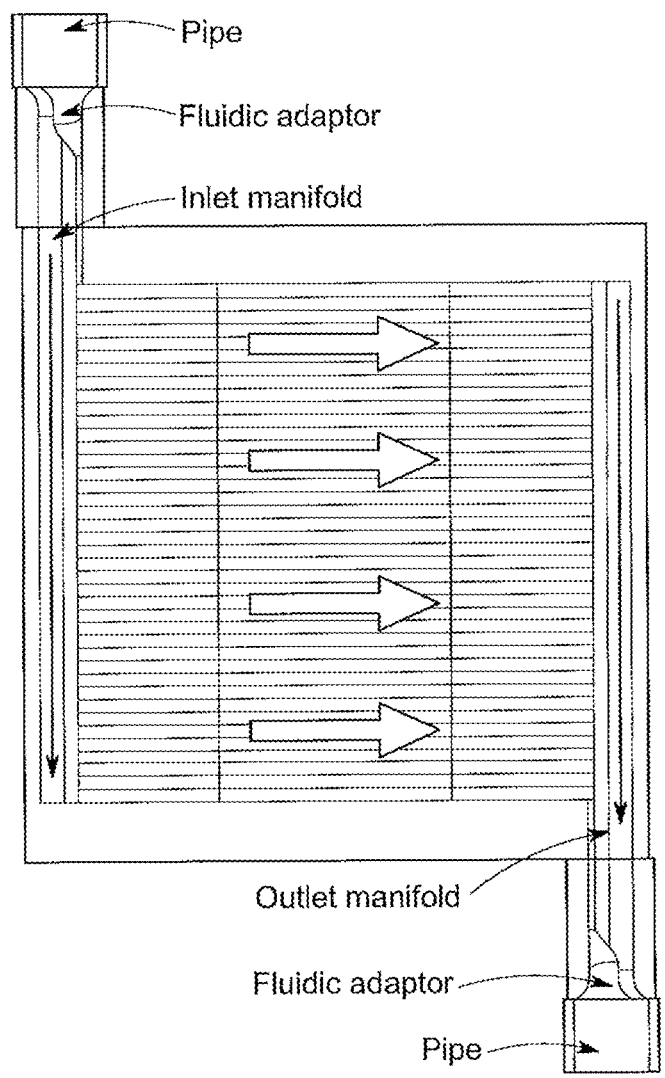
FIG. 33 is a cross-section of an ED device having a fluidic adaptor disposed between an inlet manifold and external piping.

Flow into the diluting compartments of an ED device can be delivered via an external pipe to a fluidic adaptor, and then distributed among all of the diluting compartments in parallel via an inlet manifold as illustrated in FIG. 33. Similarly, the product from all diluting compartments can be collected in an outlet manifold, and delivered through a fluidic adaptor to an external pipe. The flow into and out of the concentrating compartments can be similarly arranged.

The transition of high velocity, turbulent flow from external piping to the inlet manifold poses particular difficulties, since external piping is generally circular in cross-section, while the inlet manifold may have a cross-section that is substantially circular, rectangular, triangular or some other shape. Inlet manifolds that are generally triangular are illustrated in FIG. 4, and FIGS. 20A and 20B. As such, fluidic adaptors with specialized flow directing features are generally provided.

Figure 34A:
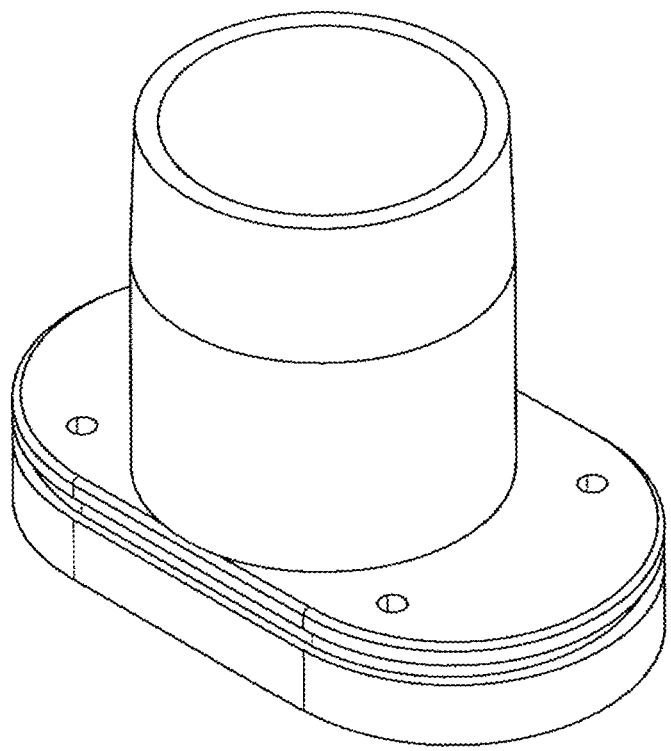
FIG. 34A is an isometric view of a base embodiment of a non-optimized fluidic adaptor for an ED device.
Figure 34B:
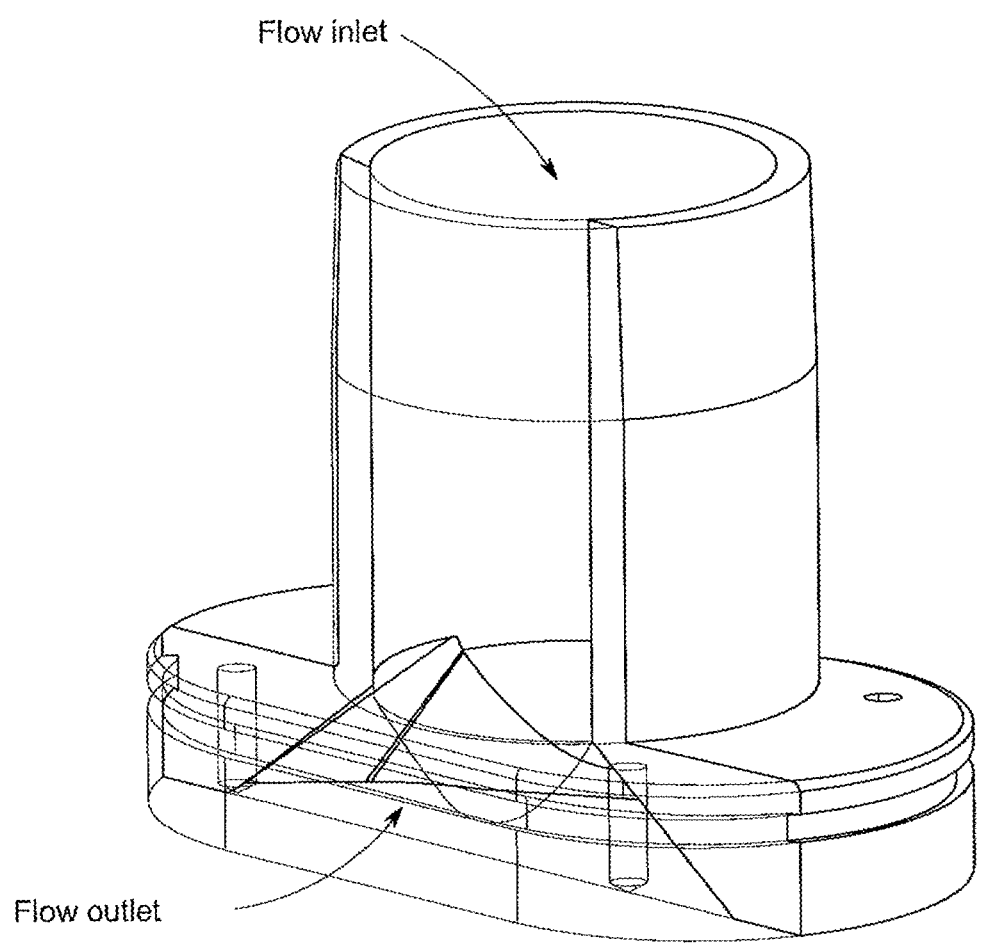
FIG. 34B is a partially transparent view of the fluidic adaptor of FIG. 34A.
Figure 34C:
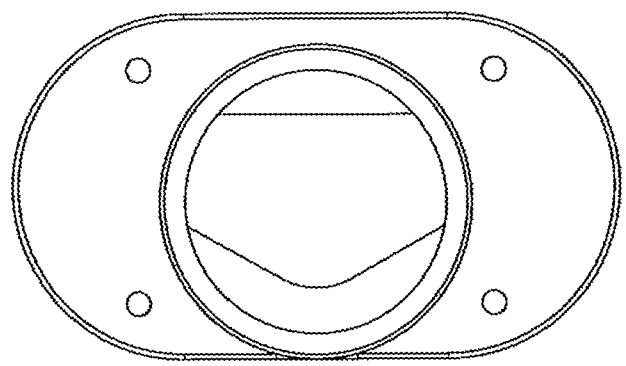
FIG. 34C is a top-down view of the fluidic adaptor of FIG. 34A.
Figure 34D:
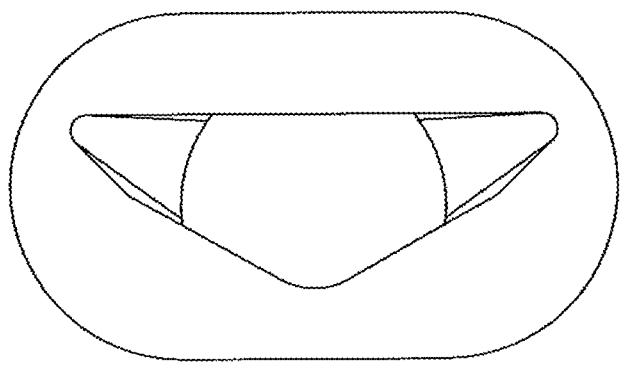
FIG. 34D is a bottom-up view of the fluidic adaptor of FIG. 34A.
Figure 34E:
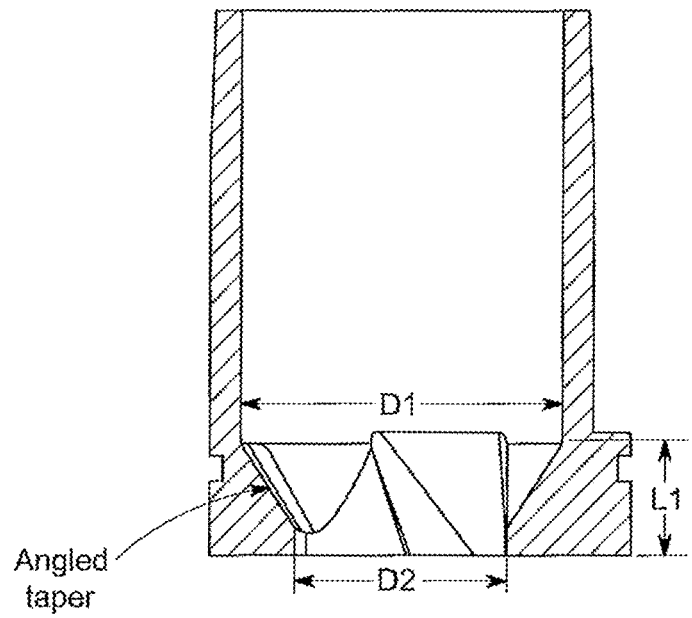
FIG. 34E is a cross-section through a first axis of the fluidic adaptor of FIG. 34A.
Figure 34F:
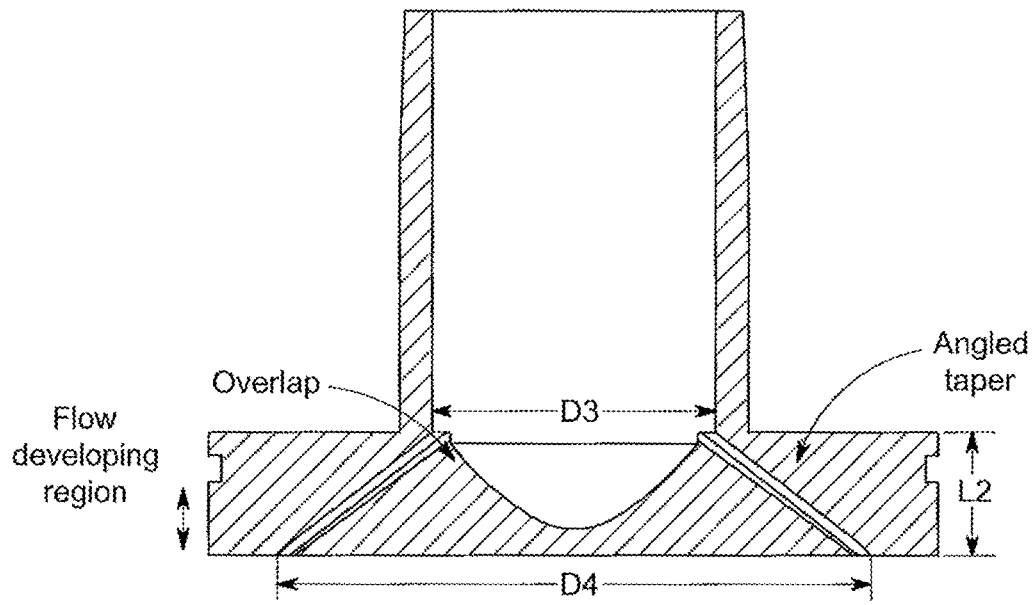
FIG. 34F is a cross-section through a second axis of the fluidic adaptor of FIG. 34A.
Figure 35A:
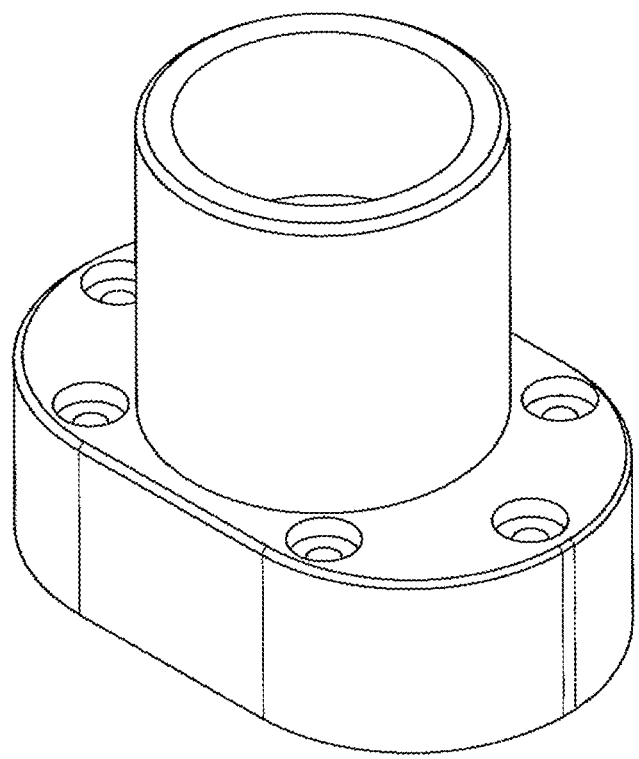
FIG. 35A is an isometric view of an embodiment of an improved fluidic adaptor for an ED device.
Figure 35B:
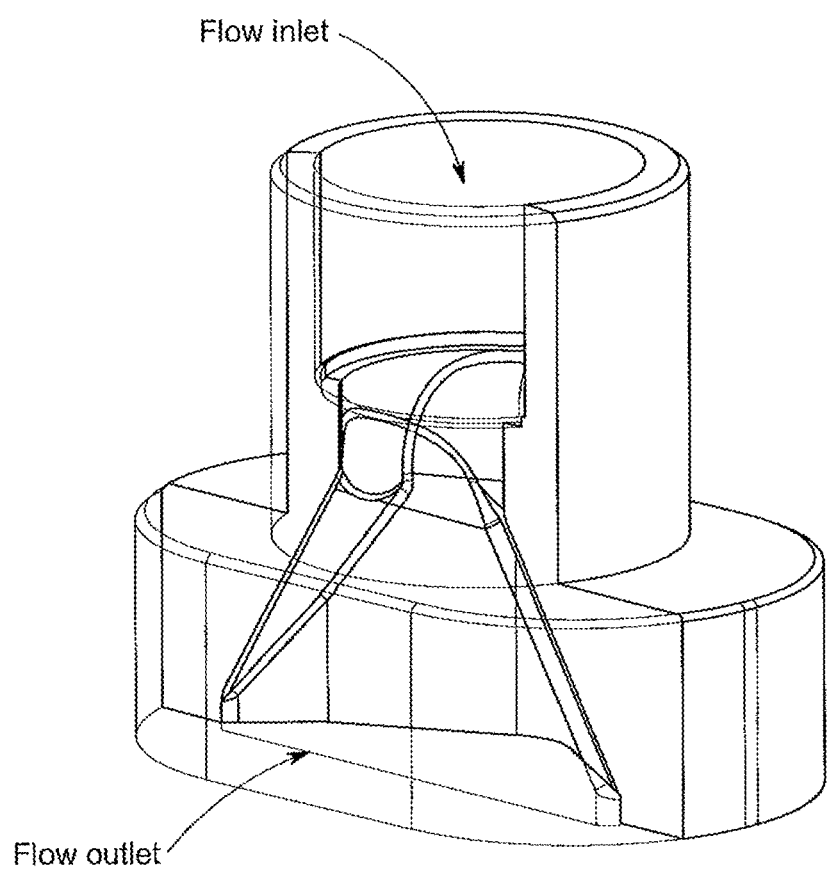
FIG. 35B is a partially transparent view of the fluidic adaptor of FIG. 35A.
Figure 35C:
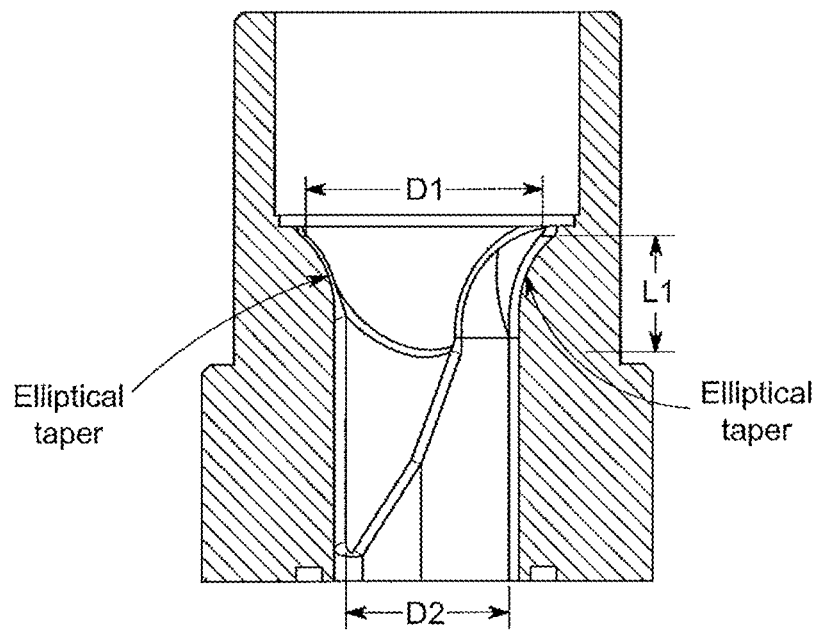
FIG. 35C is a cross-section through a first axis of the fluidic adaptor of FIG. 36A.
Figure 35D:
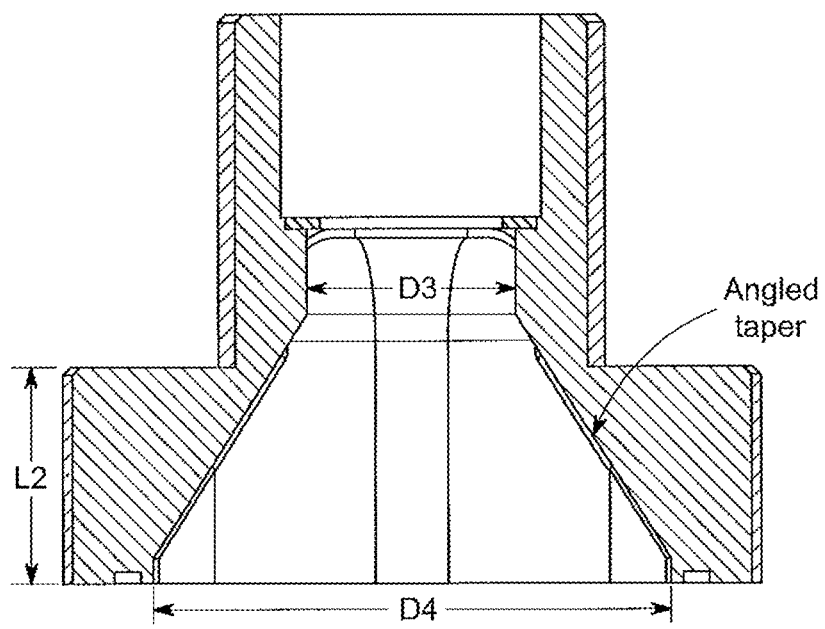
FIG. 35D is a cross-section through a second axis of the fluidic adaptor of FIG. 35A.

One example of a fluidic adaptor providing a transition from a circular cross-section to a generally triangular cross-section is illustrated in an isometric view in FIGS. 34A, in a partially transparent view in FIG. 34B, in a top-down view in FIG. 34C, and in a bottom-up view in FIG. 34D. The inlet of this design is circular in cross-sectional area (FIG. 34C), while the outlet is roughly triangular (FIG. 34D). Internally, flow diameter is reduced in a first axis (FIG. 34E, D1-D2), across a first characteristic length (FIG. 34E, L1), via a steep, angled taper. It is then allowed to expand and develop in a second axis (FIG. 34F, D3-D4), across a second characteristic length (FIG. 34F, L2), via a broad, angled taper that overlaps with the first taper.

An improved design of a fluidic adaptor for embodiments of the ED devices disclosed herein is illustrated in FIGS. 35A-35D. The inlet of this design is also circular in cross-sectional area, while the outlet is also roughly triangular. In this design, the flow is also reduced in a first axis (FIG. 35C, D1-D2), however, the first characteristic length is greater (FIG. 35C, L1), and the taper is more gradual and elliptical than in the previous design illustrated in FIGS. 34A-34F. Flow is again allowed to expand and develop in a second axis (FIGS. 35D, D3-D4), and, again, the second characteristic length over which flow develops is greater (FIG. 35D, L2) than in the previous design. In this design, the tapers do not overlap.

Figures 36A, 36B:
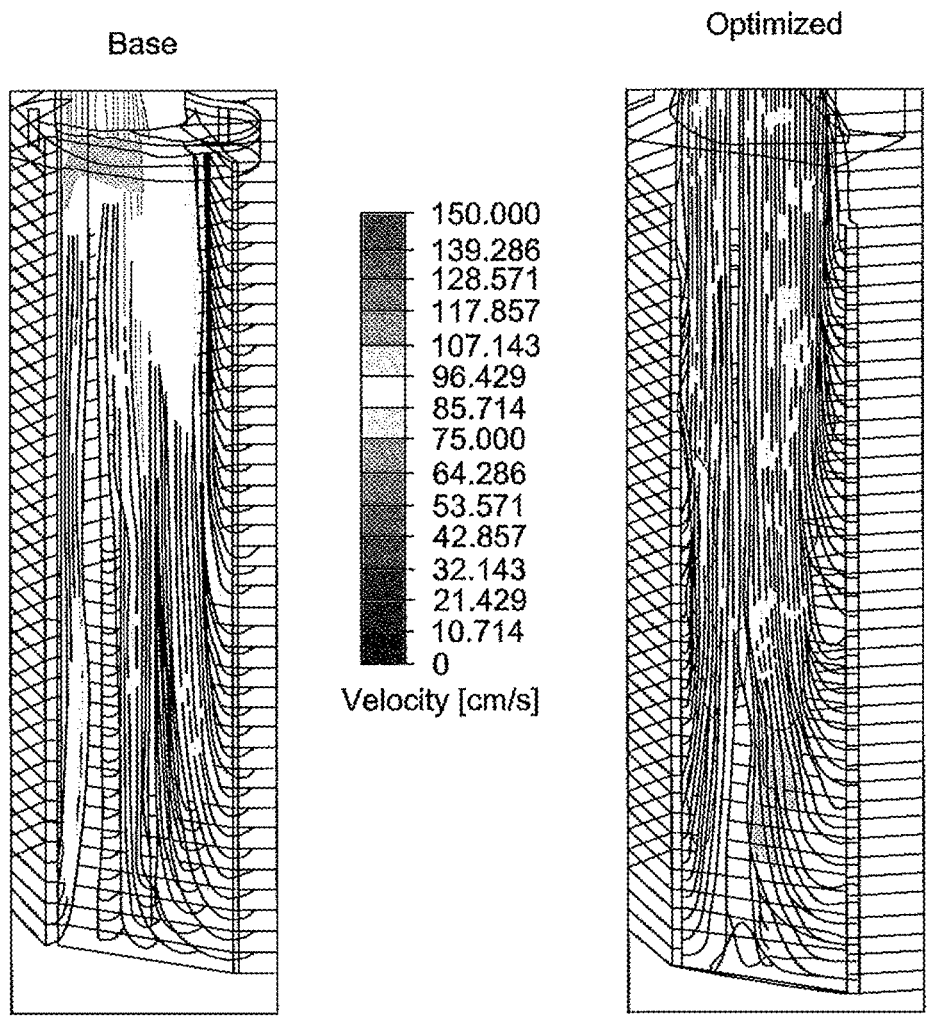
FIG. 36A illustrates results of simulation of fluid flow through the inlet manifold of an ED device including the fluidic adaptor of FIG. 34A.
FIG. 36B illustrates results of simulation of fluid flow through the inlet manifold of an ED device including the fluidic adaptor of FIG. 35A.

FIGS. 36A and 36B show results of simulation of the magnitude of velocity of individual streamlines within the inlet manifold, uniformly seeded at the inlet port, for the base and optimized designs, respectively. Due to jetting effects, inlet manifold velocity is significantly higher in the base design (left) than the optimized design (right).

Figure 37A:
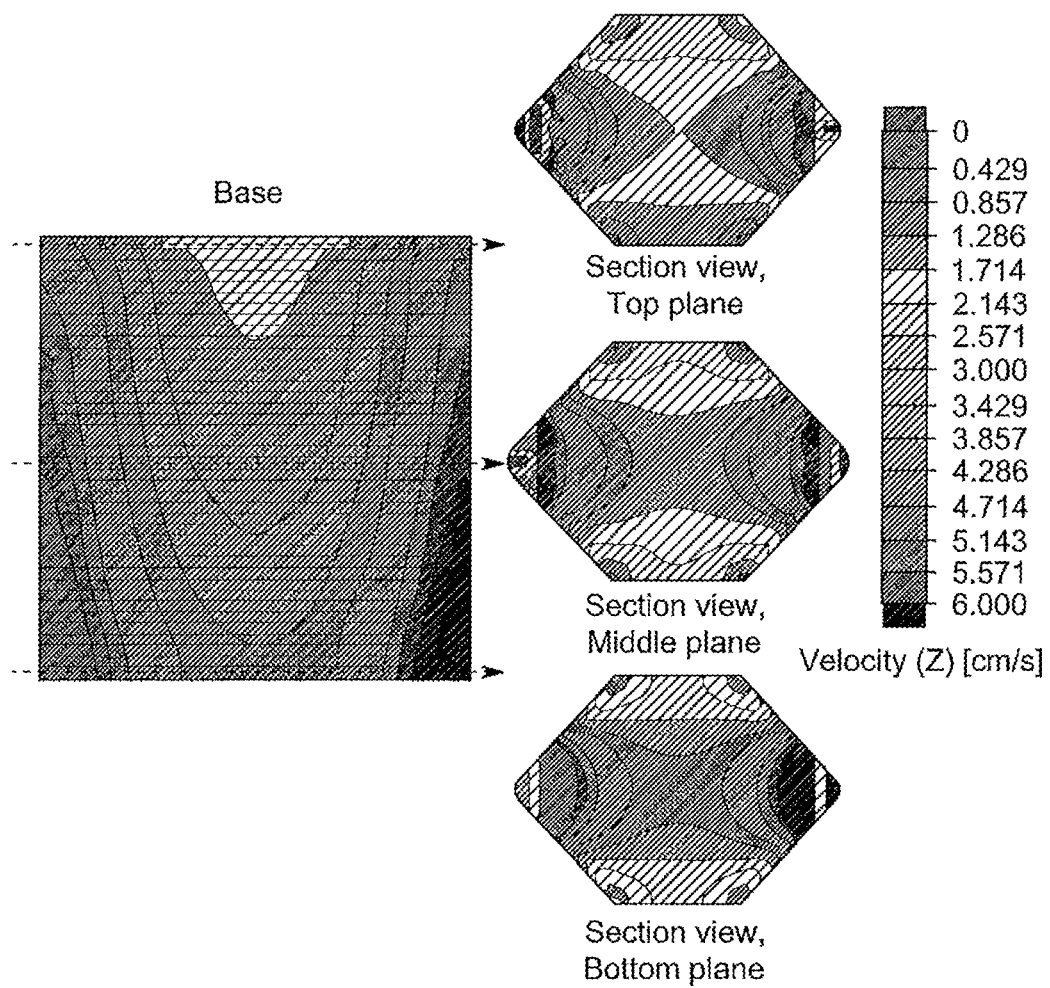
FIG. 37A illustrates results of simulation of component Z-velocity distribution of fluid through cells in an ED device including the fluidic adaptor of FIG. 34A.
Figure 37B:
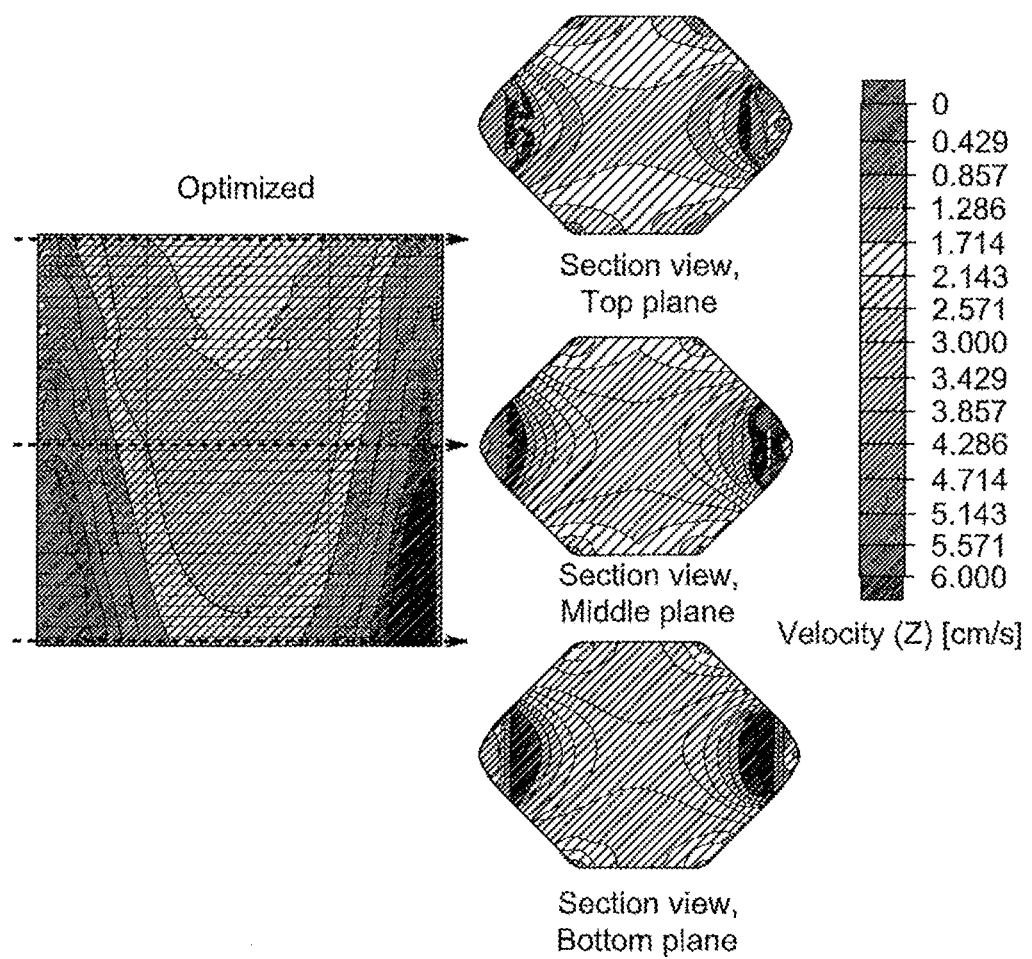
FIG. 37B illustrates results of simulation of component Z-velocity distribution of fluid through cells in an ED device including the fluidic adaptor of FIG. 35A.

FIGS. 37A and 37B display results of simulation of the Z-velocity component of fluid flow through center ZY planes, as well as through top, middle, and bottom ZX planes, for ED devices including the base and optimized designs, respectively. Comparing the distribution of Z-velocity, there is greater variation in the ED devices including the base fluidic adaptor than the optimized design.

Aspects and embodiments disclosed herein are not limited to electrodialysis apparatus. All electrochemical separation devices may benefit from improved flow distribution. Electrochemical separation devices include but are not limited to Electrodialysis, Electrodialysis Reversal, Continuous Deionization, Continuous Electrodeionization, Electrodeionization, Electrodiaresis, and Capacitive Deionization. Other electrochemical devices that would benefit from improved flow distribution include Flow Batteries, Fuel Cells, Electrochlorination Cells and Caustic Chlorine Cells.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrochemical separation device comprising:
   a first electrode;
   a second electrode;
   a cell stack including alternating depleting compartments and concentrating compartments disposed between the first electrode and the second electrode;
   an inlet manifold configured to introduce a fluid to one of the depleting compartments or the concentrating compartments;
   an outlet manifold; and
   a plurality of fluid flow directors disposed within the inlet manifold and having surfaces configured to alter a flow path of the fluid introduced into the inlet manifold and direct the fluid into the one of the depleting compartments or the concentrating compartments, the plurality of fluid flow directors extending linearly from an inlet of the inlet manifold and ending as curved ramps at the cell stack.

2. The device of claim 1, wherein a fluid flow path through the depleting compartments is perpendicular to a fluid flow path through the concentrating compartments.

3. The device of claim 2, wherein the plurality of fluid flow directors is disposed within the inlet manifold and arranged to at least partially block a bypass current through the inlet manifold.

4. The device of claim 3, wherein the plurality of fluid flow directors define fluid flow paths through the inlet manifold between different portions of the cell stack that have cross-sectional areas less than a cross-sectional area of the inlet manifold.

5. The device of claim 4, wherein the cell stack has an average current efficiency of at least 85%.

6. The device of claim 4, wherein the cell stack includes a plurality of sub-blocks and the plurality of fluid flow into directors include a plurality of ramps arranged to direct the fluid into different respective ones of the plurality of sub-blocks.

7. The device of claim 6, wherein a gap of less than 1 mm is defined between edges of each of the ramps and the cell stack.

8. The device of claim 1, wherein the inlet of the inlet manifold has a different cross-section from that of the inlet manifold and a fluidic adaptor is disposed between the fluidinlet and the inlet manifold.

9. The device of claim 8, wherein the fluidic adaptor includes a conduit having a first section with an inward taper in which a width of the conduit decreases in a first axis and a second section with an outward taper in which a width of the conduit increases in a second axis, the first section and the second section being non-overlapping.

10. The device of claim 9, wherein the inward taper of the first section of the conduit is an elliptical taper.

* * * * *